(12) United States Patent
Matsunami et al.

(10) Patent No.: US 7,512,746 B2
(45) Date of Patent: Mar. 31, 2009

(54) STORAGE SYSTEM WITH DESIGNATED CPU CORES PROCESSING TRANSACTIONS ACROSS STORAGE NODES

(75) Inventors: Naoto Matsunami, Hayama (JP); Tetsuya Shirogane, Yokohama (JP); Akira Nishimoto, Sagamihara (JP); Kenta Shiga, Yokohama (JP); Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 11/331,115

(22) Filed: Jan. 13, 2006

(65) Prior Publication Data
US 2007/0101070 A1 May 3, 2007

(30) Foreign Application Priority Data
Nov. 1, 2005 (JP) ............................. 2005-318694

(51) Int. Cl.
*G06F 13/14* (2006.01)
(52) U.S. Cl. ...................................... 711/148; 711/114
(58) Field of Classification Search .................. 711/147, 711/148, 114
See application file for complete search history.

(56) References Cited

U.S. PATENT DOCUMENTS

| | | | |
|---|---|---|---|
| 5,428,794 A * | 6/1995 | Williams ...................... 710/268 |
| 6,477,619 B1 | 11/2002 | Fujimoto et al. |
| 6,601,138 B2 * | 7/2003 | Otterness et al. ............. 711/114 |
| 6,668,308 B2 * | 12/2003 | Barroso et al. ............... 711/141 |
| 2003/0204683 A1 * | 10/2003 | Okumoto et al. ............. 711/147 |
| 2004/0049553 A1 * | 3/2004 | Iwamura et al. ............. 709/213 |
| 2004/0064639 A1 * | 4/2004 | Sicola et al. ................. 711/114 |
| 2004/0215878 A1 * | 10/2004 | Takata et al. ................. 711/114 |
| 2004/0230762 A1 * | 11/2004 | Allen et al. .................. 711/170 |
| 2005/0120160 A1 * | 6/2005 | Plouffe et al. .................. 711/1 |
| 2005/0198445 A1 * | 9/2005 | Fujimoto ..................... 711/148 |
| 2005/0213607 A1 * | 9/2005 | Cashman et al. ............. 370/467 |
| 2005/0251620 A1 | 11/2005 | Matsunami et al. |
| 2006/0004876 A1 | 1/2006 | Matsunami et al. |
| 2006/0101384 A1 * | 5/2006 | Sim-Tang et al. ............ 717/104 |

FOREIGN PATENT DOCUMENTS

| | | |
|---|---|---|
| EP | 1 132 805 A2 | 9/2000 |
| JP | 2000-187608 | 12/1998 |

OTHER PUBLICATIONS

European Search Report dated Nov. 2, 2006.

* cited by examiner

*Primary Examiner*—Matt Kim
*Assistant Examiner*—Hal Schnee
(74) *Attorney, Agent, or Firm*—Reed Smith LLP; Juan Carlos A. Marquez, Esq.

(57) ABSTRACT

A storage system comprises a plurality of storage nodes and a controller coupling unit interconnecting controllers within the storage nodes. A memory in the controller has a plurality of shared memory areas each associated with a combination of one CPU core with one logical unit controller. When a network controller of a first storage node receives a host command addressed to a logical unit of a second storage node, the CPU core of the first storage node stores the host command in the shared memory area associated with the logical unit controller of the second storage node. The logical unit controller of the second storage node acquires the stored host command in the shared memory area via the controller coupling unit.

15 Claims, 40 Drawing Sheets

RAID GROUP CONFIGURATION

LOGICAL UNIT CONFIGURATION

Fig.9

| LU | RG | Start RG LBA | LEN | Initiator | Target |
|---|---|---|---|---|---|
| LU a0 | RG a0 | 0 | k | Init-a0 | Targ-a0 |
| LU a1 | RG a0 | k | n | Init-b0 | Targ-a1 |

| Target | Targ-a0 |
|---|---|
| Initiator | Init-a0 |
| Entity | SN a |
| Portal | Ta0 |
| Portal Gr | TPGa0 |

| Initiator | Init-a0 |
|---|---|
| Entity | Host a |
| Portal | Ia0 |
| Portal Gr | IPGa0 |

210a

CTLb ADDRESS SPACES SEEN FROM CPU CORE p

Fig.32

| CPU | | LU | SN a | SN b | SN c | SN d |
|---|---|---|---|---|---|---|
| CORE p | CORE q | | | | | |
| | | 0 | 70% | 10% | 30% | — |
| | | 1 | 30% | 0% | 0% | — |
| | | 2 | 60% | 20% | 40% | — |
| | | 3 | 40% | — | — | — |
| | | ·· | ·· | ·· | ·· | ·· |

410

SHADOW IMAGING LOAD DISTRIBUTION (WITHIN CONTROLLER)

SHADOW IMAGING LOAD DISTRIBUTION (BETWEEN STORAGE NODES)

Fig.34A SHADOW IMAGING (DURING BACKUP)
LOAD DISTRIBUTION (WITHIN CONTROLLER)
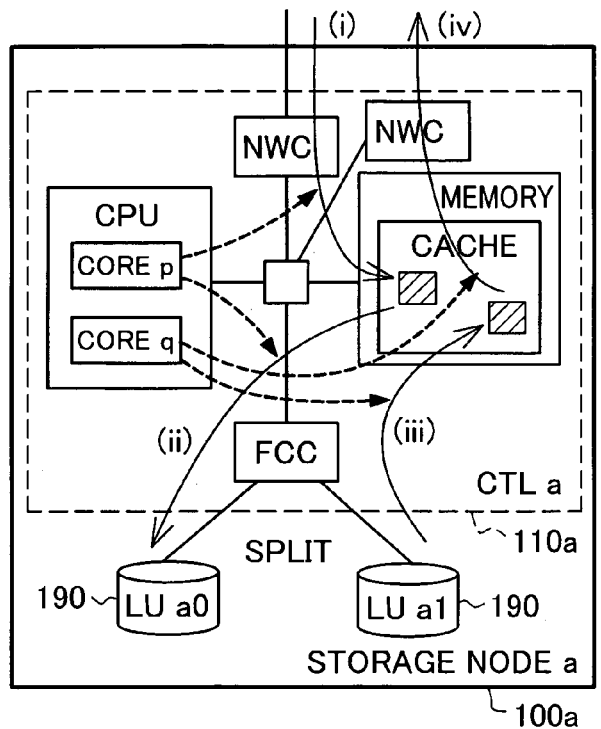
Fig.34B SHADOW IMAGING (DURING BACKUP)
LOAD DISTRIBUTION (BETWEEN STORAGE NODES)
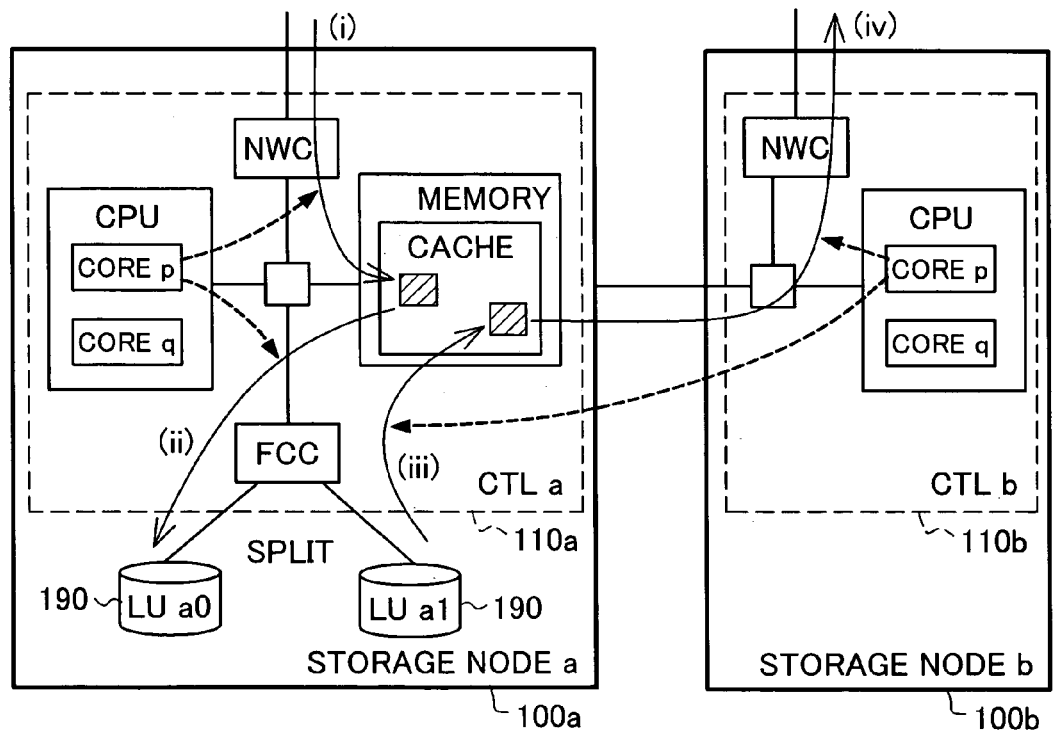

SNAPSHOT LOAD DISTRIBUTION (WITHIN CONTROLLER)

SNAPSHOT LOAD DISTRIBUTION (BETWEEN STORAGE NODES)

Fig.36A  REMOTE COPYING LOAD DISTRIBUTION
(WITHIN CONTROLLER)
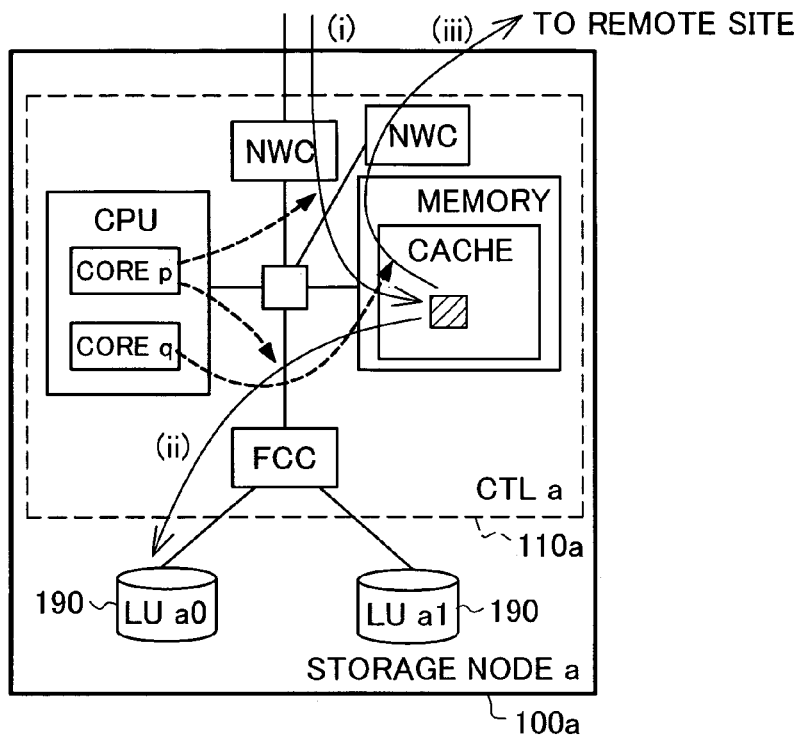
Fig.36B  REMOTE COPYING LOAD DISTRIBUTION
(BETWEEN STORAGE NODES)
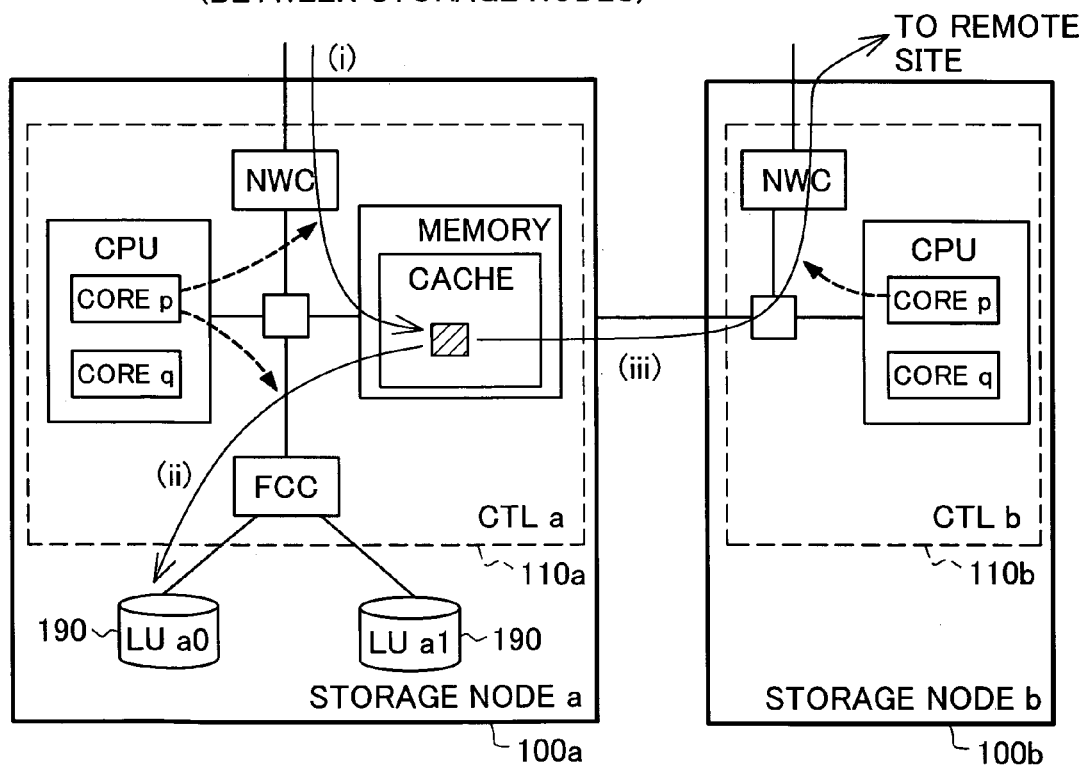

MIRRORING BETWEEN STORAGE NODES

RAID AMONG STORAGE NODES

STORAGE NODE a CTLax ADDRESS SPACES SEEN FROM CORE p

STORAGE SYSTEM WITH DESIGNATED CPU CORES PROCESSING TRANSACTIONS ACROSS STORAGE NODES

CROSS REFERENCE TO RELATED APPLICATIONS

The present application claims the priority based on Japanese Patent Application No. 2005-318694 filed on Nov. 1, 2005, the disclosure of which is hereby incorporated herein by reference in its entirety.

BACKGROUND

The present invention relates to a storage system, and relates in particular to technology for switching between processors that perform processing in response to commands in a storage system.

Data processing systems including a host computer and a storage system are utilized in various applications. Here, a storage system refers to a system composed of at least one storage node that has disks for storing data and a controller for controlling the disks. Typically, within a storage node there are configured one or a plurality of logical memory areas (called "logical units" for example) with the disks. The host computer issues a command addressed to a logical unit configured within a storage node of the storage system, while executing data processing tasks. Within the storage node that received the command from the host computer, a processor within the controller (e.g. a CPU core) carries out processing in response to the command.

In a storage system of this kind, an excessive load may be imposed on a particular processor within a particular storage node, due to an increase in the amount of data stored in a logical unit, or an increase in access frequency by the host computer.

Technology for migrating data from a logical unit in a first storage node to a logical unit in a second storage node in a storage system has been disclosed (e.g. JP2000-187608A). With this technology, after data has been migrated, commands from the host computer are handled by the second storage node. Thus, processing in response to a command from the host computer being executed by the processor in the first storage node prior to data migration will, after data migration, now be executed by the processor in the second storage node. In the event of excessive load on a particular processor as mentioned above, by switching among processors executing processing in response to commands from the host computer in this way, the processing load can be distributed throughout the system.

A problem with the conventional technology discussed above is that, when switching between processors executing processing in response to a command, it is necessary to migrate the data and to modify various settings in association therewith, making processing extremely complex.

SUMMARY

An object of the present invention is to provide a technology that enables switching between processors executing processing in response to commands to be carried out easily in a storage system.

In one aspect of the present invention, there is provided a storage system. The storage system comprises a plurality of storage nodes and a controller coupling unit. The plurality of storage nodes each include at least one logical unit that is a logical memory area for storing data and at least one controller configured to control the logical unit. The controller coupling unit connects a plurality of controllers included in mutually different storage nodes, without using an access path between the controllers and a host computer connected to the storage system. The controller of the storage node includes a CPU including at least one CPU core, a network controller, a logical unit controller, and a memory. The network controller receives from the host computer via a network a host command targeting one of the plurality of logical units within the storage system. The logical unit controller is connected to the logical unit and controls input/output of data in the logical unit. The memory has a plurality of first shared memory areas shared by the CPUs and the logical unit controllers. Each of the first shared memory areas is associated with a combination of one CPU core within the CPU with one logical unit controller within the storage system. When the network controller included within a first storage node among the plurality of storage nodes receives from the host computer the host command targeting a logical unit included in a second storage node among the plurality of storage nodes, the CPU core within the first storage node executes processing in response to the received host command, whereby a logical unit command for the logical unit controller connected to the logical unit included in the second storage node is stored in that first shared memory area within the first storage node which is associated with the combination of the CPU core within the first storage node and the logical unit controller within the second storage node. The logical unit controller within the second storage node acquires via the controller coupling unit the logical unit command stored in the first shared memory area within the first storage node, and controls input/output of data in the logical unit in accordance with the acquired logical unit command.

In this storage system, when the network controller included in a first storage node from among the plurality of storage nodes receives from a host computer a host command addressed to a logical unit included in a second storage node from among the plurality of storage nodes, a CPU core within the first storage node performs processing in response to the received host command, whereby the logical unit command for the logical unit controller connected to the logical unit within the second storage node is stored in the first shared memory area within the first storage node, which memory area is associated with the combination of the CPU core itself with the logical unit controller within the second storage node. The logical unit controller within the second storage node acquires, via the controller coupling unit, the logical unit command that has been stored in the first shared memory area within the first storage node, and controls input/output of data in the logical unit in accordance with the acquired logical unit command. Thus, the CPU core within the first storage node can carry out processing in response to a host command addressed to the logical unit included in the second storage node. Accordingly, in this storage system, when switching between processors executing processing in response to a host command, there is no need to carry out migration of data stored in logical units, and switching can be accomplished easily.

In another aspect of the present invention, there is provided a storage system. The storage system comprises at least one storage node. The storage node includes at least one logical unit, a CPU including a plurality of CPU cores, a network controller, a logical unit controller, and a memory. The logical unit is a logical memory area for storing data. The network controller receives from a host computer via a network a host command targeting the logical unit. The logical unit controller is connected to the logical unit and controls input/output of data in the logical unit. The memory has a plurality of first and second shared memory areas shared by the CPU and the network controller. Each of the first shared memory areas is associated with one CPU core within the CPU. Each of the second shared memory areas is associated with one CPU core within the CPU. The network controller has the function of designating an assigned CPU core depending on the logical unit to which the received host command is addressed. The designated CPU core is responsible for executing processing in response to the host command received from the host computer, and stores the received host command in the second shared memory area associated with the assigned CPU core. The assigned CPU core executes processing in response to the host command stored in the second shared memory area, whereby a logical unit command for the logical unit controller is stored in the first shared memory area associated with the assigned CPU core. The logical unit controller controls input/output of data in the logical unit in accordance with the logical unit command stored in the first shared memory.

In this storage system, the network controller has the function of designating, with reference to the logical unit addressed by a host command received from a host computer, an associated CPU core responsible for processing in response to the received host command; as well as storing the received host command in the second shared memory area associated with the assigned CPU core. By means of performing processing in response to the host command stored in the second shared memory area, the assigned CPU core stores a logical unit command for the logical unit controller in the first shared memory area associated with itself. In accordance with the logical unit command stored in the first shared memory area, the logical unit controller controls input/output of data in the logical unit. Thus, simply by changing the assigned CPU core designation in the network controller, after the change, processing by the assigned CPU core in response to the host command is executed using the first shared memory area associated with itself and the second shared memory area. Accordingly, in this storage system, switching between processors executing processing in response to a host command can be accomplished easily.

The present invention can be realized in a various aspects. For example, the present invention can be realized in aspects such as a storage system, storage device, a method for controlling a storage system or a storage device, a computer program for effecting the functions of such methods or devices, a computer program set including such computer program, a recording medium for recording such computer program, and data signals in which such a computer program is carried on the carrier wave.

Where the present invention is composed as a computer program or a recording medium on which such computer program is recorded, the program may comprise a program that controls the overall operation of the computer system or a program that separately controls the operation of each computer or each storage device system.

These and other objects, features, aspects, and advantages of the present invention will become more apparent from the following detailed description of the preferred embodiments with the accompanying drawings.

BRIEF DESCRIPTION OF THE DRAWINGS

FIG. 9 is a diagram showing an exemplary LU management table;

FIG. 10 is a diagram showing an exemplary target management table;

FIG. 11 is a diagram showing an exemplary initiator management table;

FIG. 32 is a diagram showing another example of an administration screen 410 of the administration device 400 of the storage system 1000;

FIG. 34A and FIG. 34B are diagrams showing another example of an application relating to a shadow image in the storage system 1000;

FIG. 36A and FIG. 36B are diagrams showing another example of application relating to remote copying in the storage system 1000;

DESCRIPTION OF THE PREFERRED EMBODIMENT

Next, aspects of the present invention will be described in the following order on the basis of embodiments. The embodiments herein are merely exemplary, and should not be construed as limiting of the invention.

A. Embodiment 1
A-1. System Configuration
A-2. Host Command Execution Process
A-3. Switching Assigned CPU Core Within a Controller
A-4. Address Spaces and Memory Maps in Controllers 110 of Storage Nodes 100
A-5. Address Spaces and Memory Maps of the Storage System 1000
A-6. Inter-node Switching of Assigned CPU Core
A-7. Modifying Access Paths Between Host Computers and Storage Nodes
A-8. Example of Administration Screen
A-9. Application of Embodiment 1
B. Embodiment 2
C. Variations

A. Embodiment 1

A-1. System Configuration

Figure 1:
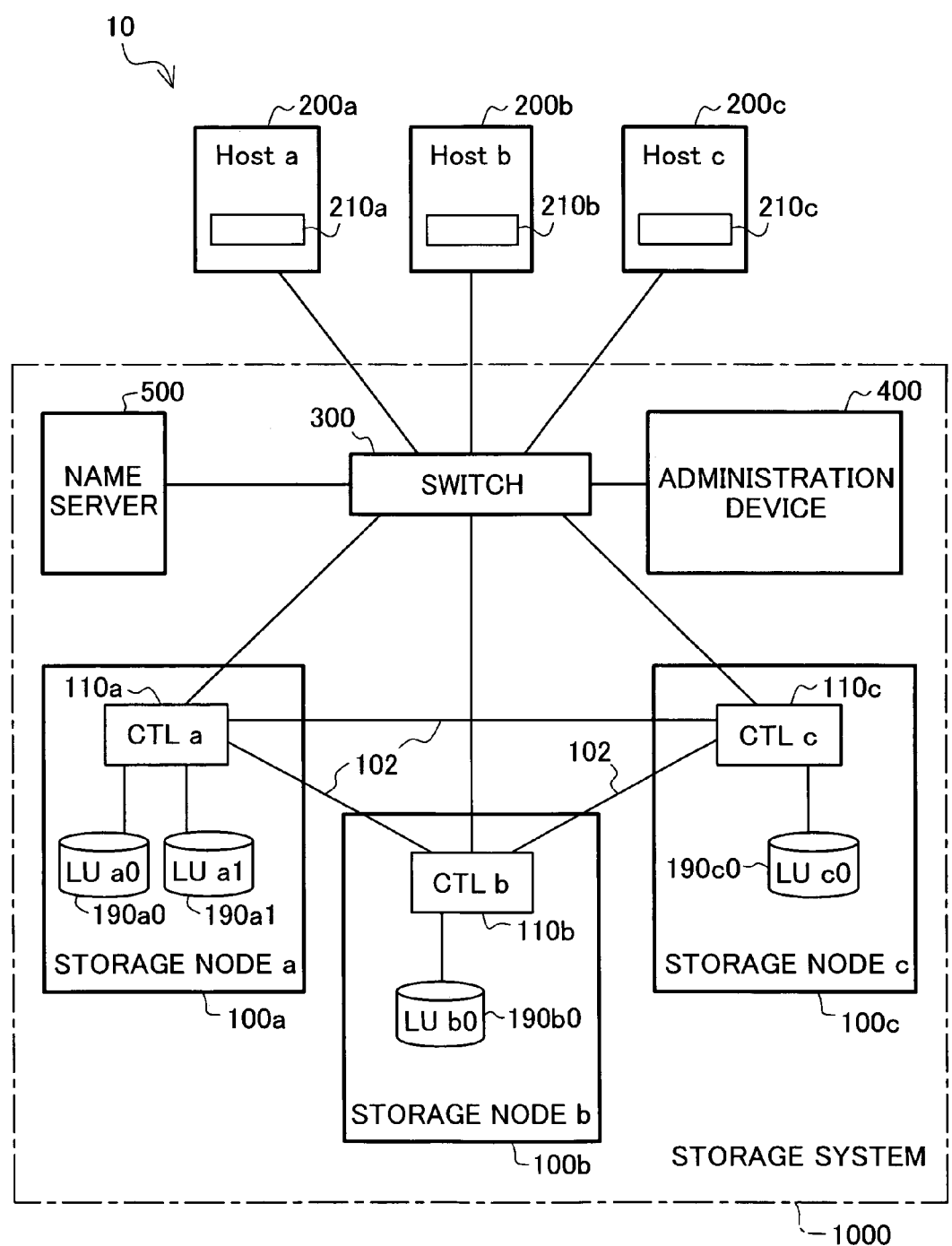
FIG. 1 is a diagram depicting a simplified configuration of data processing system in Embodiment 1 of the present invention.

FIG. 1 is a diagram depicting a simplified configuration of data processing system in Embodiment 1 of the present invention. The data processing system 10 in Embodiment 1 comprises a host computer (herein referred to also as "host") 200 and a storage system 1000 connected to the host computer 200. In the example shown in FIG. 1, the data processing system 10 comprises three host computers 200 (200a, 200b, 200c) but it is sufficient for the data processing system 10 to comprise at least one host computer 200.

It is assumed that, in the data processing system 10 in this embodiment, the network connecting the host computers 200 and the storage nodes 100 is an IP network, and, it is assumed that the network protocol is the TCP/IP protocol and that the data protocol among the host computers 200 and the storage nodes 100 is the iSCSI protocol, which provides a block I/O interface. However, the present invention is not limited to these.

In the description and drawings herein, where a given element is present in plurality in the data processing system 10, the name or symbol of the element will be followed by an appended lower case letter (a, b, c . . . ) as an identifier for distinguishing them. For example, as shown in FIG. 1, the three host computers 200 are designated as "host computer a (Host a)", "host computer b (Host b)" and "host computer c (Host c)", and their symbols are represented by "200a", "200b" and "200c" respectively. Where there is no particular need to distinguish among individual elements, the appended identifier may be omitted.

The storage system 1000 (FIG. 1) includes a storage node (hereinafter also denoted as "SN") 100, a switch 300, an administration device 400, and a name server 500. The name server 500 needs to be present when the access path is switched by means of Target name handover as described in this embodiment, but where access path switching is carried out by another method, described later, it is not needed.

The storage node 100 includes a logical unit (hereinafter also denoted as "LU") 190 which is a logical memory area accessed from the host computer 200 and a controller (hereinafter also denoted as "CTL") 110 which controls the logical unit 190 and executes access requests from the host computer 200. In the description and drawings herein, in order to distinguish individual logical units 190 within a single storage node 100, a serial number (an integer equal to 0 or greater) is appended to the name and symbol of each logical unit 190.

The storage system 1000 in this embodiment is a system composed of one or more storage nodes 100 furnished with a logical unit 190 and a controller 110 as described above. The number of storage nodes 100 in the storage system 1000 may be greater or less, depending on the volume of requests and performance required. The description hereinbelow takes the sample of a storage system 1000 containing three storage nodes 100, as depicted in FIG. 1.

The controller 110 of the storage node 100 is connected via an inter-node controller coupling unit 102 with the controller 110 of the other storage node 100 within the storage system 1000. The inter-node controller coupling unit 102 connects the controllers 110 to one another without using switch 300, that is, without using an access path between the controller 110 and the host computer 200. The specific design of the inter-node controller coupling unit 102 will be discussed later.

The switch 300 interconnects mutually the controllers 110 of the storage nodes 100, the administration device 400, the name server 500 and the host computers 200. The administration device 400 is a device used for administering the storage system 1000. The name server 500 is a device for managing the names of the storage nodes 100 and the host computers 200 and managing logical connection relationships among them.

Though in the example of FIG. 1, the switch 300, the administration device 400, and the name server 500 are included within the storage system 1000, the switch 300, the administration device 400, and the name server 500 may be constituted as independent elements from the storage system 1000 not included within the storage system 1000. Though in the example of FIG. 1, "in band" communication whereby the administration device 400 communicates with the controllers 110 over the network via the switch 300 is assumed, it may also be possible to employ "out of band" communication whereby each controller 110 has an administration interface for connecting to an administration network (not shown) provided expressly for managing the controllers 110 and the administration device 400 communicates with the controllers 110 by connecting to their administration interfaces via the administration network.

The host computer 200 is a computer having a CPU, a memory, and a network controller (none of these are shown), with an initiator table 210 being stored in the memory. The initiator table 210 will be described later.

Figure 2:
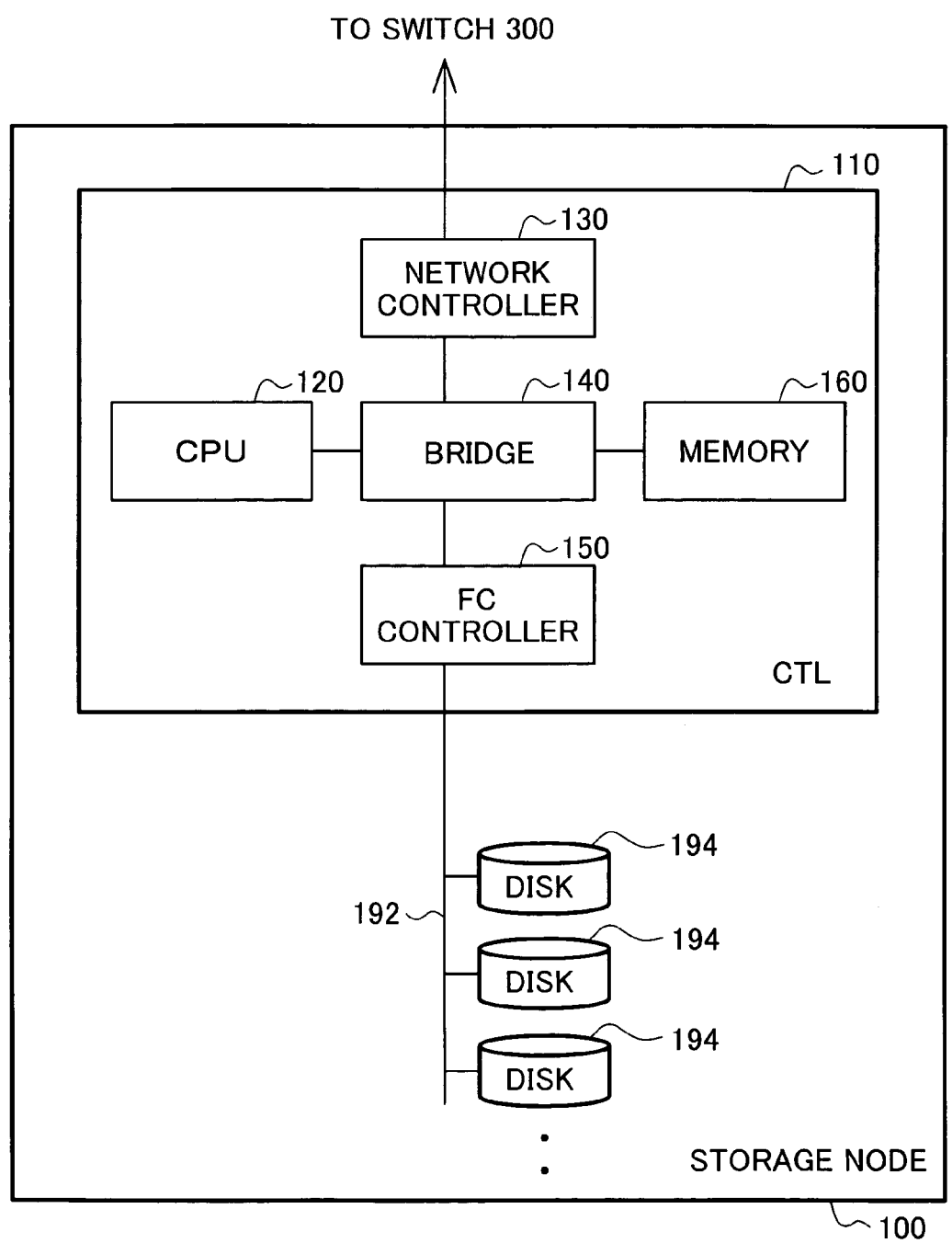
FIG. 2 is a diagram depicting an example of hardware configuration in a storage node 100.

FIG. 2 is a diagram showing an example of hardware configuration of a storage node 100. As shown in FIG. 2, the storage node 100 includes a controller (CTL) 110 and a plurality of disks 194 connected to the controller 110 via a Fibre Channel (hereinafter also denoted as "FC"). As the disk type, SATA, SAS, parallel SCSI or the like may be employed instead of FC, in which case the arrangement may be realized analogously by employing the corresponding interface.

The controller 110 is a device for controlling input and output from and to the plurality of disks 194, and includes a CPU 120 for overall control of the storage node 100, a network controller (hereinafter also denoted as "NWC") 130 for connecting to the switch 300 (FIG. 1), a bridge 140, an FC controller 150 (hereinafter also denoted as "FCC") for controlling the Fibre Channel 192, and a memory 160. The memory 160 is used for storing a control program executed by the CPU 120 and control data, and is used as a cache for higher disk access speeds. The bridge 140 controls transfer of data or programs between the CPU 120 and the memory 160, transfer of data between the network controller 130 and the memory 160, and transfer of data between the FC controller 150 and the memory 160. As shown in FIG. 1, the controller 110 within a storage node 100 is connected to the controllers 110 in other storage nodes 100 via the inter-node controller coupling units 102, the connection configuration is assumed to be that shown in FIG. 3, and has been omitted from the illustration in FIG. 2. The FC controller 150 corresponds to the logical unit controller in the present invention. In the controller 110, the memory for storing the control program and control data, and the memory used as cache memory, may be included as separate memories.

Figure 3:
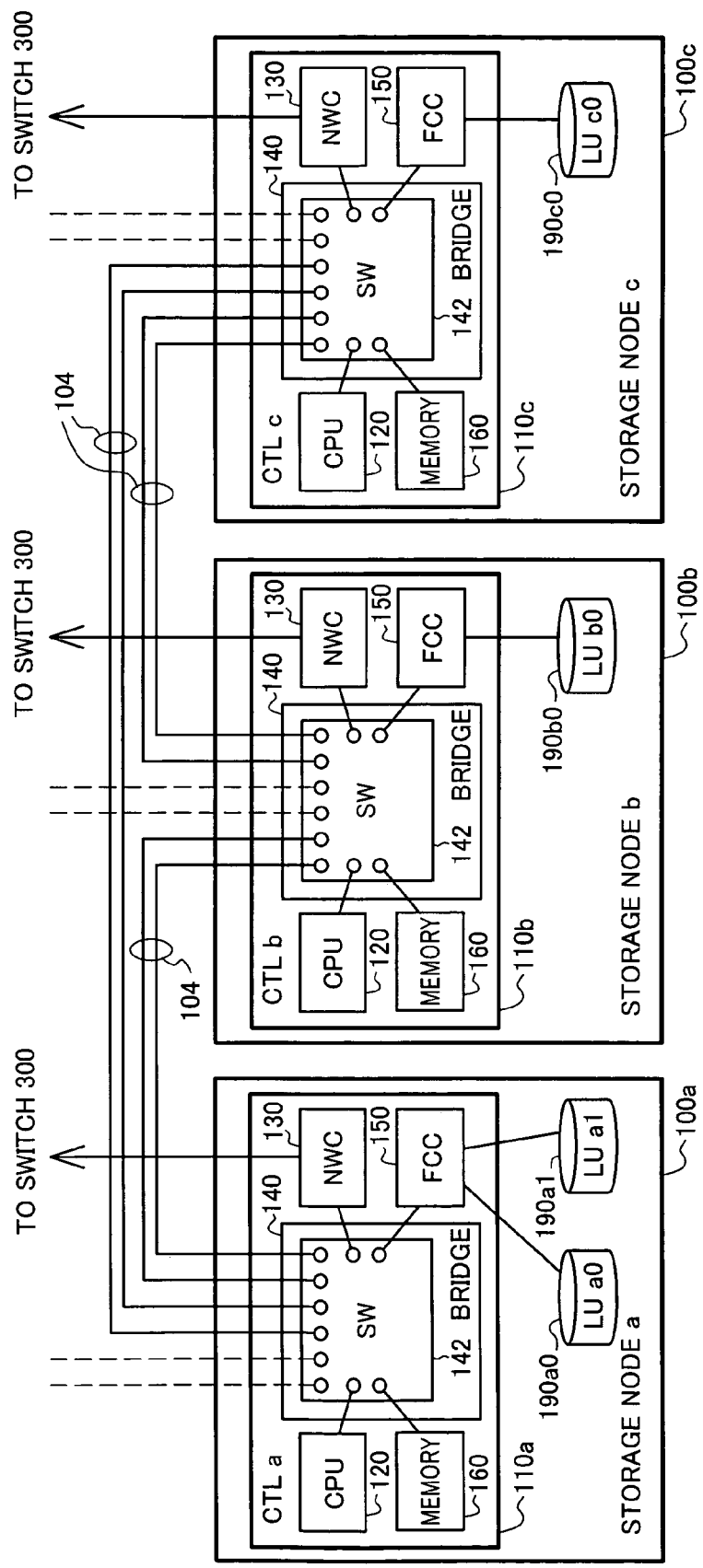
FIG. 3 is a diagram depicting the configuration of the inter-node controller coupling unit 102.

FIG. 3 is a diagram showing the configuration of the inter-node controller coupling unit 102 (FIG. 1). As shown in FIG. 3, the bridge 140 included in the controller 110 of each storage node 100 has a switch 142 (hereinafter also denoted as "SW"). The controllers 110 (CTLa, CTLb, CTLc) of the storage nodes 100 are connected mutually via connection lines 104 (hereinafter referred to as "inter-node controller connection lines 104") interconnecting the switches 142. The inter-node controller coupling unit 102 is composed of the switches 142 in the controllers 110 and the inter-node controller connection lines 104.

In the example of FIG. 3, the inter-node controller connection lines 104 are each composed of a pair of lines. By so doing, in the event that communication is interrupted on one of the inter-node controller connection lines 104 due to a failure, the other line can be used, so that reliability can be improved. Additionally, by assigning the two lines different service bands by using one exclusively for incoming communication and the other exclusively for outgoing communication, it is possible to improve communication speed in the inter-node controller connection lines 104. It is also possible for the inter-node controller connection lines 104 to be composed of a single line only. The broken lines in FIG. 3 are inter-node controller connection lines provided for future expansion of the storage nodes 100.

Figure 4A:
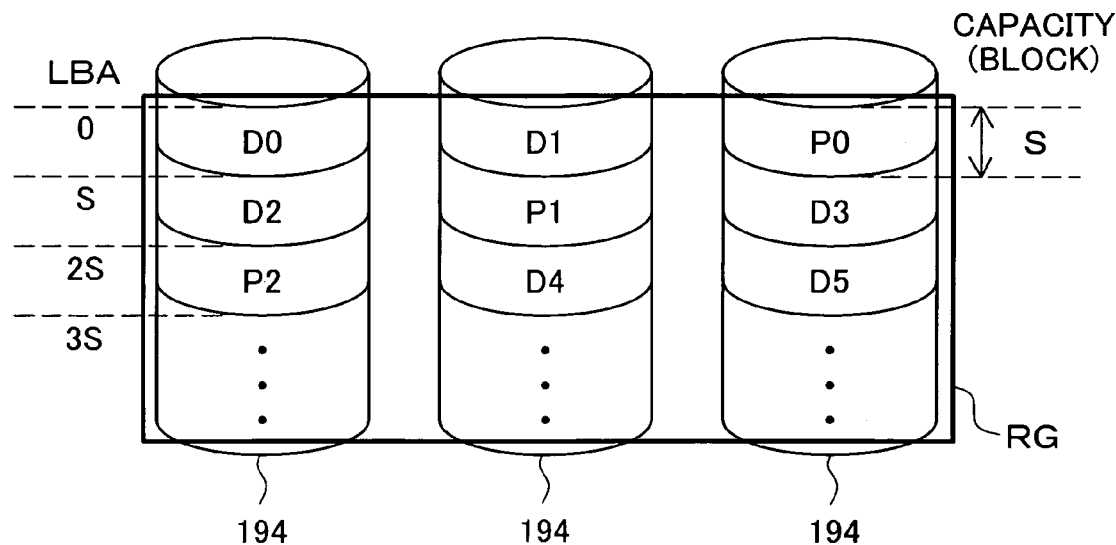
FIG. 4A and FIG. 4B are diagrams depicting an example of logical units 190.
Figure 4B:
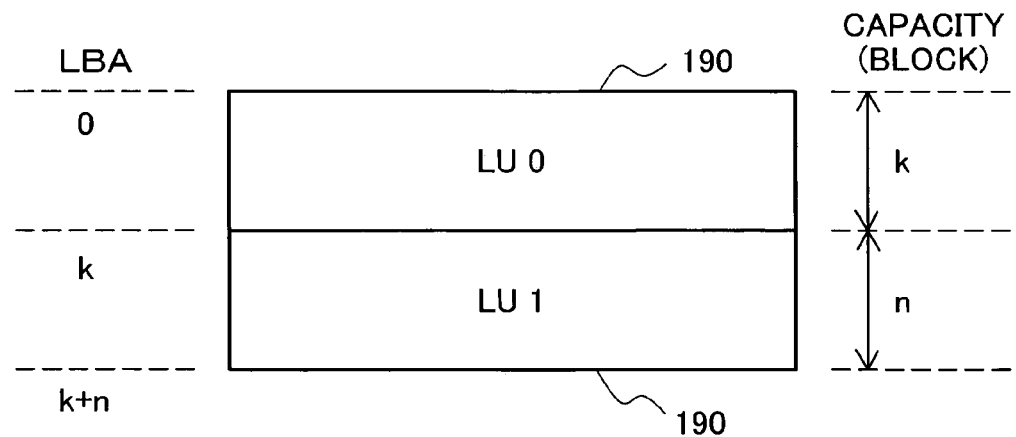

FIG. 4A and FIG. 4B are diagrams depicting an example of logical units 190 included in a storage node 100. FIG. 4A shows an example arrangement of a RAID (Redundant Arrays of Inexpensive Disks) group (hereinafter also denoted as "RG"). In the example depicted in FIG. 4A, a RAID 5 type RAID group (RG) is composed of the three disks 194 (FIG. 2) included in the storage node 100, and the stripe size is S number of blocks. Here, "block" refers to a logical block as defined in the SCSI protocol standard. Typically, in most cases a 512-byte disk sector is defined as a single logical block. Any RAID level or block size may be established. The number of disks 194 used for making up the RAID group may be any number that is more than one.

The RAID group shown in FIG. 4A is an example of a RAID 5 type configuration, in which a sequence of data is divided in S number of blocks, with the divided data (denoted in FIG. 4A as "Di", where i is an integer equal to 0 or greater) being distributed among the three disks 194. A stripe is composed of three memory areas present within different disks 194. Within a given stripe, data is stored in two of the memory areas, while in the remaining one memory area there is stored parity data (denoted in FIG. 4A as "Pj", where j is an integer equal to 0 or greater) created by calculating the exclusive OR using the data stored in the other two memory areas.

An exemplary configuration of logical units 190 is shown in FIG. 4B. In the RAID group of the configuration described above, there are constituted two logical units 190 (LU0, LU1) as depicted in FIG. 4B. LU0 is a logical unit 190 having capacity of k number of blocks, and LU1 is a logical unit 190 having capacity of n number of blocks. As shown in FIG. 4B, logical block addresses (hereinafter also denoted as "LBA") within the RAID group range from 0 to k−1 for the logical unit LU0 and from k to (k+n−1) for the logical unit LU1. Once logical units 190 have been established, each logical unit 190 is accessed from the host computers 200 on a per-logical unit 190 basis using its local LBA, so that each logical unit 190 can behave just like an independent disk. That is, the local LBA of the logical unit LU0 begins from 0 and has a final address of k−1, while the local LBA of the logical unit LU1 begins from 0 and has a final address of n−1.

Figure 5:
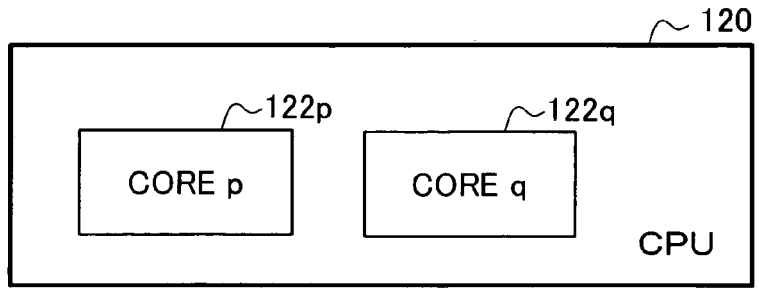
FIG. 5 is a diagram depicting an example of the arrangement of the CPU 120 included in the controller 110 of a storage node 100.

FIG. 5 is a diagram depicting an example of the arrangement of the CPU 120 (FIG. 2) included in the controller 110 of the storage node 100. The CPU 120 in this embodiment has two cores 122. That is, the CPU 120 in this embodiment is a multi-core CPU. Here, the cores 122 are the portions that actually perform arithmetic operations and other processes in the CPU 120. As shown in FIG. 1, the storage system 1000 in this embodiment comprises three storage nodes 100, and each CPU 120 in the controllers 110 of the storage nodes 100 includes two cores 122, so there are a total of six cores 122 present within the storage system 1000. In the description and drawings herein, in order to distinguish between the two cores 122 present in a single CPU 120, the identifier "p" is appended to the end of the name and symbol of one core 122, while the identifier "q" is appended to the end of the name and symbol of the other core 122.

Figure 6:
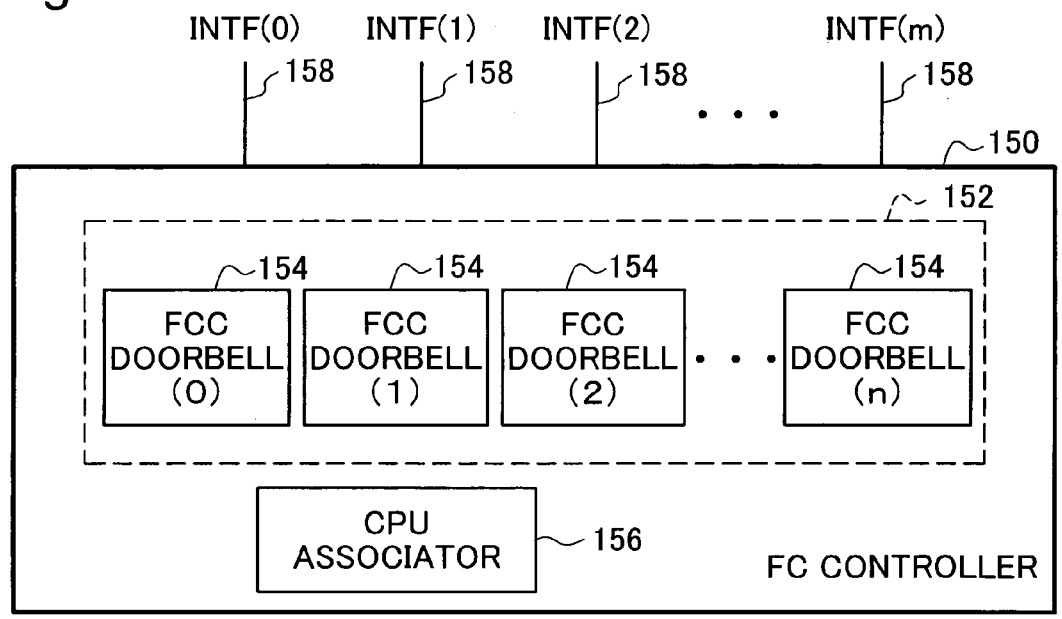
FIG. 6 is a diagram showing an example of the configuration of an FC controller 150 included in the controller 110 of a storage node 100.

FIG. 6 is a diagram showing an example of the configuration of an FC controller 150 (FIG. 2) included in the controller 110 of a storage node 100. The FC controller 150 in this embodiment includes an doorbell register 152 having a plurality of FCC doorbells 154, a CPU associator 156, and a plurality of interrupt lines (hereinafter also denoted as "INTF") 158.

The FCC doorbells 154 are memory areas or registers provided for the purpose of communication between the cores 122 (FIG. 5) of the CPU 120 and the FC controller 150. Within the FC controller 150 are provided FCC doorbells 154 associated respectively with the plurality of cores 122 present within the storage system 1000 (FIG. 1). Associations between the plurality of cores 122 and the FCC doorbells 154 are established by the CPU associator 156. It is not always necessary for associations between the cores 122 and the FCC doorbells 154 to be established by the CPU associator 156. It may be acceptable as well to provide within the FC controller 150 FCC doorbells 154 in a number equal to the number of cores 122 able to be present within the storage system 1000, and to establish static associations between the cores 122 and the FCC doorbells 154. In the description and drawings herein, in order to distinguish individual FCC doorbells 154, serial numbers (integers of 0 and above) in parentheses are appended to the end of the name and symbol of the FCC doorbells 154. The FCC doorbells 154 correspond to the first communication areas in the present invention.

The interrupt lines 158 are provided for the purpose of issuing interrupt requests from the FC controller 150 to the cores 122 of the CPU 120 (FIG. 5). Within the FC controller 150 are provided interrupt lines 158 associated with each of the plurality of cores 122 within the storage system 1000 (FIG. 1). In the description and drawings herein, in order to distinguish among individual interrupt lines 158, serial numbers (integers of 0 and above) in parentheses are appended to the end of the name and symbol of the interrupt lines 158.

Figure 7:
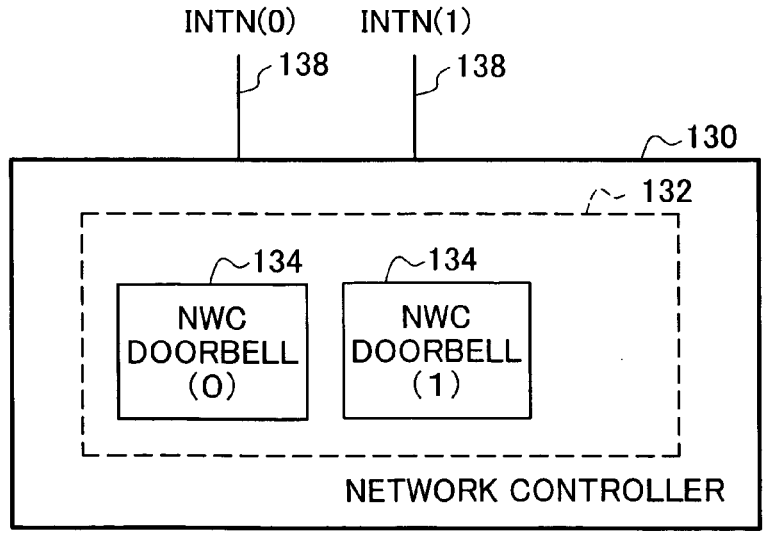
FIG. 7 is a diagram depicting an example configuration of the network controller 130 included in the controller 110 of a storage node 100.

FIG. 7 is a diagram depicting an example configuration of the network controller 130 (FIG. 2) included in the controller 110 of a storage node 100. The network controller 130 in this embodiment includes a doorbell register 132 having a plurality of NWC doorbells 134 and a plurality of interrupt lines (hereinafter also denoted as "INTF") 138.

The NWC doorbells 134 are memory areas or registers provided for the purpose of communication between the cores 122 (FIG. 5) of the CPU 120 and the network controller 130. In the network controller 130, there are provided NWC doorbells 134 associated respectively with the two cores 122 included in the CPU 120 of the controller 110. The interrupt lines 138 are provided for the purpose of issuing interrupt requests from the network controller 130 to the cores 122 (FIG. 5) of the CPU 120. In the network controller 130, there are provided interrupt lines 138 associated respectively with the two cores 122 included in the CPU 120 in the controller 110. In the description and drawings herein, in order to distinguish among individual NWC doorbells 134 and interrupt lines 138, serial numbers (integers of 0 and above) in parentheses are appended to the end of the names and symbols of the NWC doorbells 134 and the interrupt lines 138. The NWC doorbells 134 correspond to the second communication areas in the present invention.

Figure 8:
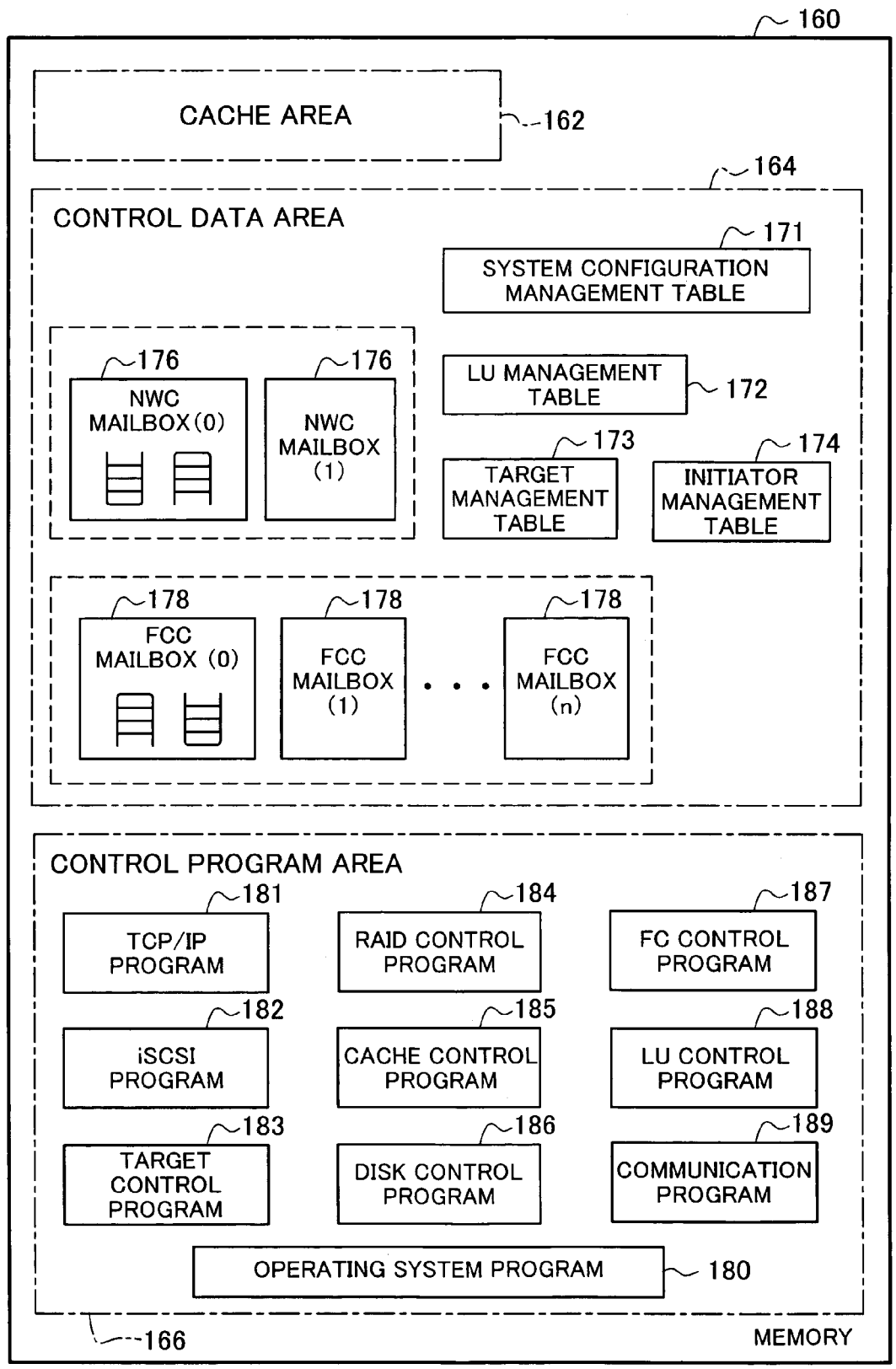
FIG. 8 is a diagram showing an exemplary configuration of the memory 160 included in the controller 110 of a storage node 100.

FIG. 8 is a diagram showing an exemplary configuration of the memory 160 (FIG. 2) included in the controller 110 of a storage node 100. The memory 160 includes a cache area 162, a control data area 164, and a control program area 166.

The cache area 162 is an area constituting a disk cache (hereinafter also referred to simply as a "cache") for temporarily holding a copy of data read out from a disk 194 or data to be stored on a disk 194 (FIG. 2), for the purpose of faster disk access from the host computers 200 (FIG. 1).

The control data area 164 is an area for storing data of various kinds referred to when the CPU 120 (FIG. 2) executes control programs. In the control data area 164 are stored a system configuration management table 171 in which is registered configuration information for the storage system 1000 (FIG. 1), an LU management table 172 in which is registered configuration information for the logical units 190 (FIG. 1) of the storage nodes 100, a target management table 173 in which are registered the target names (hereinafter referred to also as "targets") which are the logical addresses provided for the logical units 190, and an initiator management table 174 in which are registered the initiator names (hereinafter referred to also as "initiators") which are the logical addresses of access initiators which access the logical units The target name and initiator name will be, for example, an iSCSI name in a system using the iSCSI protocol, a WWN (World Wide Name) in a FC system, or the like. However, the target name is not limited thereto provided that the name is a globally unique identifier allocated to an access destination and that once created does not change until deleted, and, the initiator name is not limited thereto provided that the name is a globally unique identifier allocated to an access source and that once created does not change until deleted. In some instances, a target address or initiator address is used as information for identifying an access source or access destination. The target address may be the Destination ID in a system using FC protocol and the initiator address may be the Source ID in a system using FC protocol, but are not limited to these. Both the target name and the target address are identifying information identifying the access destination, and both the initiator name and the initiator address are identifying information identifying the access source. So it may be possible to use the target name in place of the target address, or to use the initiator name in place of the initiator address. Hereinbelow, target name and target address will not be distinguished from one another, and for convenience referred to as "target name." This same convention is employed for the initiator as well.

In the control data area 164 (FIG. 8) are also stored a plurality of NWC mailboxes 176 and a plurality of FCC mailboxes 178. Here, the NWC mailboxes (hereinbelow also designated as "NWC MB") 176 function as memory areas shared by the network controller 130 (FIG. 2) and the cores 122 of the CPU 122 (FIG. 5). In the control data area 164 of the memory 160, there are provided NWC mailboxes 176 associated respectively with the two cores 122 included in the CPU 120 in the controller 110. As illustrated in FIG. 8, each NWC mailbox 176 includes a command storage area for storing commands described later and a status storage area for storing status described later. In the description and drawings herein, in order to distinguish among individual NWC mailboxes 176, serial numbers (integers of 0 and above) in parentheses are appended to the end of the name and symbol of the NWC mailboxes 176. The NWC mailboxes 176 correspond to the second shared memory areas in the present invention.

The FCC mailboxes (hereinbelow also designated as "FCC MB") 178 function as memory areas shared by the FC controller 150 (FIG. 2) and the cores 122 of the CPU 120 (FIG. 5). In the control data area 164 of the memory 160, there are provided FC mailboxes 178 associated respectively with combinations of the cores 122 of the controller 110 in which the particular memory 160 is included with the plurality of FC controllers 150 within the storage system 1000 (FIG. 1). That is, the controller 110 in a storage node 100 includes FC mailboxes 178 associated not only with the FC controller 150 within its own storage node 100 but also with the FC controllers 150 in other storage nodes 100. As illustrated in FIG. 8, each FCC mailbox 178 includes a command storage area for storing commands described later and a status storage area for storing status described later. In the description and drawings herein, in order to distinguish among individual FCC mailboxes 178, serial numbers (integers of 0 and above) in parentheses are appended to the end of the name and symbol of the FCC mailboxes 178. The FCC mailboxes 178 correspond to the first shared memory areas in the present invention.

The control program area 166 is an area for storing control programs executed by the CPU 120 (FIG. 2). In the control program area 166, there are stored an operating system program 180 which is the basic program serving as the operating environment for execution of control programs, a TCP/IP program 181 for executing data exchange via the switch 300 (FIG. 1) using TCP/IP protocol, an iSCSI program 182 for interconnecting the host computers 200 and the storage nodes 100 (FIG. 1) by the iSCSI protocol, a target control program 183 for receiving commands from host computers 200 and controlling target processes such as parsing of received commands during handling of access to a logical unit 190 (FIG. 1) which is the iSCSI target from a host computer 200 which is the initiator, a RAID control program 184 for controlling the RAID composed of the plurality of disks 194 (FIG. 2) provided to storage nodes 100, a cache control program 185 for managing and controlling the disk cache established in the cache area 162, a disk control program 186 for carrying out disk control processes such as creating a command for a single disk 194, an FC control program 187 for controlling the FC controller 150 (FIG. 2) and exchanging commands and data with the disks 194 through the Fibre Channel 192, an LU control program 188 for setting up a RAID from the plurality of disks 194 and setting up therefrom logical units 190 which are logical memory areas, and a communication program 189 for carrying out communication with the name server 500 for the purpose of name management based on the iSCSI protocol standard.

As described above, in the data processing system 10 in this embodiment, it is assumed that the network connecting the host computers 200 and the storage nodes 100 is an IP network, and, it is assumed that the network protocol is the TCP/IP protocol and that the data protocol among the host computers 200 and the storage nodes 100 is the iSCSI protocol, which provides a block type I/O interface. However, the present invention is not limited to these. Where some other protocol is employed in the data processing system 10 prescribed programs depending on the protocol used will be stored in the control program area 166 of the memory 160 within the storage nodes 100.

FIG. 9 is a diagram showing an exemplary LU management table 172 (FIG. 8). FIG. 9 depicts the contents of the LU management table 172 stored in the control data area 164 (FIG. 8) in the memory 160 of the storage node 100*a* (FIG. 1). Information about the logical units 190 included in the storage node 100 is described in the LU management table 172 belonging to that particular storage node 100.

In the LU management table 172, the "LU" field indicates the ordinal number of each logical unit 190 (FIG. 1). The "RG" field indicates identifying information for the RAID group (RG) into which the logical units 190 have been configured, the "Start RG LBA" field indicates the starting RG LBA (FIG. 4) of the logical units 190 in the RG into which the logical units 190 have been configured, and the "LEN" field indicates capacity (in block units) of the logical units 190. The "Initiator" field indicates the initiator names of initiators allowed access to the logical units 190 (e.g. the initiators established in the host computers 200) and the "Target" field indicates the target names assigned to the logical units 190.

With the LU management table 172 it may be determined that the logical unit 190 "LUa0" (FIG. 1) included in the storage node 100*a*, for example, is present in the RAID group "RGa0"; has a starting RG LBA of 0; capacity of k number of blocks; an access-allowed initiator with the name "Init-a0" (e.g. host computer 200*a* (FIG. 1)); and a target name of "Targ-a0." The other LU management tables 172 in the data processing system 10 have content similar to that shown in FIG. 9.

Here, a single logical unit 190 is assigned a single target. On the other hand, there are instances in which several initiators are allowed access to a single target. When an initiator name is registered in the "Initiator" field of the LU management table 172, the target control program 183 (FIG. 8) prohibits access to the logical unit 190 by any initiator other than that having the registered initiator name. In the event that access to a single logical unit 190 from several initiators is to be allowed, multiple entries will be created in the "Initiator" field of the LU management table 172 and multiple initiator names will be registered. Where access restrictions are not imposed on a logical unit 190, i.e. where all initiators are allowed access to the logical unit 190, no name is registered in the "Initiator" field corresponding to the logical unit 190 (i.e. it is NULL).

The administration device 400 has an overall LU management table integrating the LU management tables 172 belonging to all of the storage nodes 100 within the storage system 1000 (FIG. 1).

FIG. 10 is a diagram showing an exemplary target management table 173 (FIG. 8). In FIG. 10, there is depicted a portion of the target management table 173 (specifically, the portion relating to the logical unit 190*a*0 (FIG. 1)) stored in the control data area 164 (FIG. 8) in the memory 160 of the storage node 100*a* (FIG. 1). The target management table 173 belonging to a storage node 100 describes information for the targets established in the logical units 190 of the storage node 100 in question.

In the target management table 173, the "Target" field indicates the name of the target managed by the entry in the table. The "Initiator" field indicates the name of the initiator allowed access to the target in question, the "Entity" field indicates an identifier identifying the entity of the device having the target, the "Portal" field indicates the portal in which the target in question is present, and the "Portal Gr" field indicates the portal group to which the portal belongs.

Here, a portal refers to a logical port defined by a physical port IP address and a TCP port number provided to the network controller 130 of a storage node 100 or to the network controller (not shown) of a host computer 200. Where a given physical port is provided with multiple TCP port numbers, multiple portals can be provided. A portal group consists of several portals grouped into a single group for use as a single communication path. More detailed description of the portal groups will be omitted in the description hereinbelow.

From the target management table 173, it can be ascertained, for example, that the target "Targ-a0" is present in the portal Ta0 of the storage node 100*a* (SNa), belongs to portal group TPGa0, and grants access to the initiator "Init-a0." The contents of other target management tables within the data processing system 10 are similar to the content shown in FIG. 10.

FIG. 11 is a diagram showing an exemplary initiator management table 210 (FIG. 1). The contents of the initiator management table 210a belonging to the host computer 200a (FIG. 1) are depicted in FIG. 11.

In the initiator management table 210, the "Initiator" field indicates the name of the initiator managed by the entry in the table. The "Entity" field indicates an identifier identifying the entity of the device having the initiator, the "Portal" field indicates the portal in which the initiator in question is present, and the "Portal Gr" field indicates the portal group to which the portal belongs.

From the initiator management table 210, it can be ascertained, for example, that the initiator "Init-a0" is present in the portal I0 of the host computer 200a and belongs to portal group Ia0. The contents of other initiator management tables within the data processing system 10 are similar to the content shown in FIG. 11.

Figure 12:
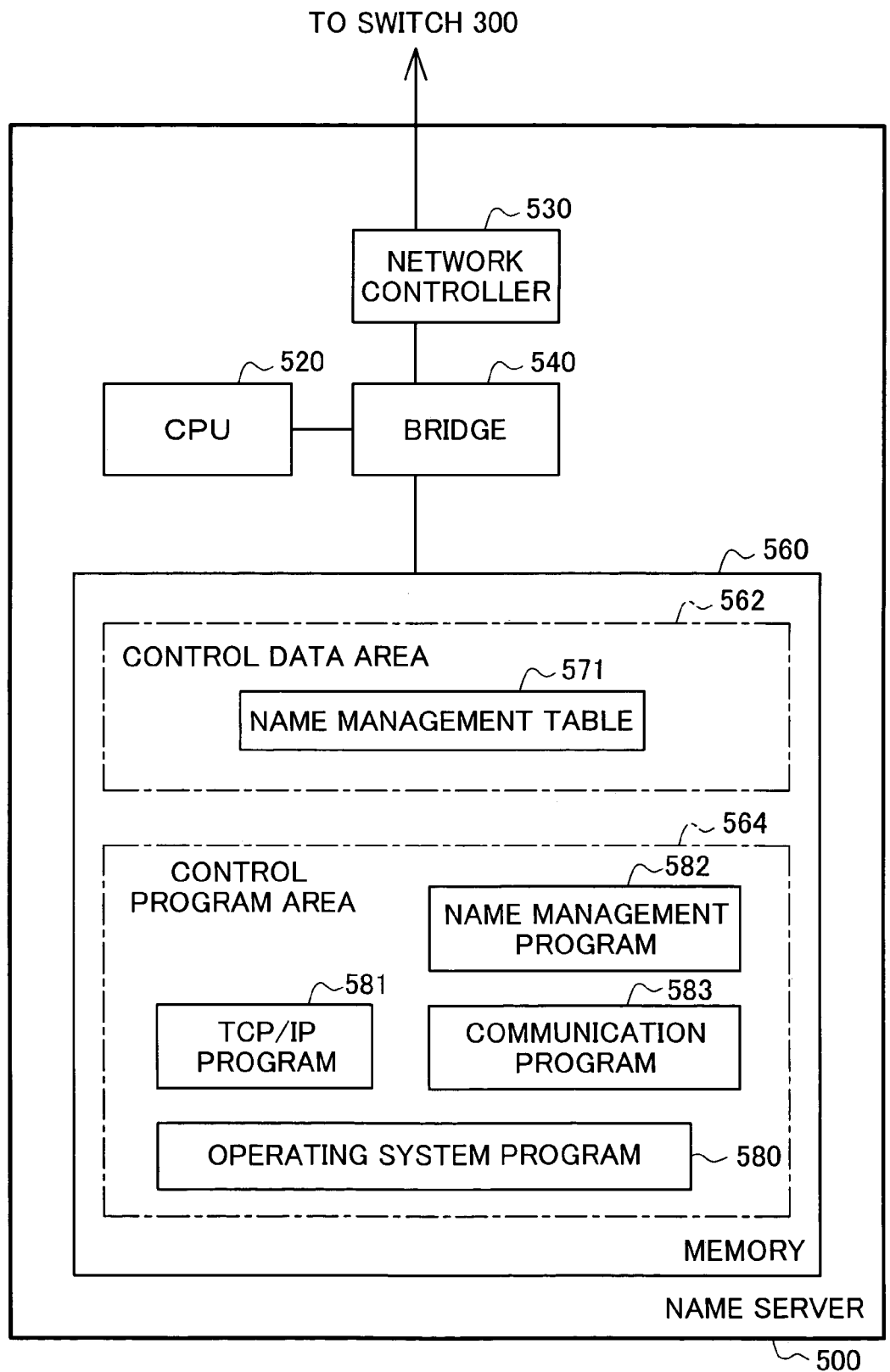
FIG. 12 is a diagram showing an exemplary configuration of the name server 500.

FIG. 12 is a diagram showing an exemplary configuration of the name server 500 (FIG. 1). The name server 500 includes a CPU 520 for overall control of the name server 500, a network controller 530 for connection to the switch 300, a bridge 540, and a memory 560. The bridge 540 controls transfer of data or programs between the CPU 520 and the memory 560, and transfer of data between the network controller 530 and the memory 560. The memory 560 stores control programs for execution by the CPU 520 and control data. The memory 560 has a control data area 562 and a control program area 564.

The control data area 562 of the memory 560 is an area for storing data of various kinds referred to when the CPU 520 executes control programs. In the control data area 562 is stored a name management table 571 in which are registered names of initiators and targets in iSCSI, and connections among initiators and targets. The name management table 571 includes the target management tables (FIG. 10) and the initiator management tables (FIG. 11) present in the data processing system 10. That is, the name server 500, utilizing the name management table 571, centrally manages the target management tables of the targets and the initiator management tables of the initiators present in the data processing system 10, as well as managing groups of initiators and targets. A table similar to the name management table 571 held by the name server is stored in the administration device 400.

The control program area 564 (FIG. 12) is an area for storing control programs for execution by the CPU 520. In the control program area 564 there are stored an operating system program 580 which is the basic program serving as the operating environment for execution of control programs, a TCP/IP program 581 for executing data exchange via the switch 300 using TCP/IP protocol, a name management program 582 for managing the names of iSCSI nodes (host computers 200 and storage nodes 100) connected to the switch 300 as well as controlling associations among initiators and iSCSI nodes, and a communication program 538 for carrying out communication for the purpose of name management of initiators (e.g. host computers 200) and targets (e.g. storage nodes 100) on the basis of the iSCSI protocol standards.

In this embodiment, the name server is assumed to be an iSCSI protocol-compliant iSNS (iSCSI Name Server), but when working the invention, the name server may be configured with name server standards other than iSNS.

Figure 13:
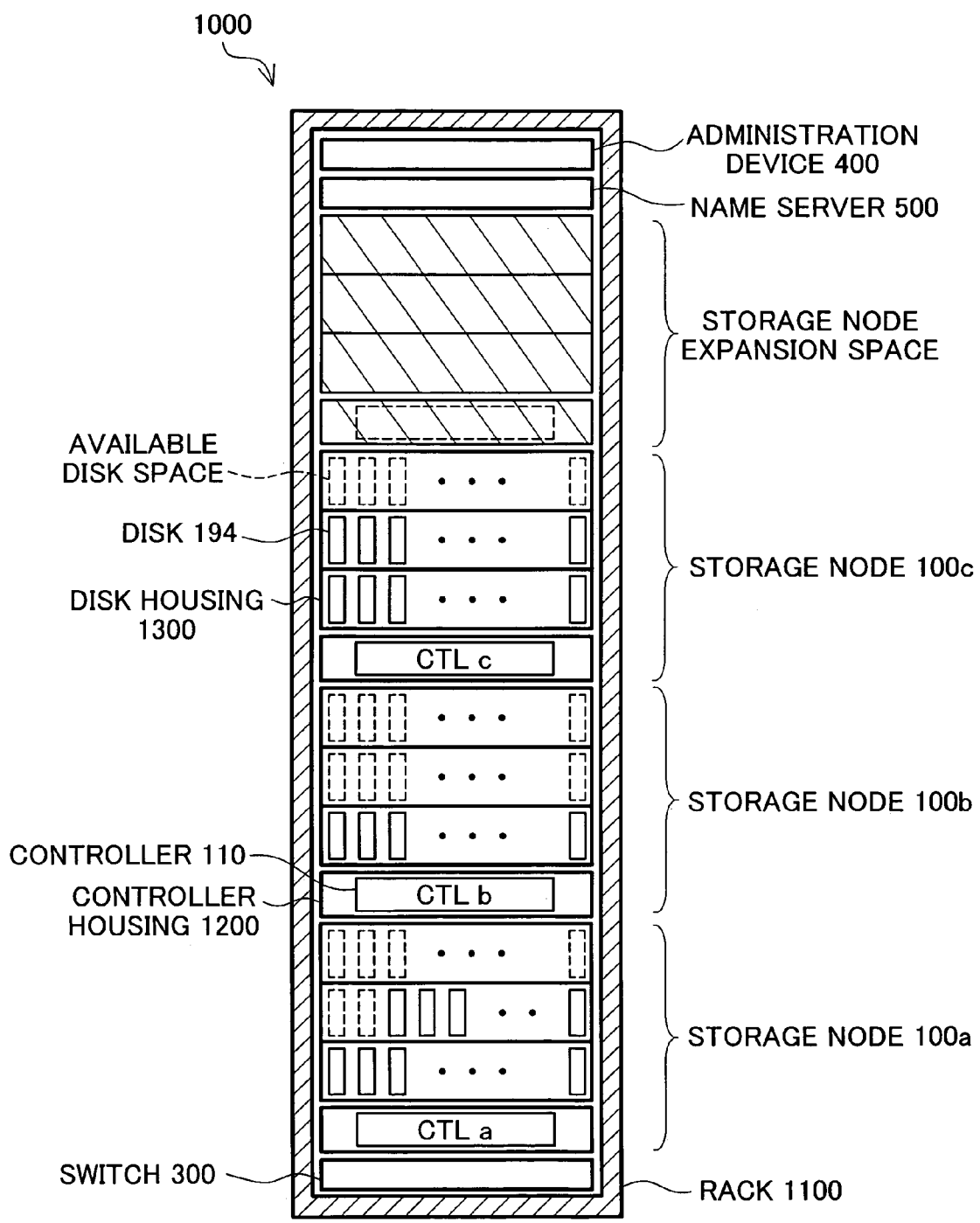
FIG. 13 is a diagram depicting an exemplary storage system 1000 in product form.

FIG. 13 is a diagram depicting an exemplary storage system 1000 in product form. The example in FIG. 13 is an example of a rackmount type. The switch 300 is located in the lowest bay of a 19-inch rack 1100, and in the three bays thereabove are installed the storage node 100a, the storage node 100b, and the storage node 100c, in that order. Each storage node 100 is composed of a controller housing 1200 and a disk housing 1300. The controller 110 is installed within the controller housing 1200, and the disks 194 are installed within the disk housing 1300. The spaces indicated by the broken lines in the disk housings 1300 of FIG. 13 indicate spaces in which disks 194 are not yet installed. In the bay above the storage node 100c, a space for storage node expansion, i.e. a space with no controller housing 1200 or disk housing 1300 currently installed (indicated by hatching) is provided, in the bay above which are installed the name server 500 and the administration device 400.

Figure 14:
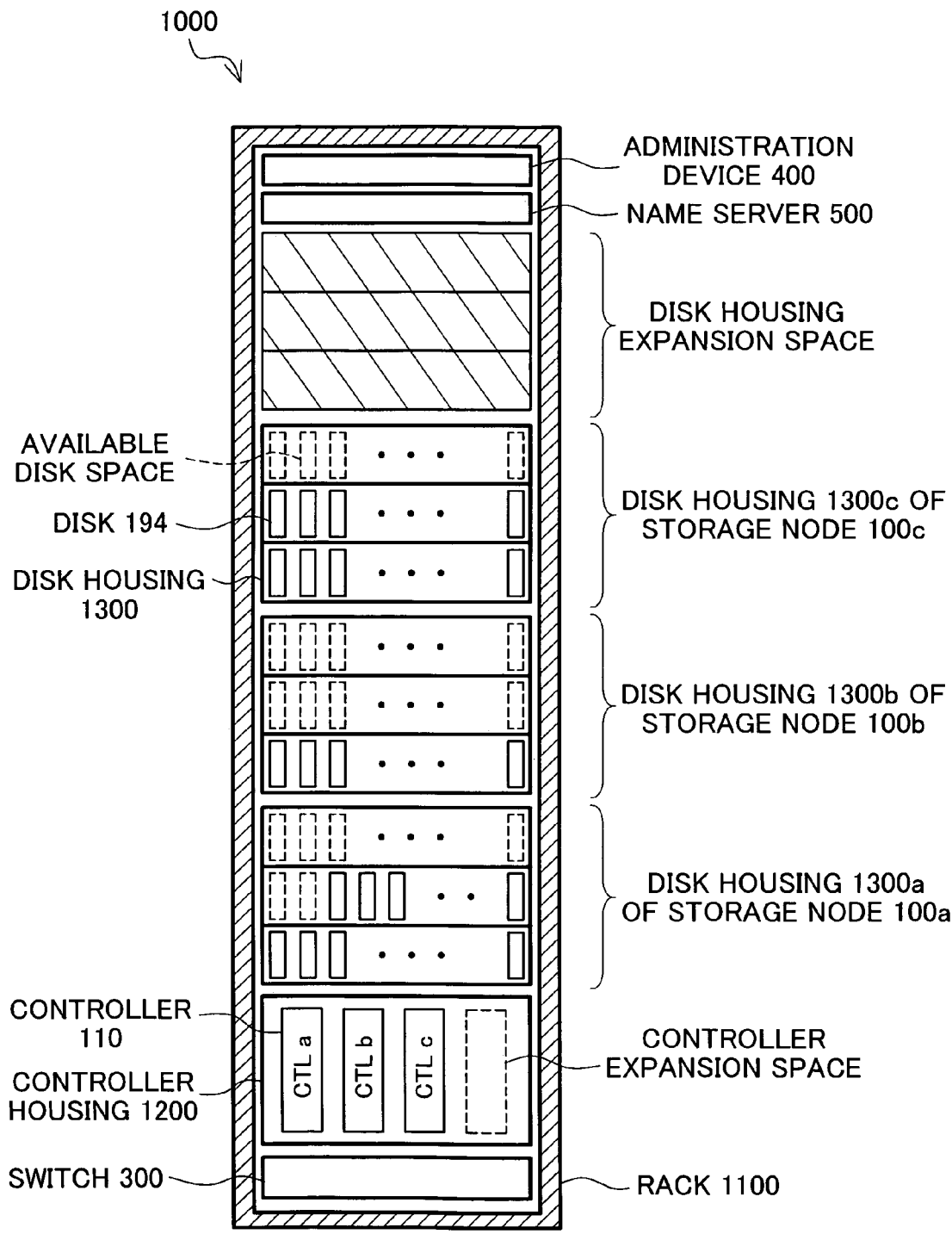
FIG. 14 is a diagram depicting another exemplary storage system 1000 in product form.

FIG. 14 is a diagram depicting another exemplary storage system 1000 in product form. The example of FIG. 14 is an example of a blade type. The switch 300 is located in the lowest bay of a 19-inch rack 1100. In the bay thereabove is installed a controller housing 1200 shared by all of the storage nodes 100, with all of the controllers 110 being installed inside the controller housing 1200. The space indicated by the broken lines in the controller housing 1200 of FIG. 14 is an expansion space for a controller 110. In the bays above the controller housing 1200, disk housings 1300 for the three storage nodes 100 are installed for use by, in order, storage node 100a (1300a), storage node 100b (1300b), and storage node 100c (1300c), with the disks 194 being installed within the disk housings 1300. The spaces enclosed by the broken lines in the disk housings 1300 of FIG. 14 indicate spaces in which disks 194 are not yet installed. In the bays above the disk housing 1300c of the storage node 100c, spaces for disk housing 1300 expansion, i.e. spaces with no disk housings 1300 currently installed (indicated by hatching) are provided; in the bay above that are installed the name server 500 and the administration device 400.

A-2. Host Command Execution Process

Figure 15:
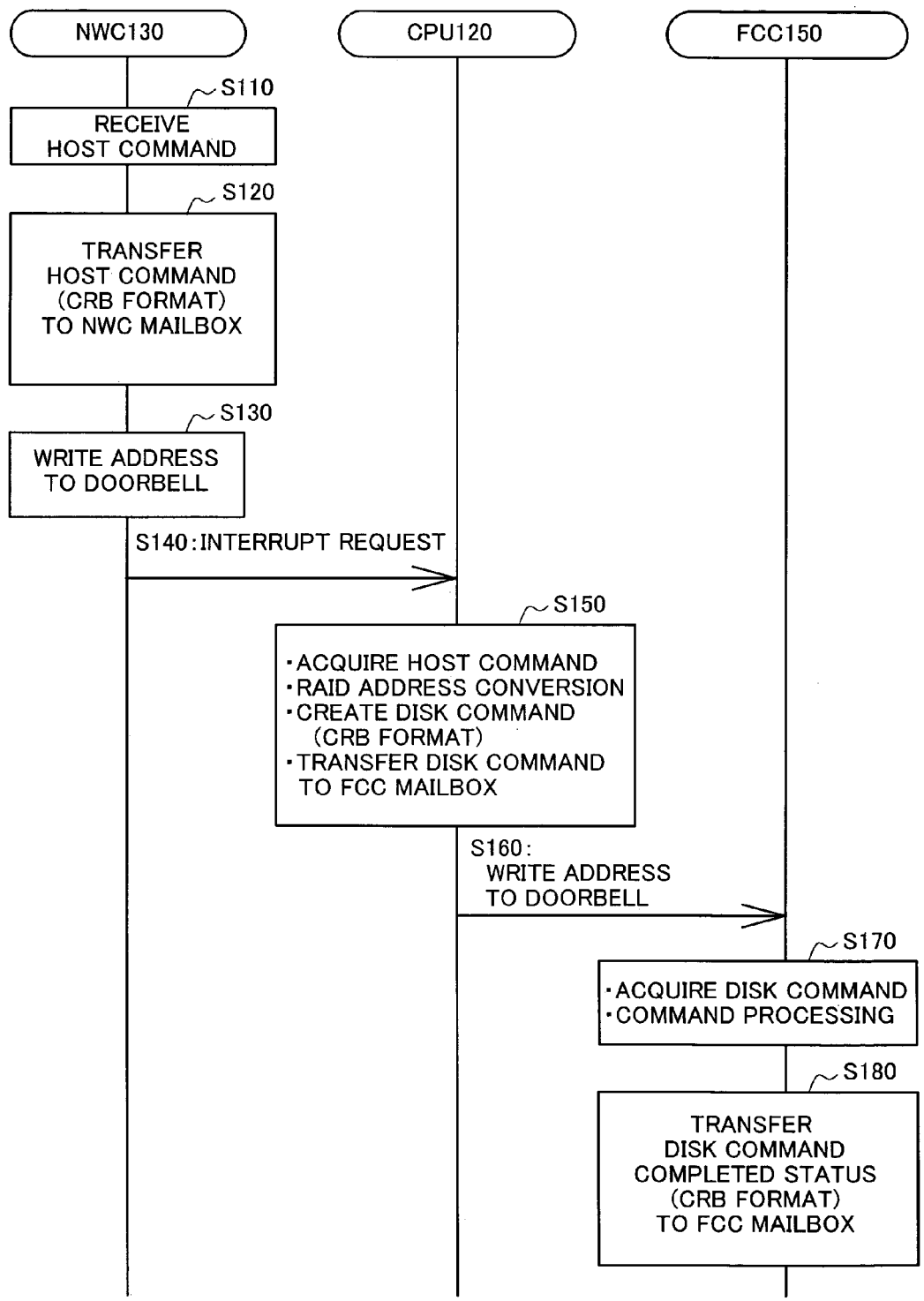
FIG. 15 is a diagram depicting the flow of the host command execution process in the storage nodes 100 of the storage system 1000.
Figure 16:
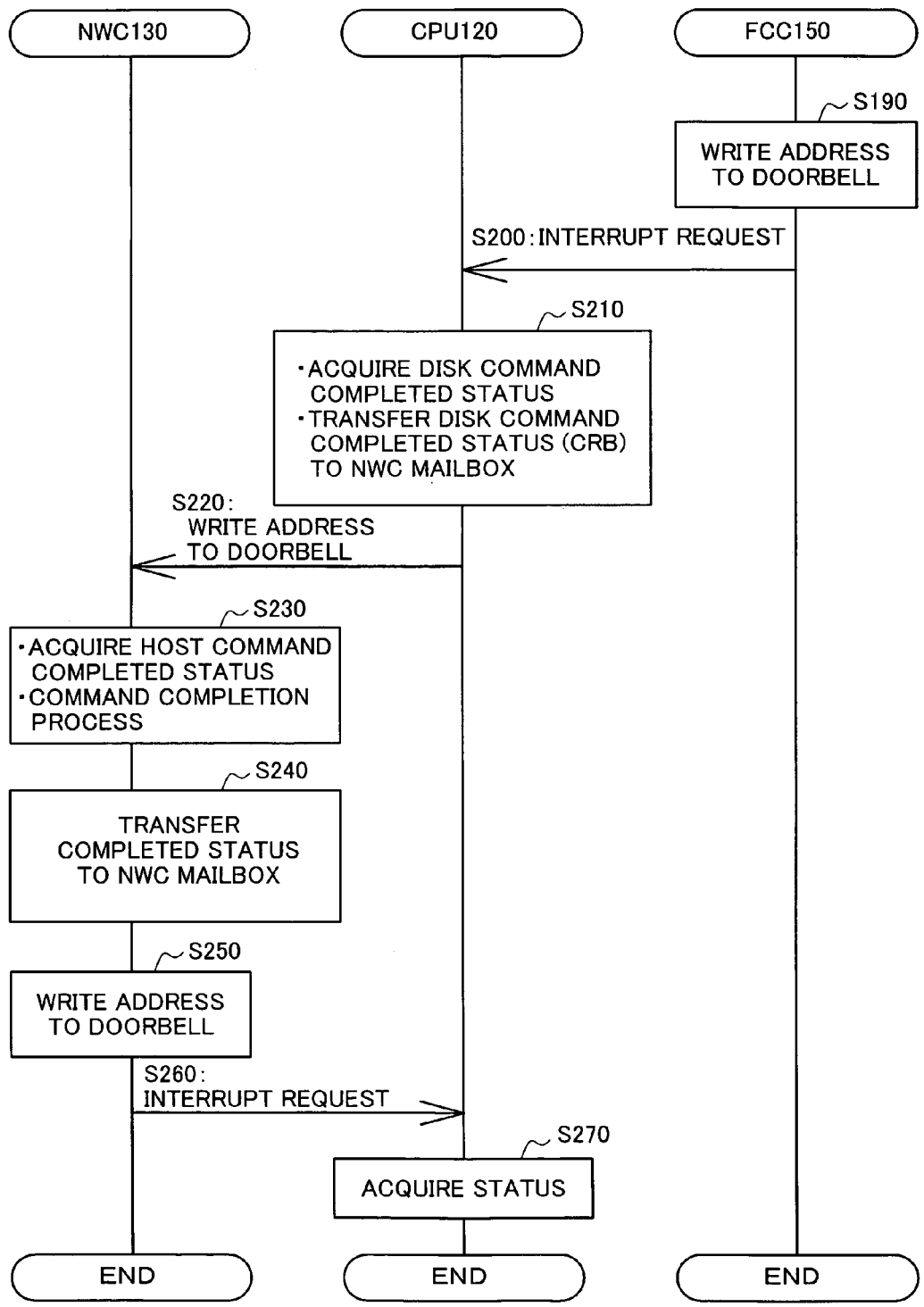
FIG. 16 is a diagram depicting the flow of the host command execution process in the storage nodes 100 of the storage system 1000.
Figure 17:
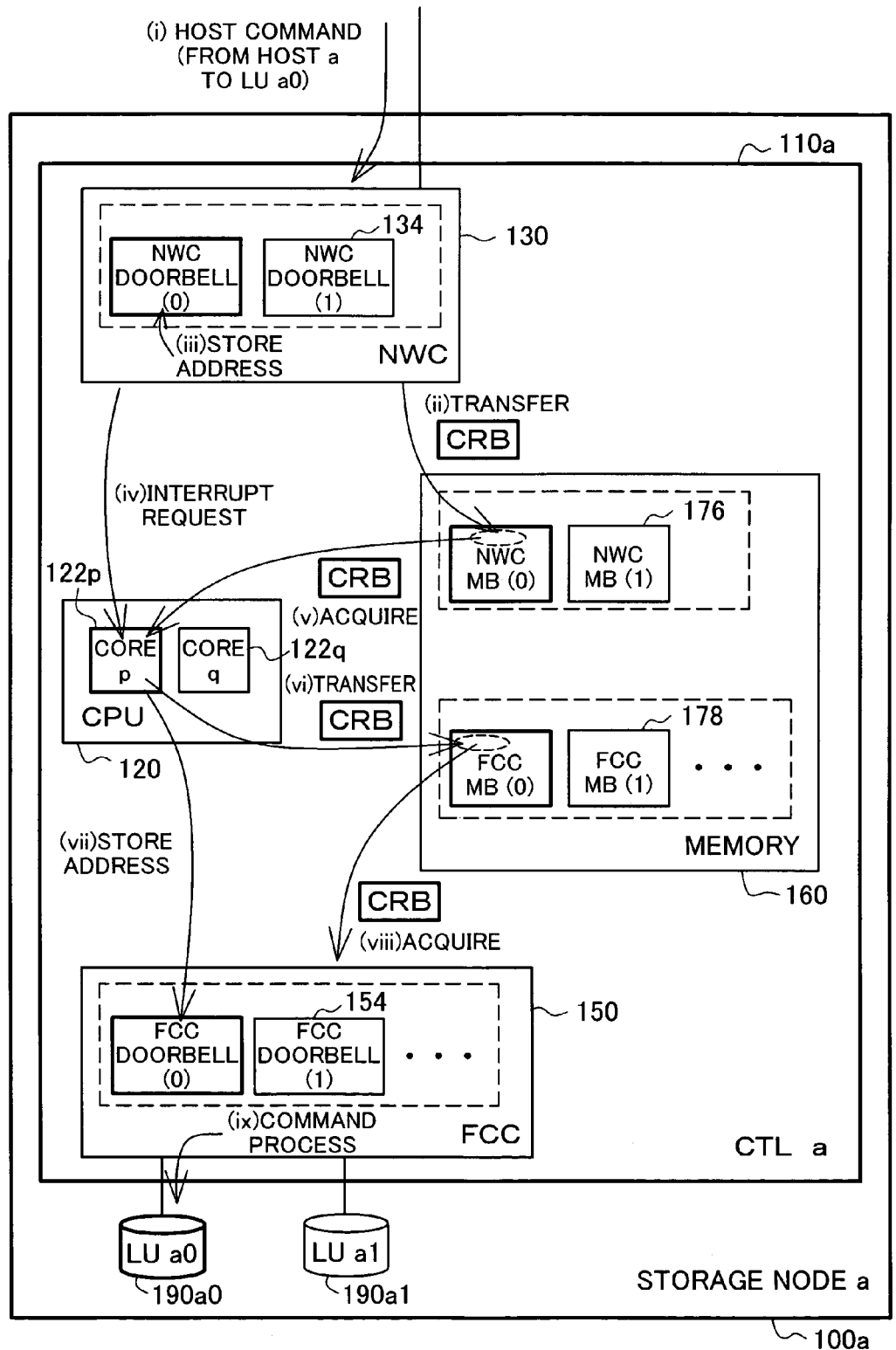
FIG. 17 is a diagram depicting in overview of the host command execution process in the storage nodes 100.
Figure 18:
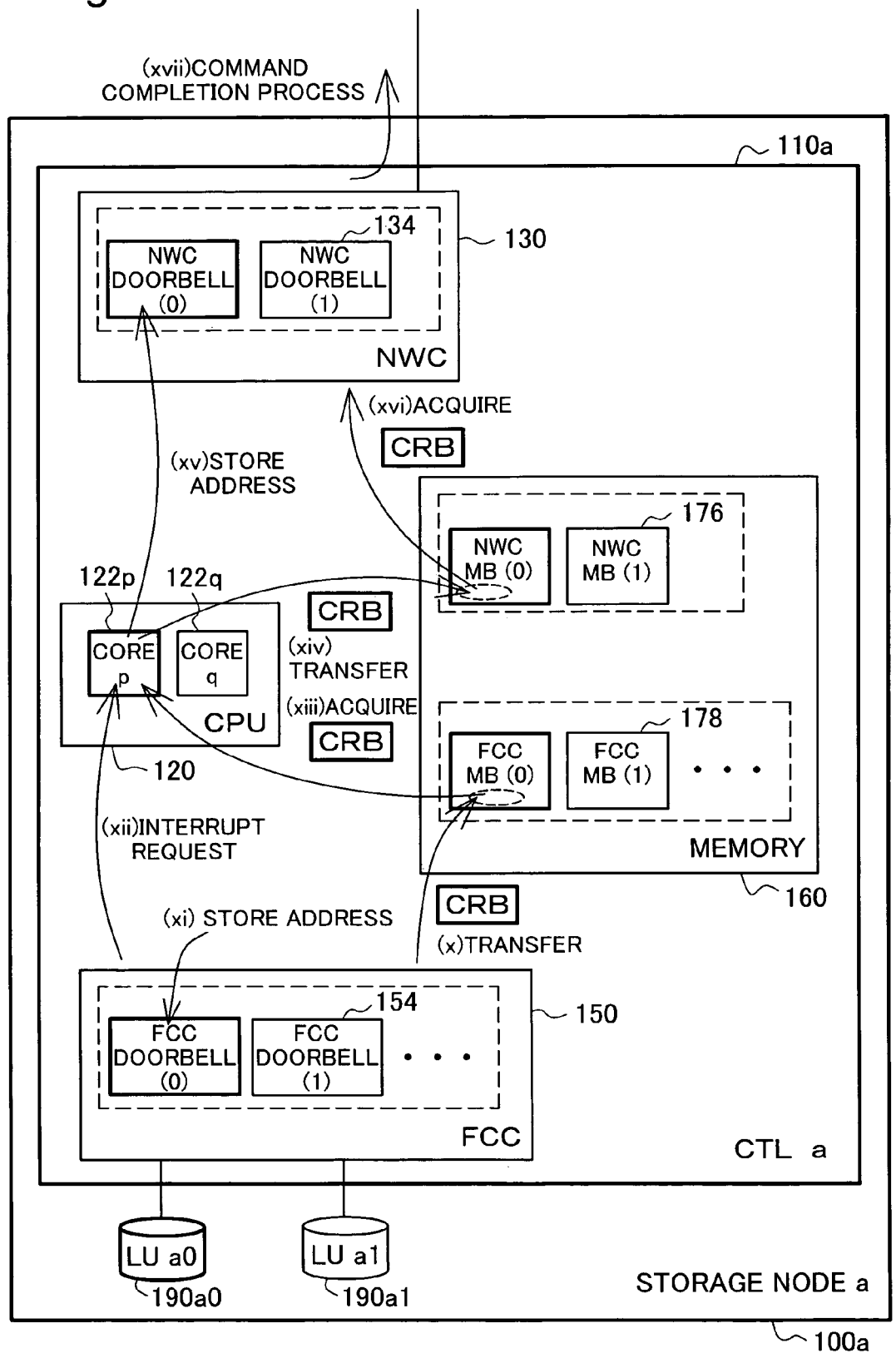
FIG. 18 is a diagram depicting in overview of the host command execution process in the storage nodes 100.

FIG. 15 and FIG. 16 are flowcharts depicting the flow of the host command execution process in the storage nodes 100 (FIG. 1) of the storage system 1000. FIG. 17 and FIG. 18 are diagrams depicting in overview of the host command execution process in the storage nodes 100. The host command execution process is a process executed by a storage node 100 which has received a host command from a host computer 200 (FIG. 1) and executed in accordance with the host command. Here, a host command refers to a command issued by a host computer 200 having an initiator (see FIG. 11) and addressed to a logical unit 190 of a storage node 100 having a target (see FIG. 10). Types of host commands are read commands for performing a read operation of data stored in a logical unit 190 and write commands for performing a write operation to a logical unit 190.

The description hereinbelow will take the example of the host command execution process when a host command addressed to the logical unit 190a0 (LU a0) (FIG. 1) has been issued by the host computer 200a (FIG. 1) to the storage node 100a. In FIG. 15 and FIG. 16, the process in the network controller (NWC) 130 is shown at left in the drawings, the process in the FC controller (FCC) 150 is shown at right in the drawings, and the process in the CPU 120 is shown at center in the drawings. In FIG. 17 and FIG. 18, portions of the internal arrangement of the storage node 100a (FIG. 1) have been omitted.

Here, let it be assumed that, in the storage node 100a (FIG. 17 and FIG. 18), among the several NWC mailboxes (NWC MB) 176, the NWC mailbox (0) is associated with the core 122p (core p) of the CPU 120 in the controller 110a (CTL a), and the NWC mailbox (1) is associated with the core 122*q* (core q). Similarly, among the several NWC doorbells 134, the NWC doorbell (0) is associated with the core 122*p*, and the NWC doorbell (1) is associated with the core 122*q*.

In the storage node 100*a* (FIG. 17 and FIG. 18), among the several FCC mailboxes (FCC MB) 178, the FCC mailbox (0) is associated with the combination of the core 122*p* of the CPU 120 in the controller 110*a* (CTL a) and the FC controller 150 in the controller 110*a*, and the FCC mailbox (1) is associated with the combination of the core 122*q* in the controller 110*a* and the FC controller 150 in the controller 110*a*. Among the several FCC doorbells 154, the FCC doorbell (0) is associated with the core 122*p* of the controller 110*a*, and the FCC doorbell (1) is associated with the core 122*q* of the controller 110*a*.

The description hereinbelow shall focus on the command process. Data transfer is carried out between the host computers 200 and the controllers 110 and between the controllers 110 and the disks 194, and while this process differs in the direction of transfer depending on the type of command, the fact of data transfer is the same between the command process and the status process. Data transfer is effected by DMA controllers supplied to the network controller 130 and the FC controller 150 without going through the CPU 120. This method of data transfer is no different from known methods, and need not be described here.

In Step S110 of FIG. 15, the network controller 130 receives a host command from the host computer 200*a* (FIG. 1) ((i) of FIG. 17). The logical unit 190 which is the target of this host command is the logical unit 190*a*0 (LU a0).

In Step S120, the network controller 130 transfers the received host command to an NWC mailbox (NWC MB) 176 in the memory 160 using DMA (Direct Memory Access) ((ii) of FIG. 17). Here, the network controller 130 has the function of assigning a core 122 of the CPU 120 for carrying out processing in response to the host command (hereinafter also referred to as the "assigned CPU core"), depending on the logical unit 190 which is the target of the host command. In the example of FIG. 17 and FIG. 18, it is assumed that the core 122*p* (core p) has been established as the core assigned to host commands addressed to the logical unit 190*a*0 (LU a0). At this time, the network controller 130 transfers the received host command to the NWC mailbox (0) which is the NWC mailbox 176 associated with the core 122*p*, whereby processing in response to the host command is assigned to the core 122*p*. In this embodiment, host commands are transferred in command request block (hereinafter also designated "CRB") format that is a type of data transfer format.

In this embodiment, it is assumed that a single core 122 is established as the assigned CPU core of each logical unit 190. In this embodiment, only the controller 110 to which the assigned CPU core belongs can update management information of the cache etc. and of the logical units 190. Other controllers 110 can also access the logical units 190, but during this process must ask the controller 110 to which the assigned CPU core belongs, to receive permission for updating management information of the cache, locking, or other process.

In Step S130, the network controller 130 stores, in an NWC doorbell 134, the address of the host command that was transferred to the NWC mailbox 176 ((iii) of FIG. 17). At this time, the NWC doorbell 134 used will be the NWC doorbell 134 (NWC doorbell 134 (0)) associated with the core 122*p* which is the assigned CPU core of the host command.

In Step S140, the network controller 130 issues an interrupt request to the core 122*p* which is the assigned CPU core of the host command ((iv) of FIG. 17). The interrupt lines 138 (FIG. 7) associated with the core 122*p*0 are used to issue the interrupt request.

In Step S150, the core 122*p* of the CPU 120 refers to the address that has been stored in the NWC doorbell 134, and acquires the host command stored in the NWC mailbox 176 ((v) of FIG. 17). The core 122*p*, by executing the RAID control program 184 (FIG. 8), also carries out conversion between the logical unit 190 addressed by the acquired host command and a disk 194 (hereinafter also termed "RAID address conversion"). Next, the core 122*p*, by means of executing the disk control program 186 (FIG. 8), creates a disk command for the disk 194, on the basis of the host command. The disk command may include, for example, information representing the type of command, the identifier of the target disk, LBA, transfer size, a DMA list, and so on. In this embodiment, disk commands are also created in command request block (CRB) format. The core 122*p* transfers the created disk command to an FCC mailbox 178 in the memory 160 ((vi) of FIG. 17). The FCC mailbox 178 used at this time is the FCC mailbox 178 (FCC mailbox (0)) associated with the combination of the core 122*p* which is the assigned CPU core and the FC controller 150 connected to the logical unit 190 addressed by the host command.

In Step S160, the core 122*p* stores the disk command that has been transferred to the FCC mailbox 178, in an FCC doorbell 154 ((vii) of FIG. 17). The FCC doorbell 154 used at this time is the FCC doorbell 154 (FCC doorbell 154 (0)) associated with the core 122*p* which is the assigned CPU core.

In Step S170, the FC controller 150, referring to the address stored in the FCC doorbell 154, acquires the disk command stored in the FCC mailbox 178 using DMA ((viii) of FIG. 17). In accordance with the acquired command, the FC controller 150 then executes the command process on a disk 194 making up the logical unit 190 ((ix) of FIG. 17).

In Step S110 through Step S170 described above, processing on the disk 194 making up the logical unit 190, in accordance with the host command issued by the host computer 200, is completed. Next, beginning with Step S180, the host computer 200 is notified of completion of processing on the disk 194 in accordance with the command. The NWC mailbox 176, NWC doorbell 134, FCC mailbox 178, and FCC doorbell 154 used at this time are the same as those used in Step S110 through Step S170.

In Step S180, the FC controller 150 creates a disk command completed status in CRB format, and transfers it to the FCC mailbox 178 ((x) of FIG. 18). At this time, the FCC mailbox (0) is used.

In Step S190 of FIG. 16, the FC controller 150 determines the address of disk command completed status stored in the FCC mailbox 178, and stores the address in the FCC doorbell 154 ((xi) of FIG. 18). At this time, the FCC doorbell (0) is used.

In Step S200, the FC controller 150 issues an interrupt request to the core 122*p* ((xii) of FIG. 18). The interrupt lines 158 (FIG. 6) associated with core 122*p* are used to issue the interrupt request.

In Step S210, the core 122*p* of the CPU 120, referring to the address stored in the FCC doorbell 154, acquires the disk command completed status stored the FCC mailbox 178 ((xiii) of FIG. 18). The core 122*p* also creates a host command completed status (in CRB format) on the basis of the disk command completed status, and transfers it to the NWC mailbox 176 ((xiv) of FIG. 18). At this time, the NWC mailbox (0) is used.

In Step S220, the core 122p of the CPU 120 determines the address of the host command completed status that was transferred to the NWC mailbox 176, and stores the address in the NWC doorbell 134 ((xv) of FIG. 18). At this time, the NWC doorbell (0) is used.

In Step S230, the network controller 130, referring to the address stored in the NWC doorbell 134, acquires the host command completed status stored in the NWC mailbox 176 using DMA ((xvi) of FIG. 18). The network controller 130, using the acquired host command completed status, also performs a command completion process on the host computer 200 ((xvii) of FIG. 18). In Step S180 through Step S230, the command completion process on the host computer 200 is completed.

The process beginning with Step S240 is a process for notifying the core 122p of the CPU 120 by the network controller 130 that processing for the host computer 200 is complete. In Step S240, the network controller 130 transfers the completed status to the NWC mailbox 176. In Step S250, the network controller 130 determines the address of the completed status that has been transferred to the NWC mailbox 176, and stores the address in the NWC doorbell 134. In Step S260, the network controller 130 issues an interrupt request to the core 122p. In Step S270, the core 122p of the CPU 120 acquires the completed status from the NWC mailbox 176. With this, the host command execution process is complete.

A-3. Switching Assigned CPU Core Within a Controller

Figure 19:
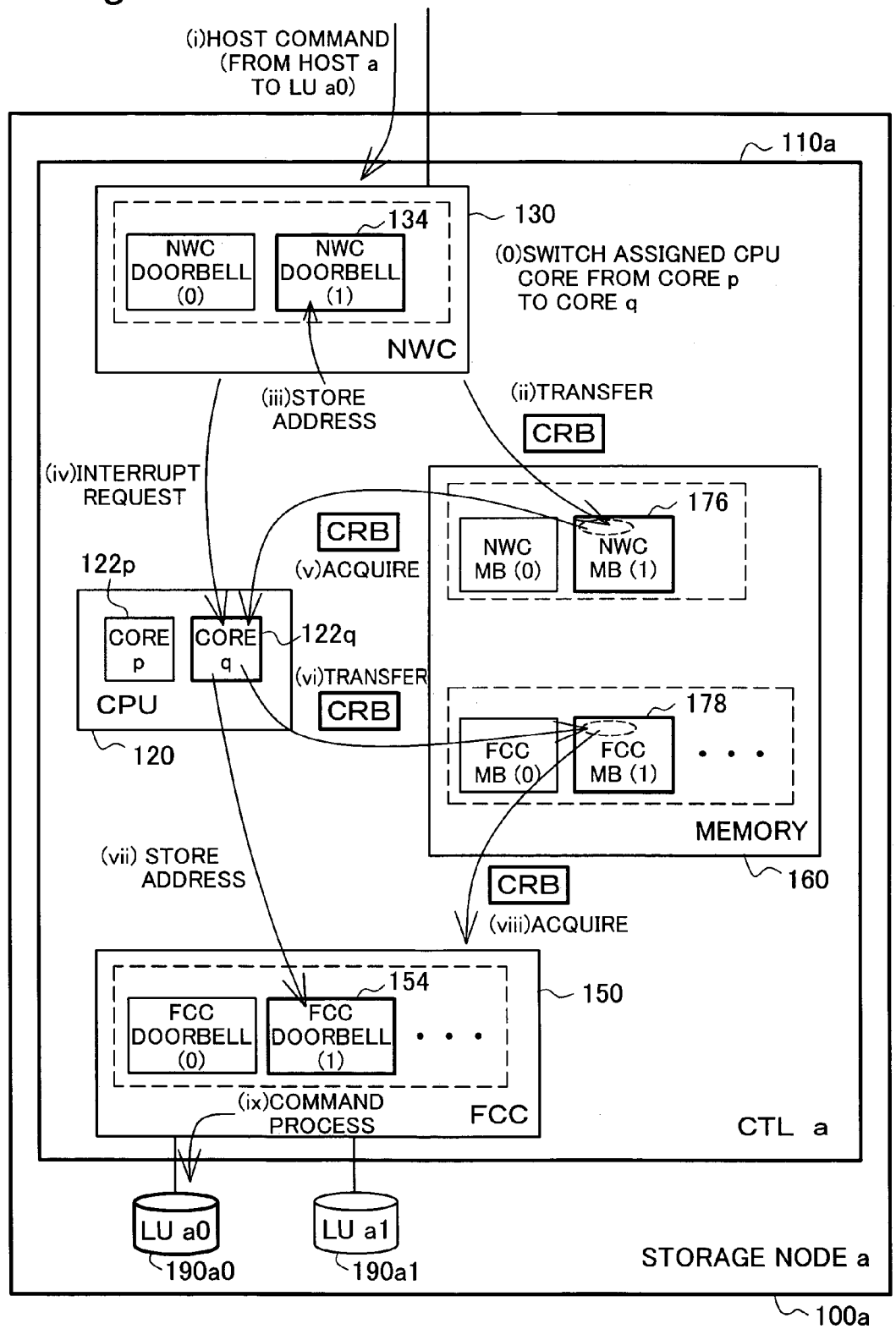
FIG. 19 is a diagram depicting in overview the host command execution process after switching the assigned CPU core within a controller.

FIG. 19 is a diagram depicting in overview the host command execution process after switching the assigned CPU core within the controller. In FIG. 19, processes within the host command execution process, corresponding to the portion depicted FIG. 17 are shown.

Switching the assigned CPU core refers to switching the core assigned to host commands addressed to a given logical unit 190, from a certain core 122 to another core 122 in the same controller 110. Such switching is done, for example, in order to distribute the load on the cores 122 within the controller 110 of a storage node 100. For example, a user, referring to the load on each core 122 in the controller 110, as shown on the display screen of the administration device 400, may issue a command to execute switching of the assigned CPU core within the controller. This point will be discussed later.

The example of FIG. 19 is an example wherein the CPU core assigned to host commands addressed to the logical unit 190 a0 (LU a0) is changed from the core 122p (core p) of the controller 110a (CTL a) to the core 122q (core q) of the same controller 110a (see (0) of FIG. 19).

Here, as mentioned previously, in the storage nodes 100 in this embodiment, the network controller 130 has the function of assigning the assigned CPU core of the host command, depending on the logical unit 190 to which the host command is addressed. Accordingly, switching the assigned CPU core within the controller can be achieved by modifying the settings of the network controller 130.

Specifically, the settings of the network controller 130 are modified so that when the network controller 130 receives a host command address to the logical unit 190a0, the host command is transferred to the NWC mailbox 176 (NWC mailbox (1)) associated with the core 122q.

The subsequent host command execution process is executed in the same manner as the process before switching the assigned CPU core within the controller (see FIG. 15-FIG. 18). The only difference between the two is whether the NWC mailbox 176, the NWC doorbell 134, the FCC mailbox 178, the FCC doorbell 154, the interrupt line 138 (FIG. 7), and the interrupt line 158 (FIG. 6) are those associated with the core 122p, or those associated with the core 122q. That is, as depicted in FIG. 19, in the host command execution process after switching the assigned CPU core within the controller, the elements associated with the core 122q (namely, the NWC mailbox (1), the NWC doorbell (1), the FCC mailbox (1), and the FCC doorbell (1)) are used. This applies as well to the processes (not shown) within the host command execution process, corresponding to the portion depicted FIG. 18.

As discussed above, in the storage nodes 100 of the storage system 1000 in this embodiment, by modifying the settings of the network controller 130, it is possible to switch the assigned CPU core within a controller 110. Even after the switch, the host command execution process can be carried out using the same sequence, the same disk process, the same network controller 130, and the same FC controller 150 as before the switch. There is no need to change the path between the host computer 200 and the network controller 130, or the path between the FC controller 150 and the disk 194, in association with switching of the assigned CPU core for host commands. Accordingly, in the storage system 1000 in this embodiment, switching of the core 122 for executing processing in response to a command from a host computer can be achieved easily.

A-4. Address Spaces and Memory Maps in Controllers 110 of Storage Nodes 100

Figure 20:
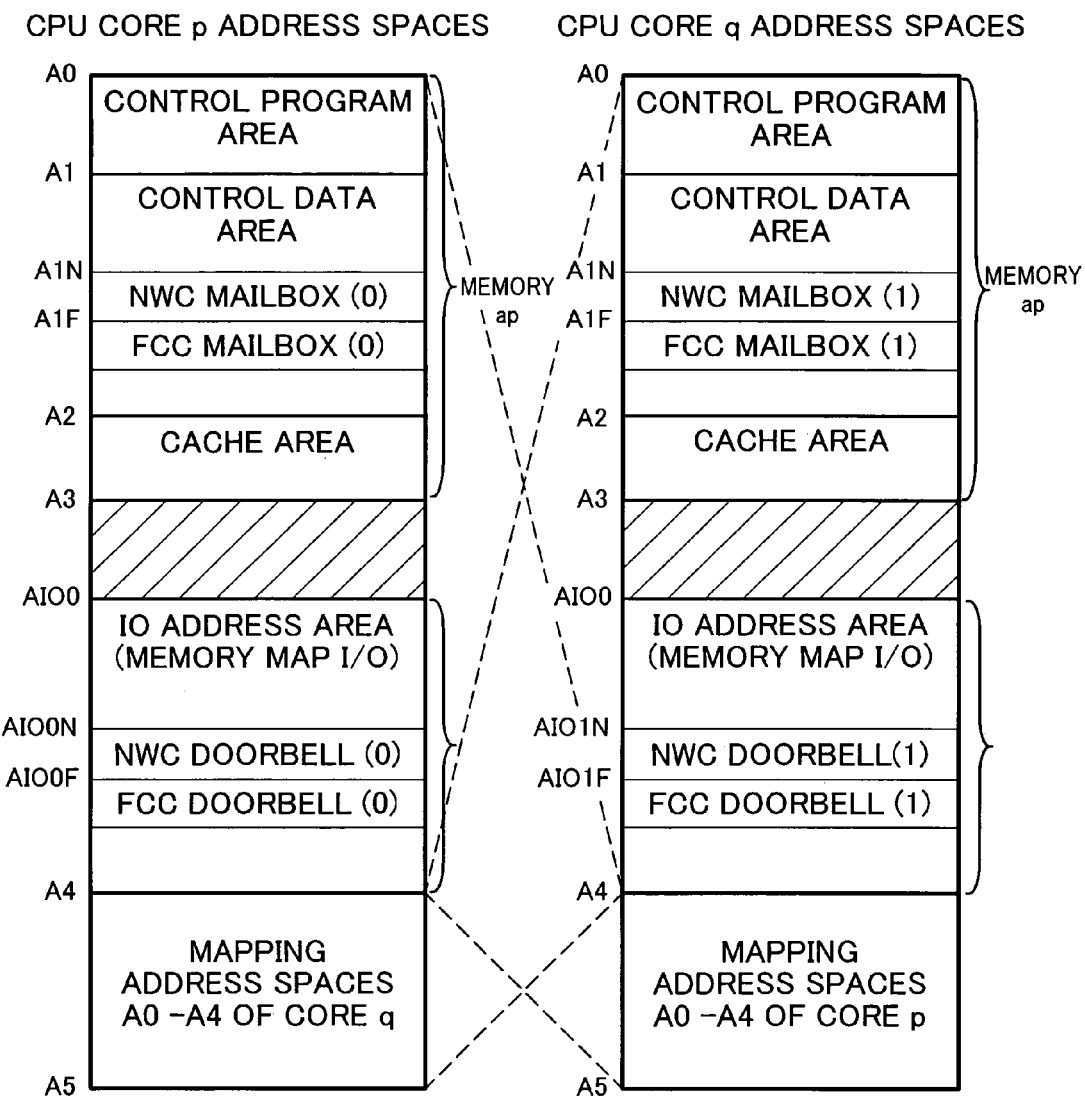
FIG. 20 is a diagram showing address spaces within the controller 110 of a storage node 100.

FIG. 20 is a conceptual illustration of address spaces within the controller 110 of a storage node 100. The address spaces of the core 122p (core p) within the controller 110a (FIG. 1) of the storage node 100a are shown at left in FIG. 20, and the address spaces of the core 122q (core q) within the same controller 110a are shown at right in FIG. 20.

As shown in FIG. 20, an area for the use of the core 122p (hereinafter denoted also as "memory ap") in the memory 160 (FIG. 8) of the controller 110a is mapped to addresses "A0" through "A3." of the address spaces of the core 122p. An IO address area (memory mapped I/O) is mapped to addresses "AIO0" through "A4."

As shown in FIG. 20, a control program area, a control data area, and a cache area are mapped to the memory ap area of the address spaces of core 122p (see FIG. 8). An NWC mailbox 176 (NWC mailbox (0)) associated with the core 122p and an FCC mailbox 178 (FCC mailbox (0)) associated with the core 122p are mapped in the control data area.

An NWC doorbell 134 (NWC doorbell (0)) associated with the core 122p and an FCC doorbell 154 (FCC doorbell (0)) associated with the core 122p are mapped in the IO address area in the address spaces of core 122p.

In the same manner as with the address spaces of the core 122p, an area for the use of the core 122q (hereinafter denoted also as "memory aq") in the memory 160 of the controller 110a and a IO address area are mapped to addresses "A0" through "A4" of the address spaces of the core 122q shown at right in FIG. 20. The NWC mailbox 176, the FCC mailbox 178, the NWC doorbell 134, and the FCC doorbell 154 mapped in the address spaces of the core 122 p are those associated with the core 122q.

Addresses "A0" through "A4" of the address spaces of the core 122q are mapped to addresses "A4" through "A5" of the address spaces of the core 122p. Similarly, addresses "A0" through "A4" of the address spaces of the core 122p are mapped to addresses "A4" through "A5" of the address spaces of the core 122q. The address spaces of the core 122p and the core 122*q* in the controllers 110 of the other storage nodes 100 (storage node 100*b* and so on) are the same as the address spaces shown in FIG. 20.

Figure 21:
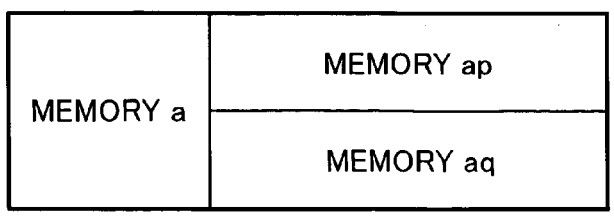
FIG. 21 is a diagram showing a memory map in the controller 110 of a storage node 100.

FIG. 21 is a diagram showing a memory map in the controller 110 of a storage node 100. FIG. 21 shows the memory map of the memory 160 in the controller 110*a* (FIG. 1) of the storage node 100*a*. As shown in FIG. 21, the memory map of the memory 160 of the controller 110*a* (hereinafter denoted also as "memory a") is partitioned into a memory area "memory ap" for the use of the core 122*p* and a memory area "memory aq" for the use of the core 122*q*. The memory maps of the memories 160 in the controllers 110 of the other storage nodes 100 (storage node 100*b* and so on) are the same as the memory maps shown in FIG. 21.

A-5. Address Spaces and Memory Maps of the Storage System 1000

Figure 22:
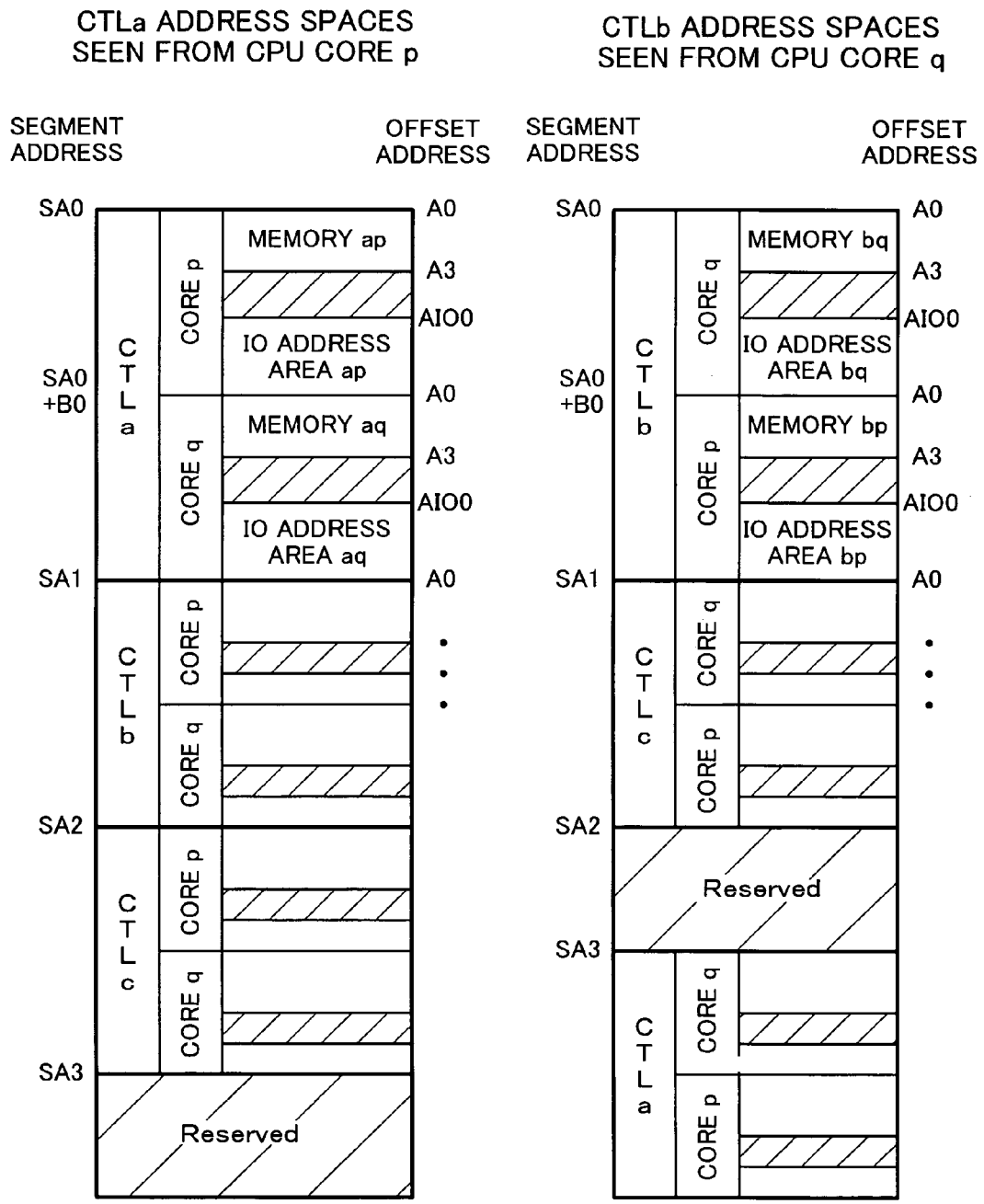
FIG. 22 is a diagram showing address spaces in the storage system 1000.

FIG. 22 is a conceptual illustration of address spaces in the storage system 1000 (FIG. 1). The address spaces of the storage system 1000 viewed from the core 122*p* (core p) in the controller 110*a* (CTL a (FIG. 1)) of the storage node 100*a* are shown at left in FIG. 22, and the address spaces of the storage system 1000 viewed from the core 122*q* (core q) in the controller 110*b* (CTL b) of the storage node 100*b* are shown at right in FIG. 22.

As shown in FIG. 22, in the address spaces of the storage system 1000 viewed from the core 122*p* of the controller 110*a*, the address spaces of the core 122*p* (core p) of the controller 110*a* and the address spaces of the core 122*q* (core q) of the controller 110*a* are mapped to segment addresses "SA0" to "SA1" (see FIG. 20).

In the address spaces of the storage system 1000 viewed from the core 122*p* of the controller 110*a*, the address spaces of the core 122*p* (core p) and the core 122*q* (core q) of the controller 100*b* (FIG. 1) are mapped to segment addresses "SA1" to "SA2", and the address spaces of the core 122*p* (core p) and the core 122*q* (core q) of the controller 110*c* (FIG. 1) are mapped to segment addresses "SA2" to "SA3." The area below segment address "SA3" is a reserved area for use during expansion of the storage nodes 100.

In this way, in the address spaces of the storage system 1000 viewed from the core 122*p* of the controller 110*a*, the address spaces of the cores 122 in all of the controllers 110 within the storage system 1000, including the controllers 110 (controllers 110*b* and so on) of other storage nodes 100 are mapped in an ordered fashion. Such mapping is made possible by means of all of the controllers 110 within the storage system 1000 being interconnected by the inter-node controller coupling unit 102. Accordingly, the core 122*p* of the controller 110*a* can refer to all of the mapped spaces. Address conversion in mapping is carried out in the bridge 140 (FIG. 3).

The address spaces of the storage system 1000 viewed from the core 122*q* of the controller 110*b* shown at right in FIG. 22 are similar to the address spaces viewed from the core 122*p* of the controller 110*a* shown at left in FIG. 22. However, the order of the mapped spaces is different. The address spaces of the storage system 1000 viewed from other cores 122 of other controllers 110 not shown in FIG. 22 are similar.

Figure 23:
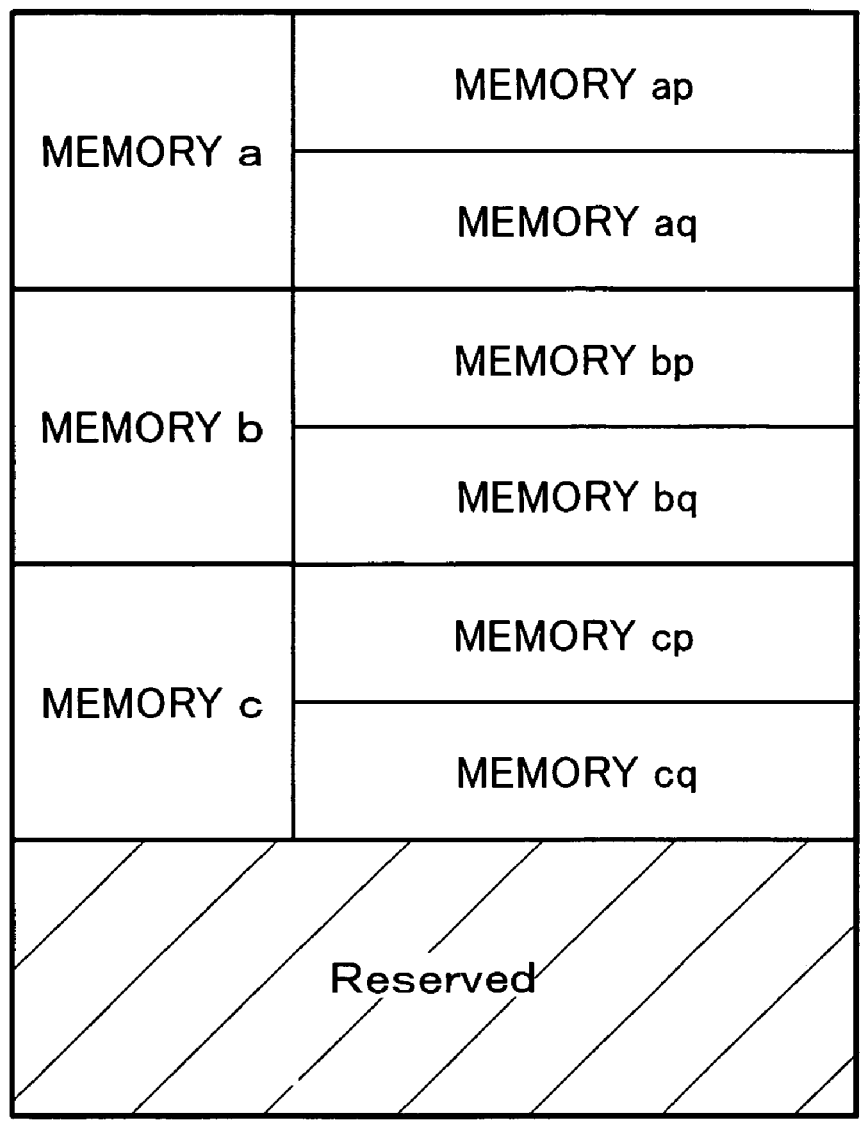
FIG. 23 is a diagram showing the memory map of the storage system 1000.

FIG. 23 is a diagram showing a memory map of storage system 1000 (FIG. 1). FIG. 23 shows the memory map of the storage system 1000 viewed from the controller 110*a* of the storage node 100*a*. As shown in FIG. 23, in the memory map viewed from the controller 110*a* are mapped, in addition to the area of the memory 160 (memory a) of the controller 110*a*, the areas of the memories 160 (memory b and memory c) of the other controllers 110 in the storage system 1000. That is, the controller 110*a* can ascertain, as a single memory space, a memory space that combines the areas of the memories 160 of all of the controllers 110 in the storage system 1000. Thus, it is possible for each core 122 in the controller 110*a* to access all of the memory spaces in the storage system 1000. The memory maps viewed from the controllers 110 of the other storage nodes 100 of the storage system 1000 are similar.

A-6. Inter-Node Switching of Assigned CPU Core

In the storage system 1000 (FIG. 1) in this embodiment, since each core 122 (FIG. 5) of the controller 110 of each storage node 100 has address spaces and a memory map like those shown in FIG. 22 and FIG. 23, it is possible to achieve inter-node switching of the assigned CPU core. Inter-node switching of an assigned CPU core refers to changing the assigned CPU core of a host command addressed to a given logical unit 190, from a certain core 122 to a core 122 included in a storage node 100 different from the storage node 100 that includes the first core 122. Typically, the assigned CPU core of a host command addressed to a given logical unit 190 will be a core 122 of the CPU 120 included in the storage node 100 which includes the logical unit 190 in question. In this case, by carrying out inter-node switching of the assigned CPU core, it is possible to establish a core 122 included in a storage node 100 different from the storage node 100 that includes the logical unit 190 address by the host command, as the assigned CPU core for the command in question. That is, a core 122 of a CPU 120 can carry out processing in response to a host command address to a logical unit 190 in a storage node 100 different from the storage node 100 to which it belongs. Such switching is done, for example, in order to distribute the load among storage nodes 100. For example, a user, referring to the load on the cores 122 in the storage nodes 100, as shown on the display screen of the administration device 400 (FIG. 1), may issue a command to execute switching of the assigned CPU core between nodes. This point will be discussed later.

Figure 24:
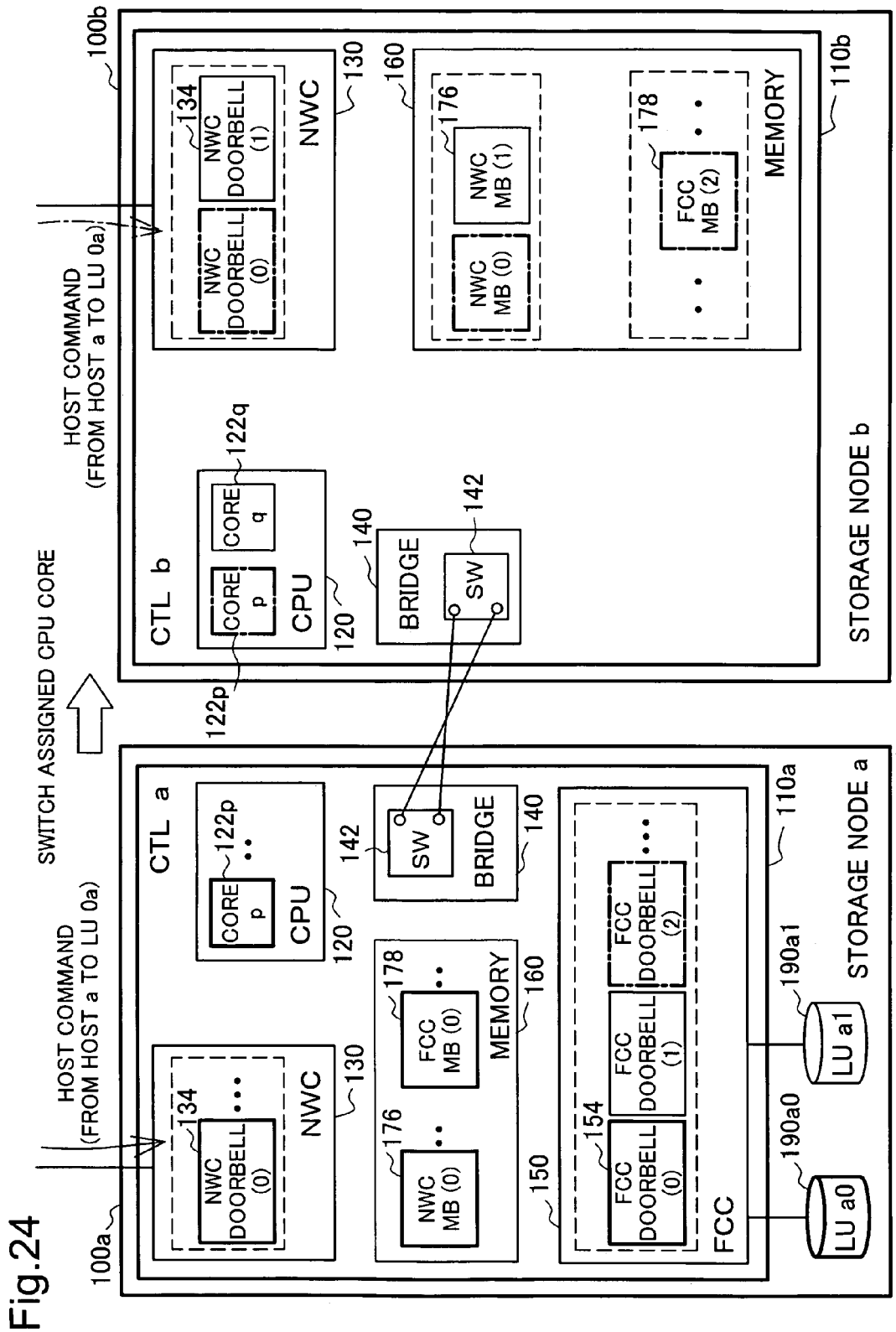
FIG. 24 is a diagram showing an example of inter-node switching of assigned CPU core.

FIG. 24 is a diagram showing an example of inter-node switching of assigned CPU core. FIG. 24 shows the internal arrangement of the storage node 100*a* and the storage node 100*b* of the storage system 1000 (FIG. 1), with some portions omitted. In the example of FIG. 24, it is assumed that prior to inter-node switching of the assigned CPU core, the core assigned to host commands addressed to the logical unit 190*a*0 (LU a0) within the storage node 100*a* is the core 122*p* (core p) in the controller 110*a* of the storage node 100*a*. At this time, the core 122*p* in the storage node 100*a* carries out the host command execution process using the NWC mailbox 176 (NWC mailbox (0)), NWC doorbell 134 (NWC doorbell (0)), FCC mailbox 178 (FCC mailbox (0)), and FCC doorbell 154 (FCC doorbell (0)) associated with the core 122*p* in the storage node 100*a* itself.

By means of inter-node switching of the assigned CPU core, the core assigned to host commands addressed to the logical unit 190*a*0 is changed from the core 122*p* in the storage node 100*a* to the core 122*p* (core p) of the CPU 120 in the controller 110*b* of the storage node 100*b*. In the example of FIG. 24, within the controller 110*b*, the NWC mailbox 176 associated with the core 122*p* is the NWC mailbox (0), and the NWC doorbell 134 associated with the core 122*p* is the NWC doorbell (0). Additionally, within the controller 110*b*, the FCC mailbox 178 associated with the combination of the core 122*p* within the controller 110*b* and the FC controller 150 within the controller 110*a* is the FCC mailbox (2). Additionally, in the FC controller 150 connected to the logical unit 190*a* within the storage node 100*a*, the FCC doorbell 154 associated with the core 122 *p* within the controller 110*b* of the storage node 100*b* is the FCC doorbell (2). After inter-node switching of the assigned CPU core, the core 122*p* within the controller 110*b* of the storage node 100*b* carries out the host command execution process, using above cited mailboxes and doorbells (NWC mailbox (0), NWC doorbell (0) and FCC mailbox (2) within the controller 110*b* and FCC doorbell (2) within the controller 110*a*).

In order to carry out inter-node switching of the assigned CPU core, it is necessary that a host command be issued addressed to the storage node 100 having the post-switching assigned CPU core (the storage node 100*b*). Thus, during inter-node switching of the assigned CPU core, first, the access path between the host computer 200 and the storage node 100 is modified. Modification of the access path between the host computer 200 and the storage node 100 will be discussed later.

In the storage node 100 having the post-switching assigned CPU core (the storage node 100*b*), the network controller 130 must assign processing of host commands addressed to the logical unit 190*a*0 to the post-switching assigned CPU core. Thus, settings of the network controller 130 are made so that host commands addressed to the logical unit 190*a*0 will be assigned to the core 122*p* within the storage node 100*b*.

Figure 25:
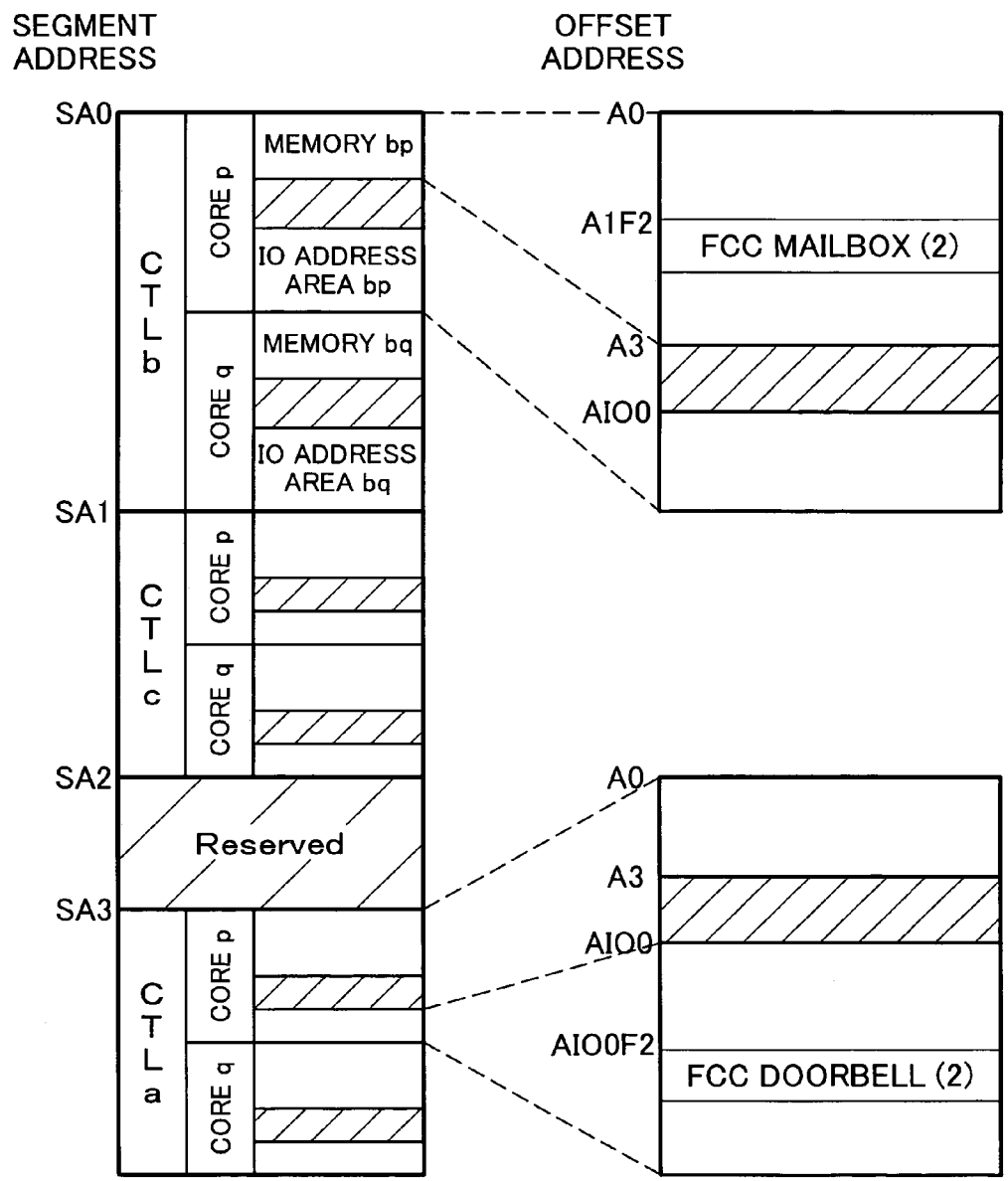
FIG. 25 is a diagram showing the address spaces of the storage system 1000 as viewed from the assigned CPU core subsequent to inter-node switching of the assigned CPU core.

FIG. 25 is a conceptual illustration showing the address spaces of the storage system 1000 as viewed from the assigned CPU core (the core 122*p* of the CPU 120 in the controller 110*b* of the storage node 100*b*) subsequent to inter-node switching of the assigned CPU core. As shown in FIG. 25, the core 122*p* (core p) of the controller 110*b*, which is after switching assigned CPU core, is able to refer to the FCC mailbox (2) mapped to the area in the memory 160 for use by the core 122*p* (denoted as "memory bp") in the controller 110*b*. Similarly, the core 122*p* of the controller 110*b* is able to refer to the FCC doorbell (2) mapped to the IO address area for use by the core 122*p* in the controller 110*a*.

In the storage system 1000 in this embodiment, the controllers 110 of the storage nodes 100 are interconnected by the inter-node controller coupling unit 102 (see FIG. 1 and FIG. 3). Thus, there are ensured a data access paths going from the CPU 120 of the controller 110*b* that has the post-switching assigned CPU core, to the memory 160 and the FC controller 150 in the controller 110*a* of the storage node 100*a*. Accordingly, the core 122*p* of the CPU 120 of the controller 110*b* is able to access the memory 160 and the FC controller 150 in the controller 110*a* via these access paths.

The FCC doorbell (2) (FIG. 24) in the FC controller 150 of the controller 110*a* is set up exclusively for use of the core 122*p* of the controller 110*b*, which after switching is now the assigned CPU core, thereby enabling exclusive use by the core 122*p* of the controller 110*b*. Thus, exclusive control for the FCC doorbells 154 is not necessary.

In the storage system 1000 in this embodiment, inter-node switching of the assigned CPU core can be accomplished in the above manner.

Figure 26:
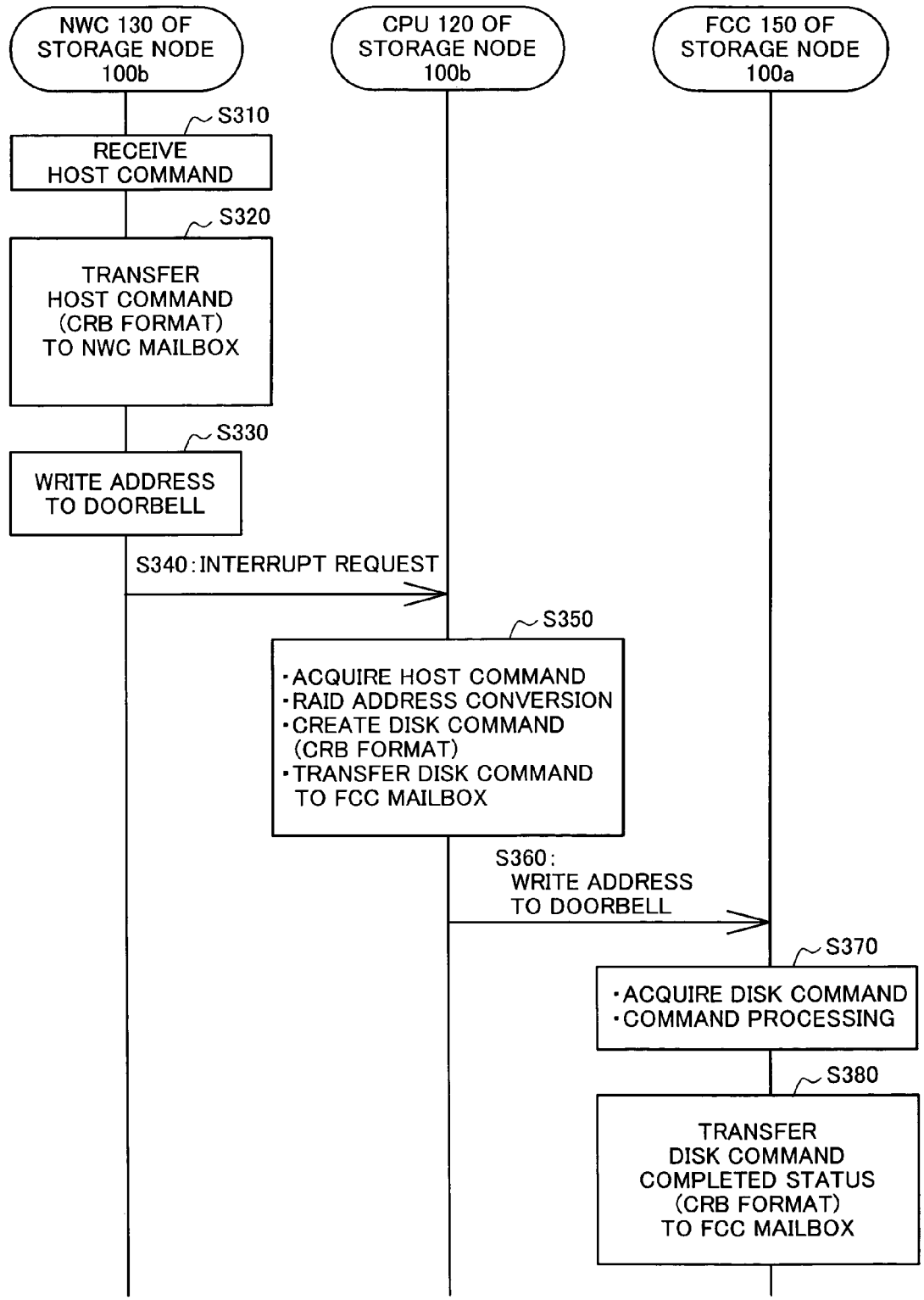
FIG. 26 is a diagram depicting the flow of the host command execution process subsequent to inter-node switching of the assigned CPU core.
Figure 27:
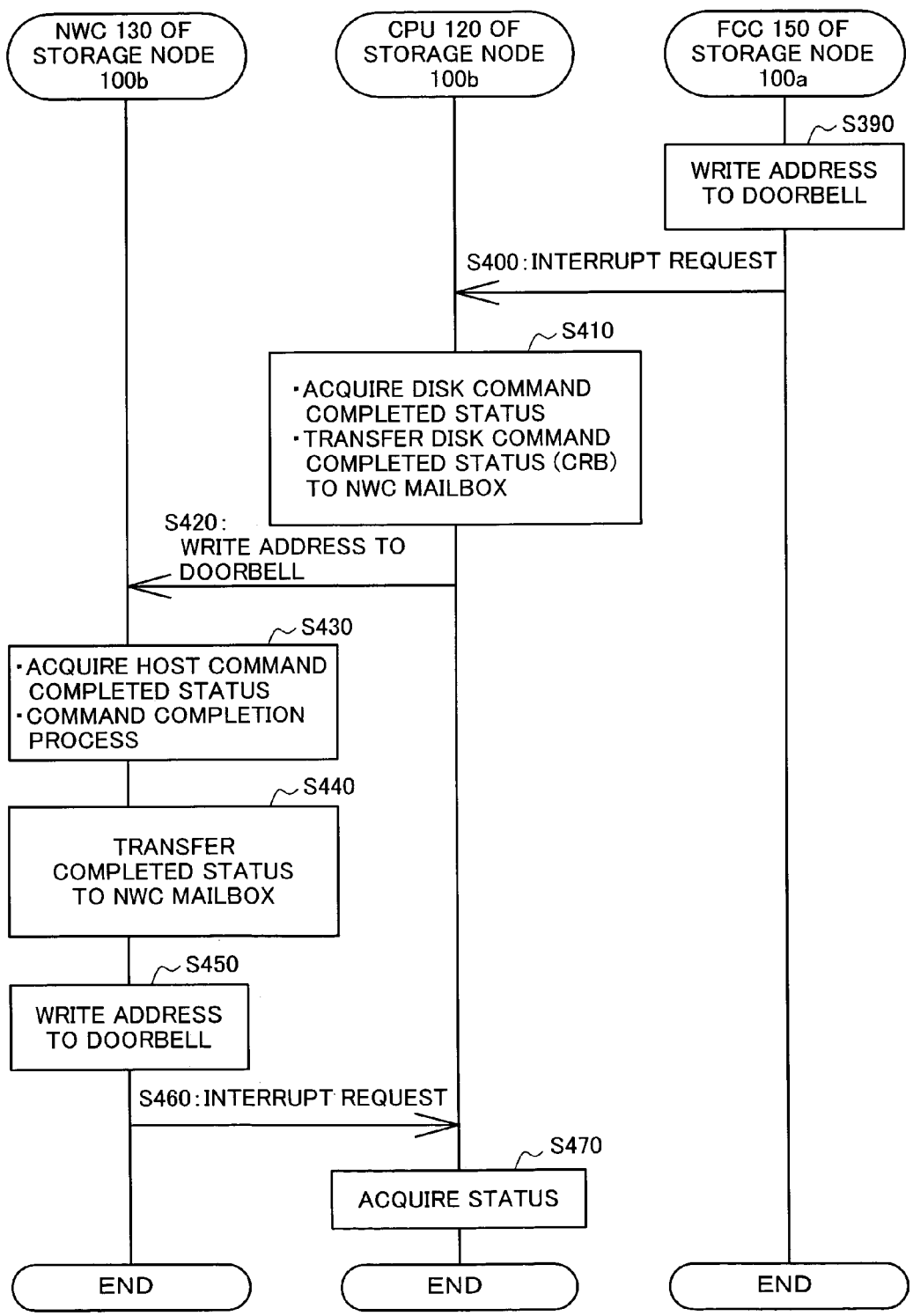
FIG. 27 is a diagram depicting the flow of the host command execution process subsequent to inter-node switching of the assigned CPU core.
Figure 28:
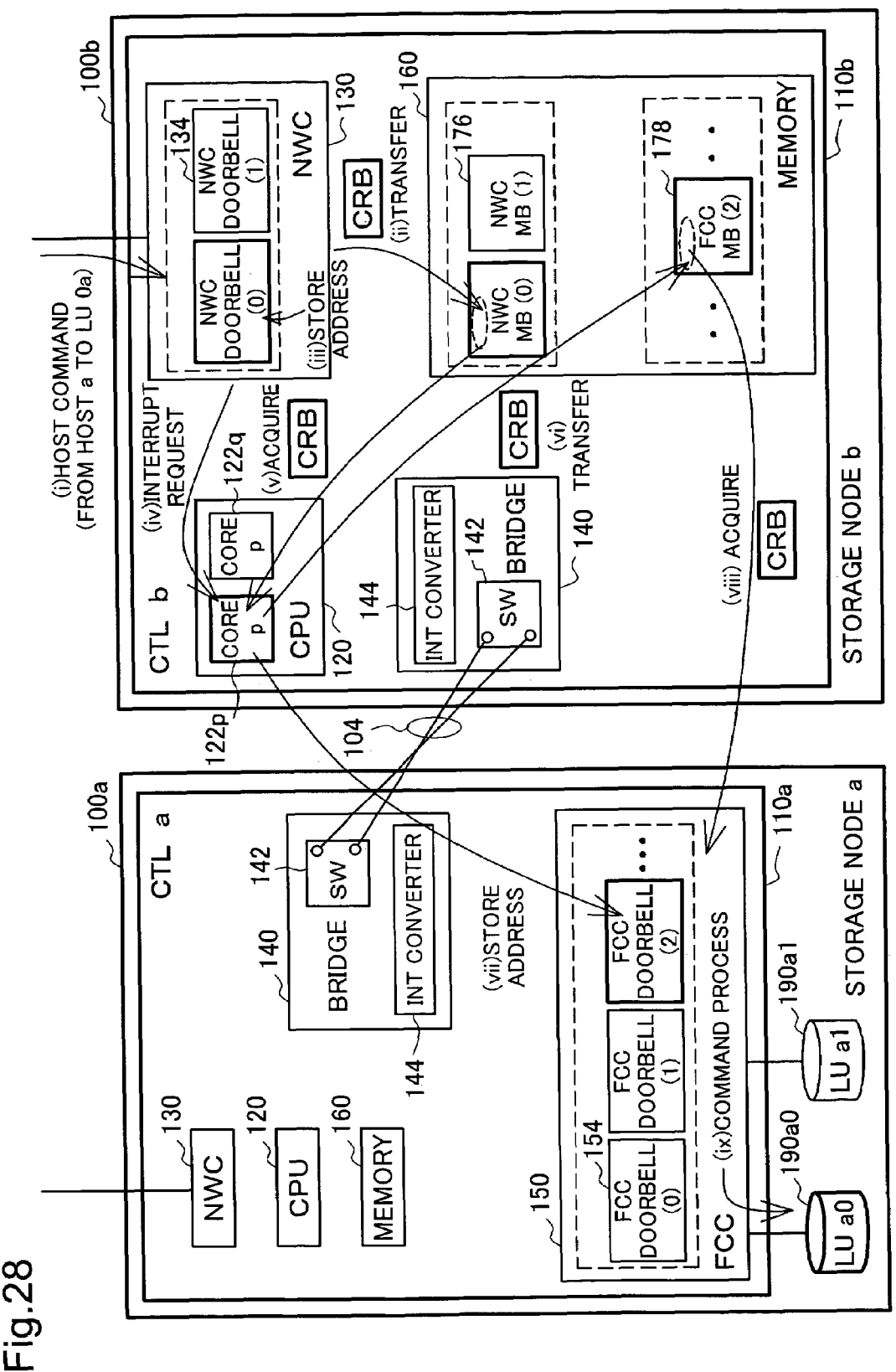
FIG. 28 is a diagram depicting an overview of the host command execution process subsequent to inter-node switching of the assigned CPU core.
Figure 29:
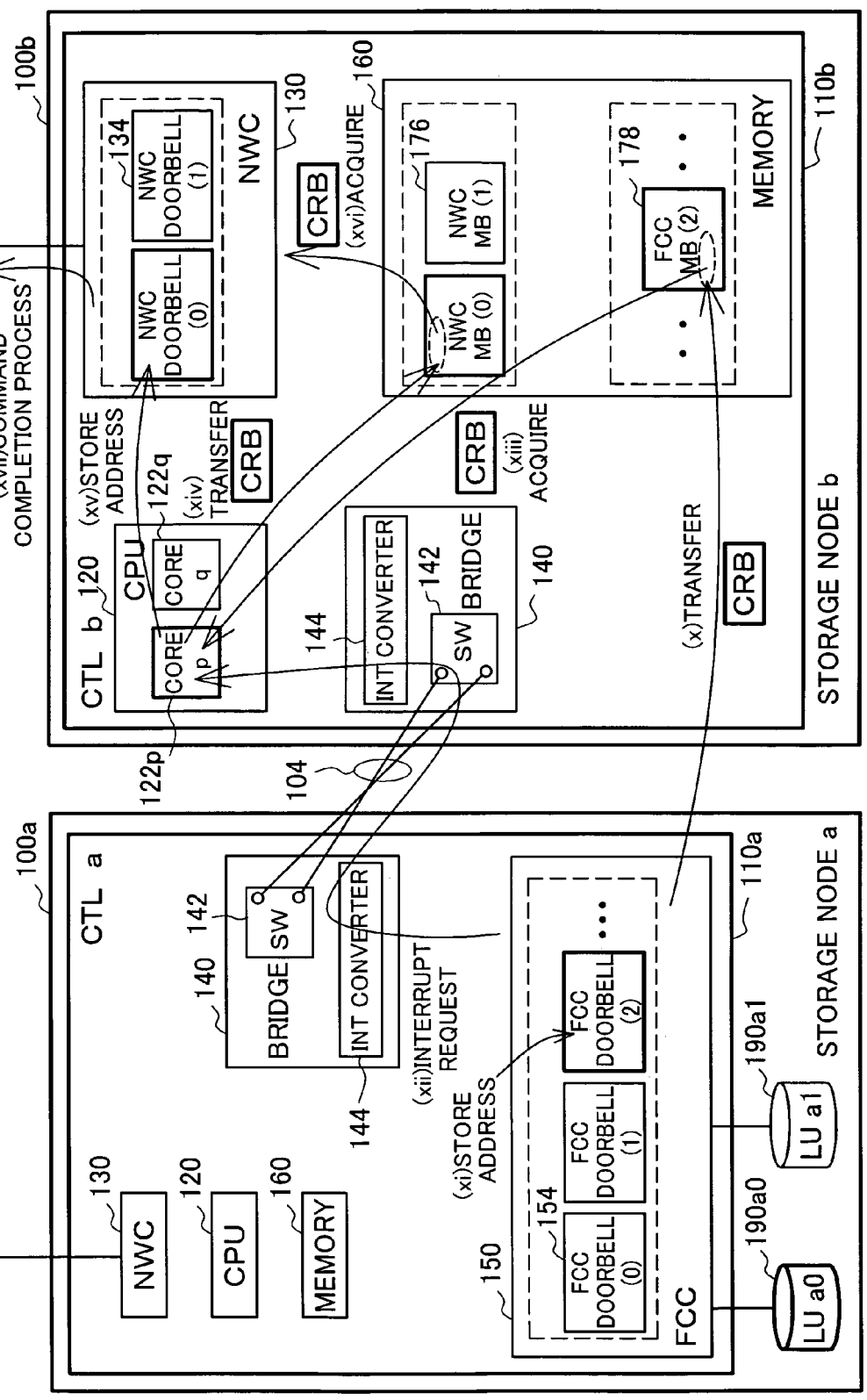
FIG. 29 is a diagram depicting an overview of the host command execution process subsequent to inter-node switching of the assigned CPU core.

FIG. 26 and FIG. 27 are flowcharts depicting the flow of the host command execution process subsequent to inter-node switching of the assigned CPU core. FIG. 28 and FIG. 29 are illustrations depicting an overview of the host command execution process subsequent to inter-node switching of the assigned CPU core. FIG. 28 shows processes within the host command execution process corresponding to the portion depicted FIG. 17, and FIG. 29 shows processes corresponding to the portion depicted FIG. 18.

During inter-node switching of the assigned CPU core, since the access path between the host computer 200 and the storage node 100 is changed, the host command addressed to the logical unit 190*a*0 is received by the network controller 130 of the storage node 100*b* (Step S310 of FIG. 26; (i) of FIG. 28).

In the storage node 100*b*, the network controller 130 settings are made so that host commands addressed to the logical unit 190*a*0 are assigned to the core 122*p* of the controller 110*b*. Thus, a received host command will be acquired by the core 122*p* through the NWC mailbox 176 (NWC mailbox (0)) assigned to the core 122*p* (Steps S320 to S350 of FIG. 26; (ii) to (v) of FIG. 28).

The core 122*p* which has now acquired the host command performs RAID address conversion and creation of the disk command (Step S350 of FIG. 26). Information for carrying out RAID address conversion for the logical unit 190*a*0 (the LU management table (FIG. 9), etc.) is stored in the memory 160 of the controller 110*b* of the storage node 100*b*.

The core 122*p* of the controller 110*b* then transfers the created disk command to the FCC mailbox 178 in the memory 160 of the controller 110*b* (Step S350 of FIG. 26; (vi) of FIG. 28). The FCC mailbox 178 which is the transfer destination at this time is the FCC mailbox (2) associated with the combination of the core 122*p* and the FC controller 150 connected to the logical unit 190*a*0 of the storage node 100*a*.

The core 122*p* takes the disk command storage address in the FCC mailbox 178 (FCC mailbox (2)) and stores the address in the FCC doorbell 154 in the FC controller 150 connected to the logical unit 190*a*0 of the storage node 100*a* (Step S360 of FIG. 26; (vii) of FIG. 28). The FCC doorbell 154 used at this time is the FCC doorbell (2) associated with the core 122*p* in the controller 110*b* of the storage node 100*b*.

The FC controller 150 connected to the logical unit 190*a*0 of the storage node 100*a* refers to the address stored in the FCC doorbell (2), acquires the disk command from the FCC mailbox (2) of the storage node 100*b* (Step S370 of FIG. 26; (viii) of FIG. 28), and performs the disk command process (Step S370 of FIG. 26; (ix) of FIG. 28).

Once the disk command process has been completed, the FC controller 150 of the storage node 100*a* transfers disk command completed status to the FCC mailbox (2) of the storage node 100*b* (Step S380 of FIG. 26; (x) of FIG. 29), and stores the address thereof in the FCC doorbell (2) within the FC controller 150 of the storage node 100*a* (Step S390 of FIG. 27; (xi) of FIG. 29).

Additionally, the FC controller 150 of the storage node 100*a* issues an interrupt request to the core 122*p* of the storage node 100*b* (Step S400 of FIG. 27; (xii) of FIG. 29). Here, the bridges 140 of the storage node 100*a* and of the storage node 100*b* each have an interrupt converter (also denoted as "INT converter") 144. On the transmission path of the interrupt request (interrupt signal) from the FC controller 150 of the storage node 100*a* to the core 122*p* of the storage node 100*b*, conversion of the interrupt request to packets able to pass through the inter-node controller connection lines 104 is carried out by the interrupt converter 144 on the storage node 100*a* end; and reverse-conversion is carried out by the interrupt converter 144 on the storage node 100*b* end.

The core 122*p* in the controller 110*b* of the storage node 100*b* receiving the interrupt request refers to the address stored in the FCC doorbell (2) of the storage node 100*a* and acquires the disk command completed status from the FCC mailbox (2) of the storage node 100*b* (Step S410 of FIG. 27; (xiii) of FIG. 29). The core 122*p* in the controller 110*b* then creates a host command completed status, transfers the host command completed status to the NWC mailbox (0) of the storage node 100*b* (Step S410 of FIG. 27; (xiv) of FIG. 29), and stores the address in the NWC doorbell (0) within the controller 110*b* (Step S420 of FIG. 27; (xv) of FIG. 29).

The network controller 130 in the controller 110b of the storage node 100b acquires the host command completed status from the NWC mailbox (0) (Step S430 of FIG. 27; (xvi) of FIG. 29), and executes the command completion process (Step S430 of FIG. 27; (xvii) of FIG. 29). Subsequently, the CPU 120 is notified of process completion by the network controller 130 (Step S440 through Step S470 of FIG. 27).

As described above, in the storage system 1000 in this embodiment, it is possible to accomplish inter-node switching of the assigned CPU core, whereby the assigned CPU core for host commands addressed to a given logical unit 190 is switched from a certain core 122 to another core 122 included in a different storage node 100 from the storage node 100 that includes the first core 122. By so doing, it is possible to distribute load across the storage nodes 100 of the storage system 1000. Inter-node switching of the assigned CPU core can be carried out by changing the access path between a host computer 200 and a storage node 100 and setting the assigned CPU core in the network controller 130; there is no need to copy data stored in one logical unit 190 to a logical unit 190 in another storage node 100. Additionally, even after inter-node switching of the assigned CPU core, the host command execution process can be carried out using the same sequence, the same disk process, the same network controller 130, and the same FC controller 150 as before the switch. There is no need to change the path between the FC controller and the disk 194 or to move data in association with switching of the assigned CPU core for host commands. Accordingly, in the storage system 1000 in this embodiment, switching of the core 122 for executing processing in response to a command from a host computer can be achieved easily.

A-7. Modifying Access Paths Between Host Computers and Storage Nodes

Figure 30:
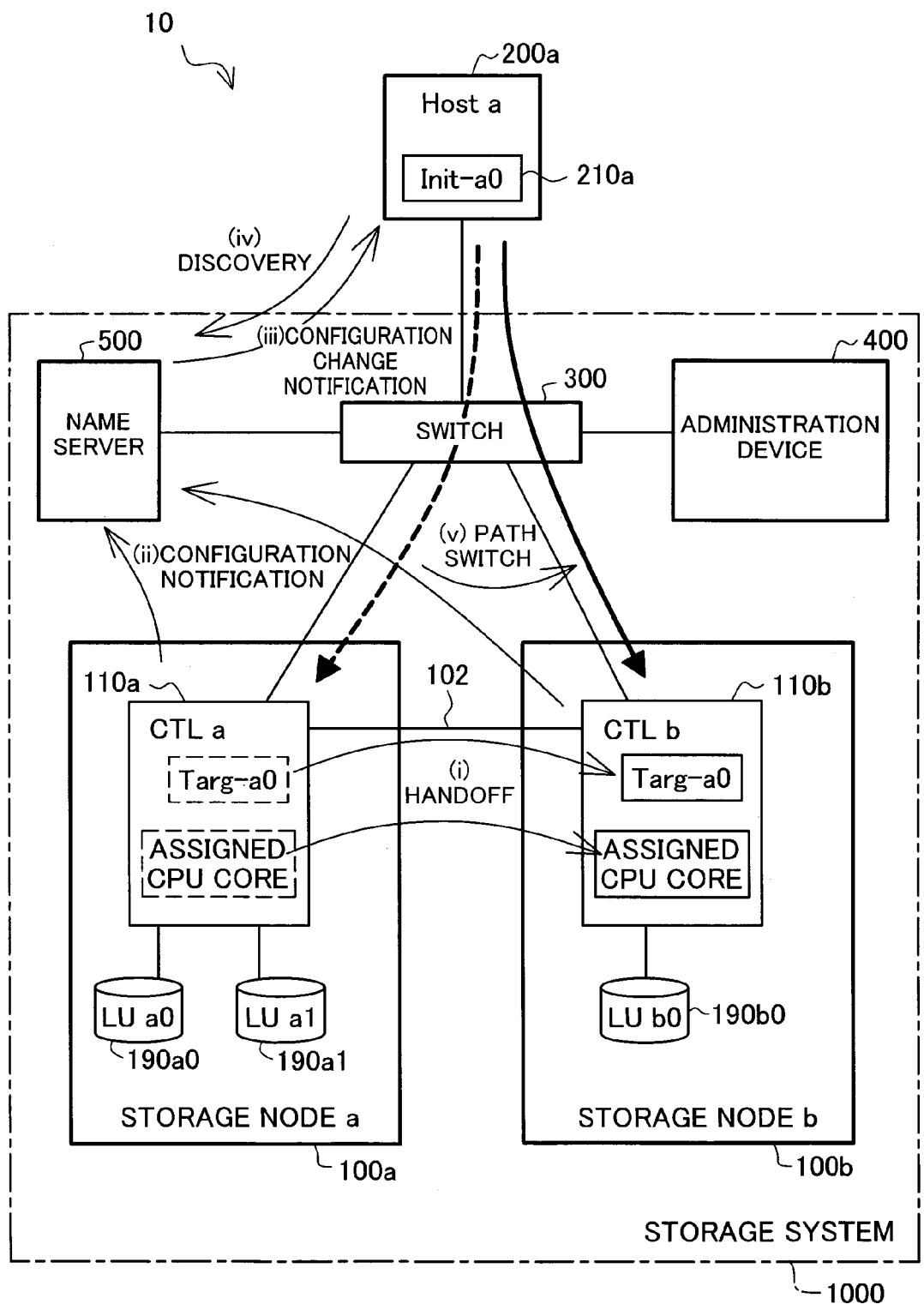
FIG. 30 is a diagram showing an example of the process for changing the access path between a host computer 200 and a storage node 100.

As discussed above, during inter-node switching of the assigned CPU core, it is necessary to change the access path between the host computer 200 (FIG. 1) and the storage node 100. FIG. 30 is a diagram showing an example of the process for changing the access path between a host computer 200 and a storage node 100. In FIG. 30, the portions relating to changing the access path have been extracted from the data processing system 10 (FIG. 1) for the purpose of illustration. In the example of FIG. 30, the access path is changed so that a host command issued by the host computer 200a and addressed to the logical unit 190a0 reaches the storage node 100b, rather than the storage node 100a.

In the state prior to changing the access path, the host computer 200a has the initiator, and this initiator is registered under the initiator name "Init-a0" in the initiator management table 210a (see FIG. 11) belonging to the host computer 200a. This initiator "Init-a0" is also registered in the name management table 571 (FIG. 12) belonging to the name server 500.

The logical unit 190a0 (LU a0) in the storage node 100a is recorded under the target name "Targ-a0" in the target management table 173 (FIG. 8 and FIG. 10) stored in the memory 160 of the controller 110a of the storage node 100a. In the target management table 173, "Init-a0" is registered as the initiator allowed access to "Targ-a0" (see FIG. 10). This target "Targ-a0" is also recorded in the name management table 571 (FIG. 12) belonging to the name server 500.

Additionally, in the LU management table 172 (FIG. 8 and FIG. 9) stored in the memory 160 of the controller 110a of the storage node 100a, the logical unit 190a0 (LU a0) is registered under the target name "Targ-a0", and Init-a0" is registered as the initiator allowed access to the logical unit 190a0.

During changing of the access path, first, takeover of the target "Targ-a0" to the controller 110b of the storage node 100b from the controller 110a of the storage node 100a is executed ((i) of FIG. 30). By so doing, the combination of the target "Targ-a0" and the initiator "Init-a0" is registered in the target management table 173 stored in the memory 160 of the controller 110b of the storage node 100b. Also, the combination of the target "Targ-a0" and the initiator "Init-a0" is deleted from the target management table 173 stored in the memory 160 of the controller 110a of the storage node 100a.

Next, the storage node 100a and the storage node 100b transmit configuration information to the name server 500 ((ii) of FIG. 30). The name server 500 receives this information and modifies the information relating to the combination of the target "Targ-a0" and the initiator "Init-a0" in the name management table 571, which the name server 500 holds.

Next, the name server 500 issues a configuration change notification to the initiators (host computers) connected to the storage system 1000 ((iii) of Step S30). Each initiator (host computer) receiving the configuration change notification executes discovery, querying the name server 500 as to whether there has been any change in targets accessible by itself ((iv) of Step S30). By so doing, the host computer 200a ascertains that the target "Targ-a0" corresponding to the initiator "Init-a0" has been moved to the storage node 100b.

In accordance with the target "Targ-a0" information after the change, the host computer 200a now sets up a new iSCSI session with the storage node 100b. By so doing, switching of the path between the host computer 200a and the storage nodes 100 is completed ((v) of FIG. 30). By means of the above process, host commands addressed to the logical unit 190a0 (LU a0) issued by the host computer 200a will now be delivered to the storage node 100b. The host command issued during the switching of the assigned CPU core can be handled in the same manner as the prior art.

A-8. Example of Administration Screen

Figure 31:
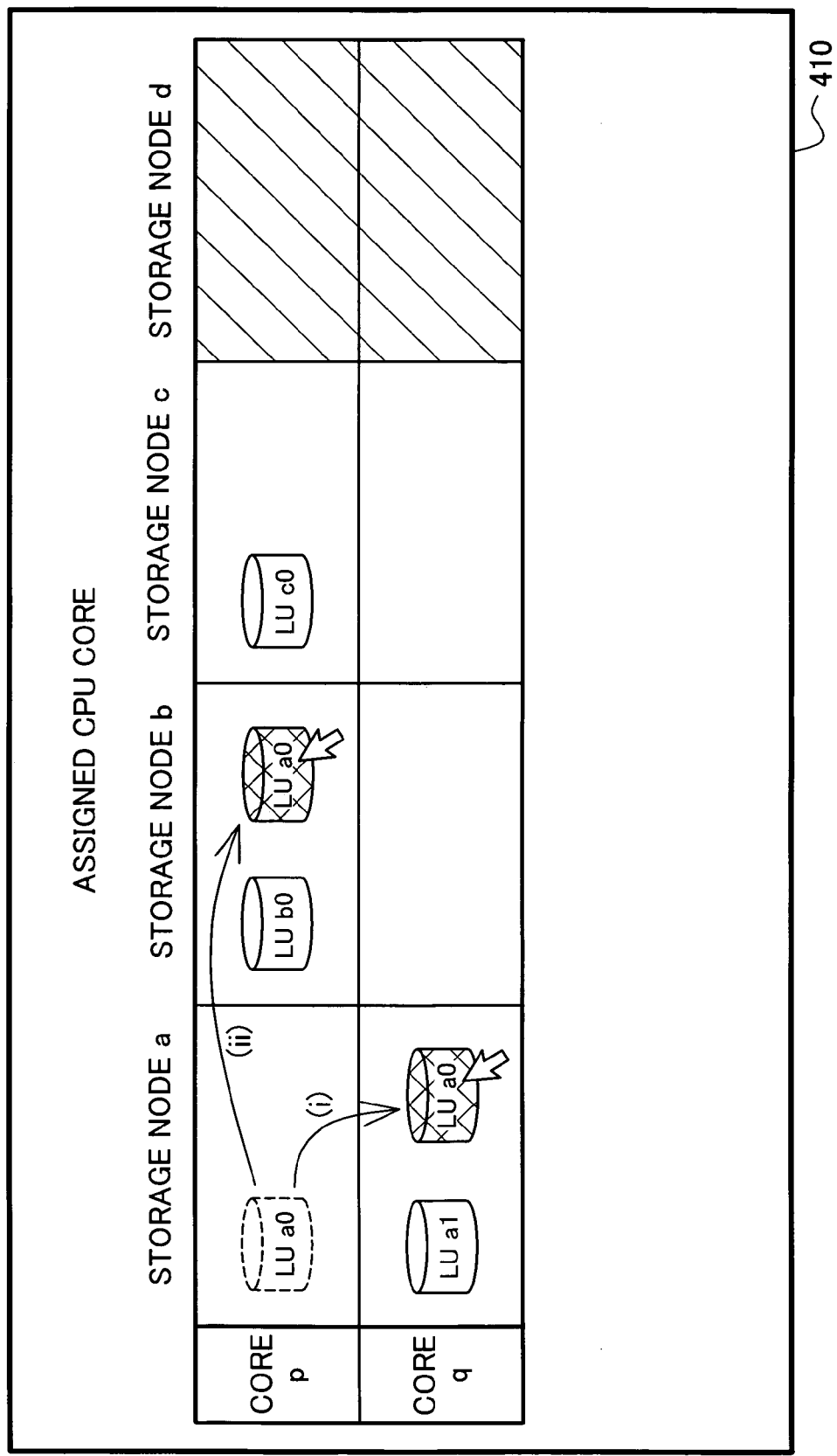
FIG. 31 is a diagram showing an exemplary administration screen 410 of the administration device 400 of the storage system 1000.

FIG. 31 is a diagram showing an exemplary administration screen 410 of the administration device 400 of the storage system 1000. The administration screen 410 depicted in FIG. 31 shows the assigned CPU core of each logical unit 190 in the storage system 1000. For example, the assigned CPU core for the logical unit 190 "LU b0" is the core p of the storage node 100b. From the administration screen 410, the user can readily ascertain the assigned CPU core of each logical unit 190 in the storage system 1000.

By controlling the administration device 400 with reference to the administration screen 410, the user can instruct switching of the assigned CPU core within a controller, or inter-node switching of the assigned CPU core, as described previously. For example, the user may drag and drop the icon for the logical unit 190 "LU a0" displayed on the administration screen 410 from the core p field to the core q field of storage node 100a ((i) of FIG. 31), in order to instruct switching of the assigned CPU core within the controller so that the assigned CPU core of the logical unit 190 "LU a0" is switched from the core p to the core q of the storage node 100a. Or, the user may drag and drop the icon for the logical unit 190 "LU a0" from the core p field of storage node 100a to the core p field of storage node 100b ((ii) of FIG. 31), in order to instruct inter-node switching of the assigned CPU core so that the assigned CPU core of the logical unit 190 "LU a0" is switched from the core p of the storage node 100a to the core p of the storage node 100b. In the storage system 1000, switching of the assigned CPU core within the controller or inter-node switching of the assigned CPU core is executed in accordance with an instruction from the user.

FIG. 32 is a diagram showing another example of an administration screen 410 of the administration device 400 of the storage system 1000. In the administration screen 410 depicted in FIG. 32, the operating status of each storage node 100 in the storage system 1000 is displayed. The administration screen 410 displays, in order from the left, the operating status of the storage node 100*a* (SNa), of the storage node 100*b* (SNb), of the storage node 100*c* (SNc), and of a future expansion storage node 100*d* (SNd). In the display of operating status of the storage nodes 100, the top row gives the operation ratio of each core 122 of the CPU 120, and the lower row gives the operation ratio each logical unit 190. Here, for the cores 122 of the CPU 120, the operation ratio may be calculated, for example, by excluding from a certain measurement period the idle routine time during the measurement period, and designating the remaining time as the operating time. For the logical units 190, the operation ratio may be calculated, for example, by designating the time from the point that a command is received from a host computer 200 until the command completion report is sent back the host computer 200 as the operating time. The operation ratio is calculated, for example, over prescribed time intervals, while updating the display on the administration screen 410. Operating condition display items may also include number of accesses by the host computers 200, ratio of read requests to write requests, transfer length, or the like. By means of displaying the administration screen 410, the user can ascertain operating conditions (loads) of the storage nodes 100 of the storage system 1000. Thus, by referring to the loads on the cores 122 of the CPU 120, the user can, for example, instruct switching of the assigned CPU core within a controller, or inter-node switching of the assigned CPU core.

A-9. Application of Embodiment 1

Figure 33A:
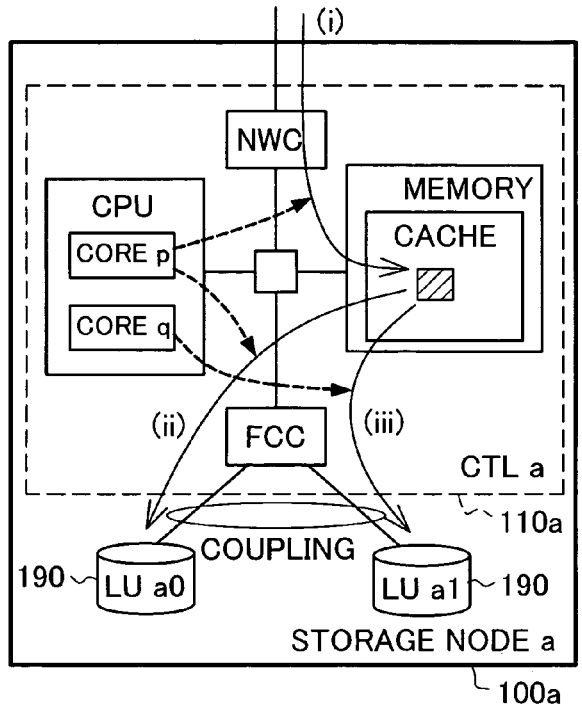
FIG. 33A and FIG. 33B are diagrams showing an example of an application relating to a shadow image in the storage system 1000.
Figure 33B:
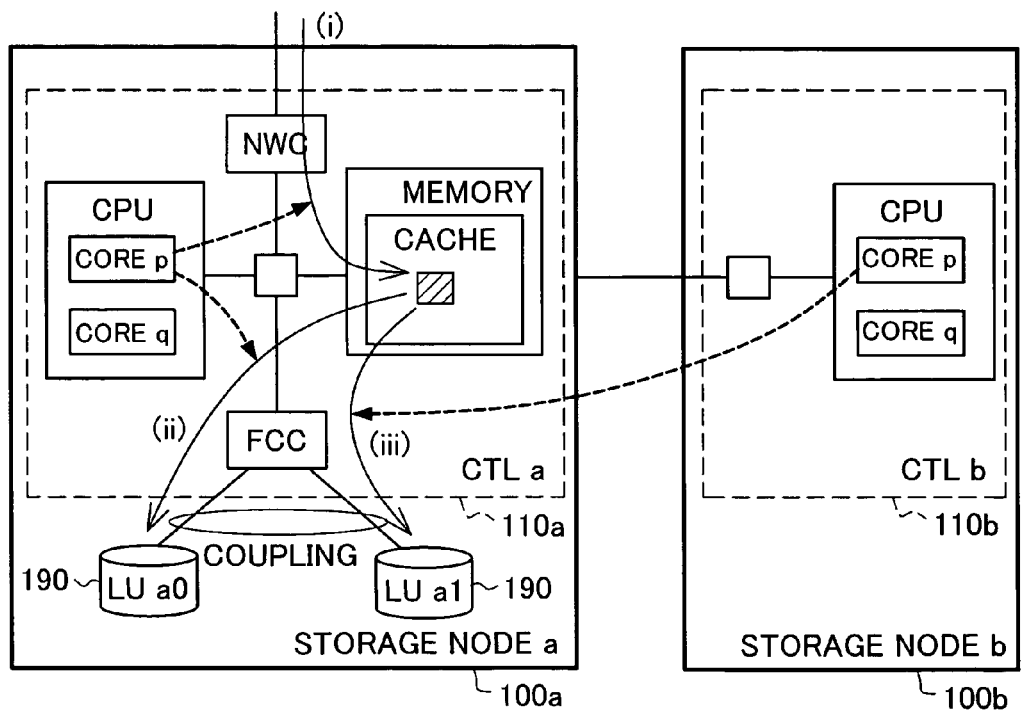

Within the storage system 1000 of Embodiment 1, various applications are possible besides switching of the assigned CPU core within a controller or inter-node switching of the assigned CPU core as described above. FIG. 33A and FIG. 33B are diagrams showing an example of an application relating to a shadow image in the storage system 1000.

A shadow image (also called a "physical copy") in the storage system 1000 refers to a process for maintaining a logical unit 190 for storing data identical to the data in another logical unit 190 accessed by a host computer, to ensure redundancy of data or for decoupling the copied logical unit 190 for use in another application. In a shadow image, a logical unit 190 accessed by a host computer is provided with an additional other logical unit 190 coupled therewith, and when data is written to the first logical unit 190 by a write command from the host computer, identical data is written to the other logical unit 190 as well. In the storage system 1000 in this embodiment, it is possible to achieve distribution of load during execution of such shadow imaging.

FIG. 33A depicts an example of load distribution among cores in the controllers 110 during shadow imaging. During shadow imaging, in the storage node 100*a*, the write data contained in a write command received from the host computer is stored in the cache area ((i) of FIG. 33A), the write data stored in the cache area is written to the logical unit 190 (LU a0) ((ii) of FIG. 33A), and the write data is written to the logical unit 190 (LU a1) as well ((iii) of FIG. 33A). At this time, the processes of (i) and (ii) of FIG. 33A are assigned to the core p, while the process of (iii) of FIG. 33A is assigned to the core q. By so doing, load may be distributed between the cores in a controller 110 during shadow imaging in the storage system 1000.

FIG. 33B depicts an example of load distribution among storage nodes during shadow imaging. Processes during shadow imaging are similar to the processes described in FIG. 33A ((i) through (iii) of FIG. 33B). At this time, the processes of (i) and (ii) of FIG. 33B are assigned to the core p of the storage node 100*a*, while the process of (iii) of FIG. 33B is assigned to the core p of the storage node 100*b*. By so doing, load may be distributed among the storage nodes 100 during shadow imaging in the storage system 1000.

In FIG. 33A and FIG. 33B, it is possible to accomplish the transition from process (ii) to process (iii) by means of carrying out linking between cores. This linking can be carried out using known methods, such as methods using shared memory or signals. Since memory maps are shared in the storage system 1000 (see FIG. 23), transition can also be accomplished by inputting a command to the command list. Apportionment of processing by each core may be that depicted in FIG. 33A and FIG. 33B or a different apportionment.

FIG. 34A and FIG. 34B are diagrams showing other example of application relating to shadow imaging in the storage system 1000. The example of FIG. 34A and FIG. 34B depicts processing in the case of performing data backup during shadow image operations. Data backup during shadow image operations refers to a process of splitting two logical units 190 from their coupled state during shadow imaging, and performing backup of data using data stored in one of the logical units 190. By means of this process, in the storage system 1000, data backup can be carried out while command processes from the host computers are in progress. In the storage system 1000 in this embodiment, load distribution can be achieved in execution of data backup during shadow imaging.

FIG. 34A depicts an example of load distribution among cores in the controller 110 during execution of data backup in shadow imaging operations. When data backup is executed during shadow imaging operations, in the storage node 100*a*, the write data contained in a write command received from the host computer is stored in the cache area ((i) of FIG. 34A), the write data stored in the cache area is written to the logical unit (LU a0) ((ii) of FIG. 34A), data is read out from the logical unit (LU a1) to the cache area ((iii) of FIG. 34A), and the data read out to the cache area is transferred to the backup destination ((iv) of FIG. 34A). At this time, the processes of (i) and (ii) of FIG. 34A are assigned to the core p, while the processes of (iii) and (iv) of FIG. 34A are assigned to the core q. By so doing, load may be distributed between the cores in a controller 110 during execution of data backup in shadow imaging operations.

In FIG. 34B, there is depicted an example of load distribution among storage nodes during execution of data backup in shadow imaging operations. The processes in data backup during shadow imaging operations is similar to the processes shown in FIG. 34A (from (i) to (iv) of FIG. 34B). At this time, the processes of (i) and (ii) of FIG. 34B are assigned to the core p of the storage node 100*a*, while the processes of (iii) and (iv) of FIG. 34B are assigned to the core p of the storage node 100*b*. By so doing, load may be distributed among the storage nodes 100 during execution of data backup in shadow imaging operations in the storage system 1000. Apportionment of processing by each core may be that depicted in FIG. 34A and FIG. 34B, or a different apportionment.

Figure 35A:
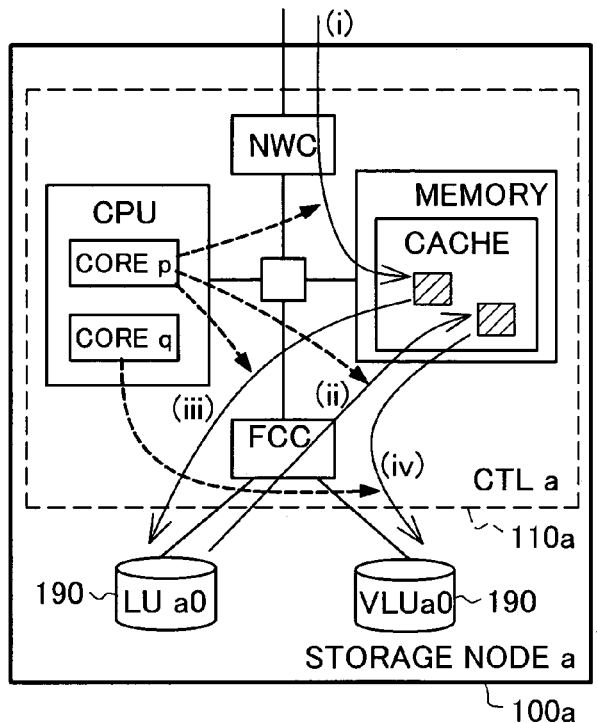
FIG. 35A and FIG. 35B are diagrams showing an exemplary application relating to a snapshot in the storage system 1000.
Figure 35B:
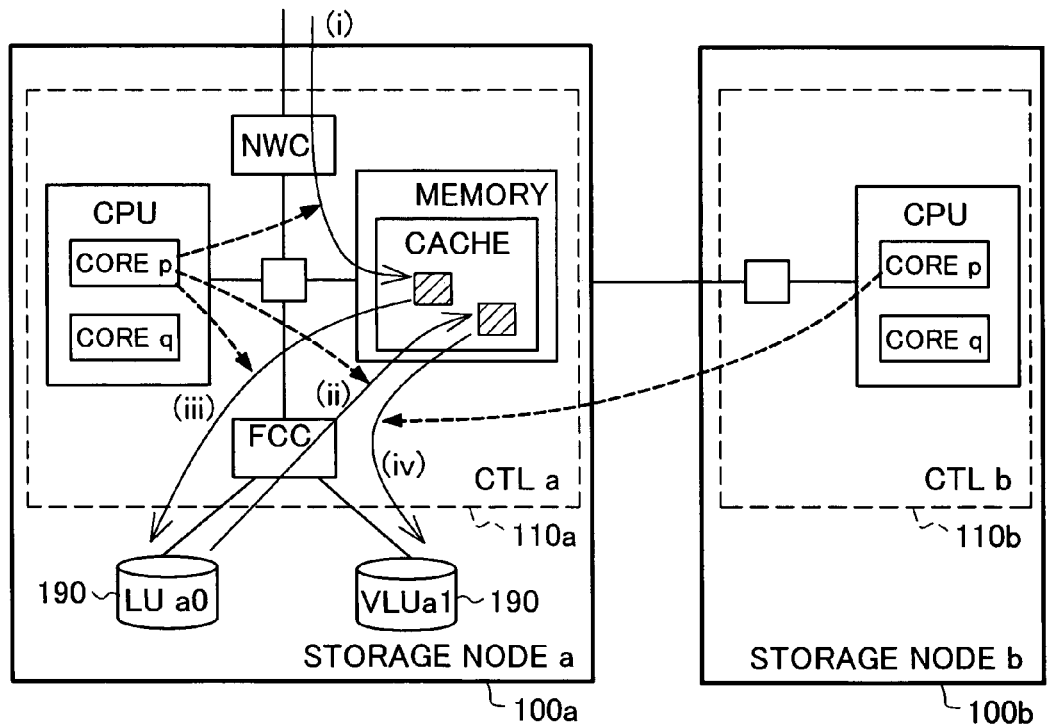

FIG. 35A and FIG. 35B are diagrams showing an exemplary application relating to a snapshot in the storage system 1000. A snapshot (also termed a "logical copy" or "differential backup") in the storage system 1000 refers to a backup process whereby, prior to writing write data (new data) from a host computer to a logical unit 190, the data (existing data) currently stored in the logical unit 190 to which the new data will be written is stored in another location, to keep a data image of the logical unit 190 at a certain point in time. In a snapshot, a logical unit 190 for access by the host computer and another logical unit 190 as a virtual volume are prepared, and when a write command is received from the host computer, the existing data is first read out into the cache area. Then, the new data is written to the logical unit 190, and the existing data is written to the virtual volume. In the storage system 1000 in this embodiment, load can be distributed during execution of a snapshot in this way.

FIG. 35A depicts an example of load distribution among cores in the controllers 110 during a snapshot. In a snapshot, in the storage node 100a, the write data (new data) contained in a write command received from the host computer is stored in the cache area ((i) of FIG. 35A), the existing data is written to the cache area ((ii) of FIG. 35A), the new data stored in the cache area is written to the logical unit (LU a0) ((iii) of FIG. 35A), and the existing data stored in the cache area is written to a logical unit (VLU a0) ((iv) of FIG. 35A). At this time, the processes of (i) through (iii) of FIG. 35A are assigned to the core p, while the process of (iv) of FIG. 35A is assigned to the core q. By so doing, load may be distributed between the cores in a controller 110 during a snapshot in the storage system 1000.

FIG. 35B depicts an example of load distribution among storage nodes in the controllers 110 during a snapshot. The processes during a snapshot is similar to the processes shown in FIG. 35A (from (i) to (iv) of FIG. 35B). At this time, the processes of (i) through (iii) of FIG. 35B are assigned to the core p of the storage node 100a, while the process of (iv) of FIG. 35B is assigned to the core p of the storage node 100b. By so doing, load may be distributed among the storage nodes 100 during a snapshot in the storage system 1000.

In FIG. 35A and FIG. 35B, the process of (iii) and the process of (iv) may be executed in parallel. The transition from the process of (ii) to the process of (iv) may be accomplished by performing linkage between cores, in similar fashion to the case of FIG. 33A and FIG. 33B. Apportionment of processing by each core may be that depicted in FIG. 35A and FIG. 35B, or a different apportionment.

FIG. 36A and FIG. 36B are diagrams showing an example of application relating to remote copying in the storage system 1000. Remote copying in the storage system 1000 refers to a process of maintaining a second logical unit 190 having stored therein data identical to the data in a first logical unit 190 accessed by a host computer, with the second unit maintained in a storage system 1000 situated at a physically remote location (remote site), to accomplish redundant preservation of data or discovery. In remote copying, when write data is received from the host computer, the write data is written to the logical unit 190, as well as being transferred to the remote site. In the storage system 1000 in this embodiment, load can be distributed during remote copying in this way.

FIG. 36A depicts an example of load distribution among cores in the controllers 110 during remote copying. In remote copying, in the storage node 100a, the write data contained in a write command received from the host computer is stored in the cache area ((i) of FIG. 36A), the write data is written to the logical unit 190 (LU a0) ((ii) of FIG. 36A), and the write data is transferred to the remote site ((iii) of FIG. 36A). At this time, the processes of (i) and (ii) of FIG. 36A are assigned to the core p, while the process of (iii) of FIG. 36A is assigned to the core q. By so doing, load may be distributed between the cores in a controller 110 during remote copying.

FIG. 36B depicts an example of load distribution among storage nodes during remote copying. The processes during remote copying are similar to the processes described in FIG. 36A ((i) through (iii) of FIG. 36B). At this time, the processes of (i) and (ii) of FIG. 36B are assigned to the core p of the storage node 100a, while the process of (iii) of FIG. 36B is assigned to the core p of the storage node 100b. By so doing, load may be distributed among the storage nodes 100 during remote copying in the storage system 1000. Apportionment of processing by each core may be that depicted in FIG. 36A and FIG. 36B, or a different apportionment.

Figure 37:
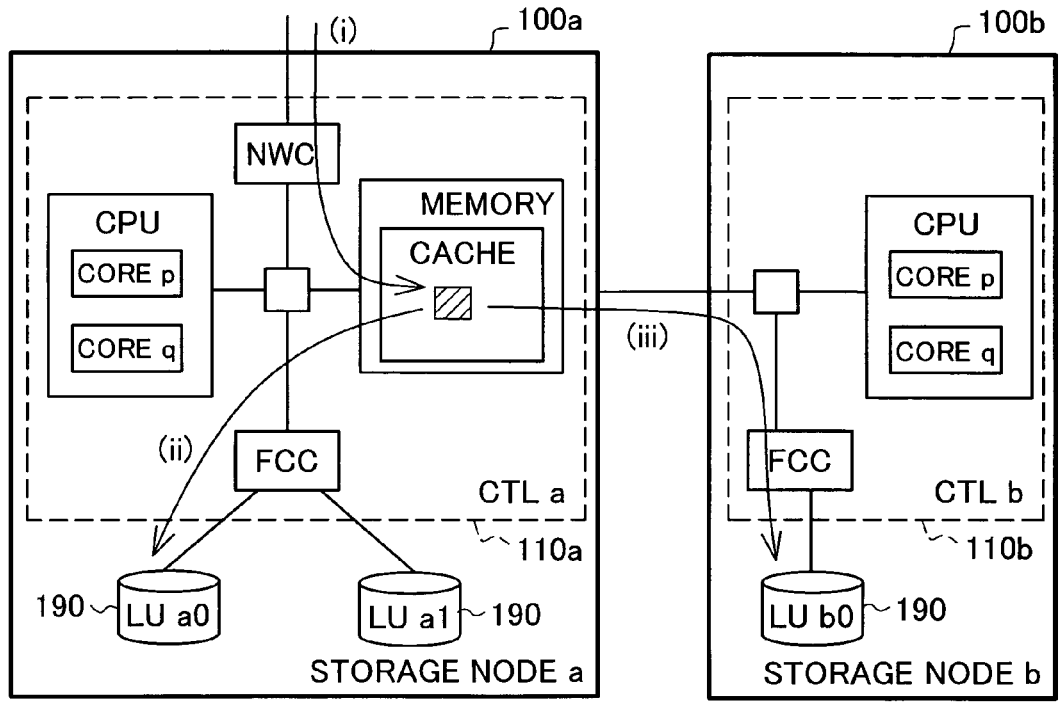
FIG. 37 is diagram showing an example of application relating to mirroring between storage nodes 100 in the storage system 1000.

FIG. 37 is a diagram showing an example of application relating to mirroring between storage nodes 100 in the storage system 1000. Mirroring between storage nodes 100 refers to a process whereby mirroring is carried out between two logical units 190 belonging to different storage nodes 100. In the example of FIG. 37, mirroring is carried out between a logical unit (LU a0) in the storage node 100a and another logical unit (LU b0) in the storage node 100b. During mirroring between storage nodes 100, the write data contained in a write command received from the host computer is stored in the cache area ((i) of FIG. 37), the write data is written to the logical unit (LU a0) ((ii) of FIG. 37), and the write data is written to the logical unit (LU b0) ((iii) of FIG. 37). In the storage system 1000 in this embodiment, the processes of (i) through (iii) of FIG. 37 may be executed by the core p of the storage node 100a. The load may also be distributed among the storage nodes 100, by having the core p of the storage node 100b execute the process of (iii), for example.

Figure 38:
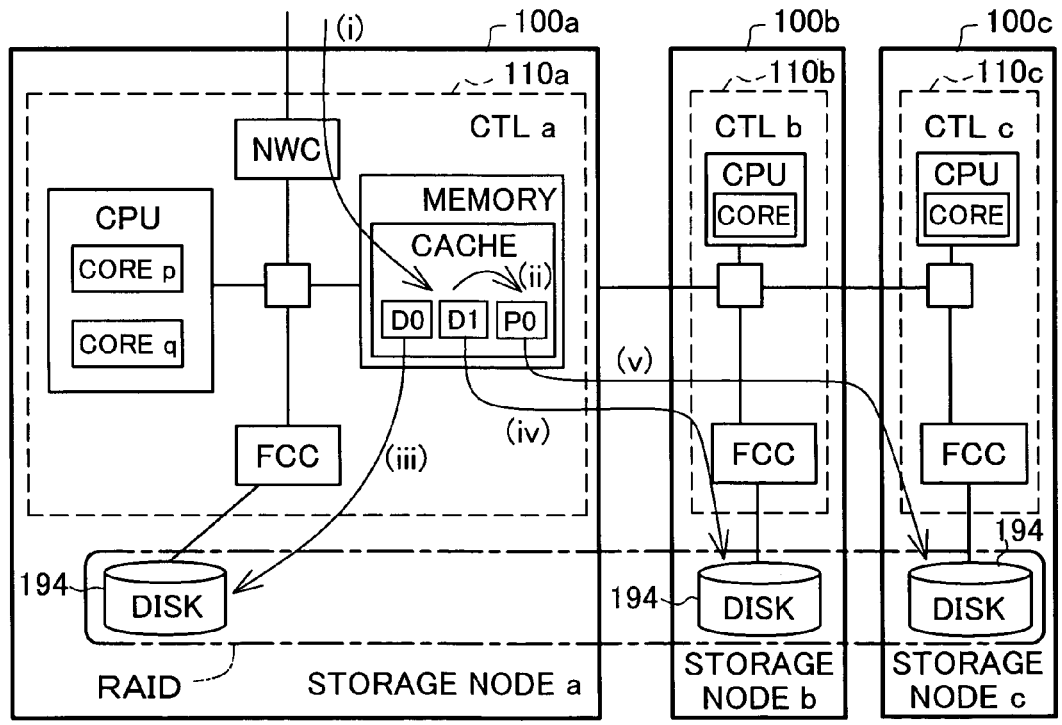
FIG. 38 is a diagram showing an example of application relating to a RAID among storage nodes 100 in the storage system 1000.

FIG. 38 is a diagram showing an example of application relating to a RAID among storage nodes 100 in the storage system 1000. A RAID among storage nodes 100 refers to configuring a RAID that spans a multiplicity of storage nodes 100. In the example of FIG. 38, the RAID is composed of a total of three disks 194 included respectively in the storage node 100a, the storage node 100b, and the storage node 100c. In the storage system 1000 of this configuration, when a write command is received from a host computer, the write data (D0 and D1 of FIG. 38) contained in the write command received from the host computer is stored in the cache area ((i) of FIG. 38), parity (P0 of FIG. 38) is created on the basis of the write data ((ii) of FIG. 38), and the write data and parity are stored in the disks 194 ((iii) through (v) of FIG. 38). In the storage system 1000 in this embodiment, the processes of (i) through (v) of FIG. 38 may be executed by the core p of the storage node 100a. The load may also be distributed among the storage nodes 100, by having the core of the storage node 100b execute the process of (iv) and the core of the storage node 100c execute the process of (v), for example.

In the storage system 1000 in this embodiment, the administrator can administer the storage system with a single system image, even with repeated expansion of the storage nodes 100. Thus, as compared to the case where multiple storage systems of conventional type are administered separately, storage system administration costs can be reduced appreciably.

Additionally, with the storage system 1000 in this embodiment, the four advantages mentioned below can be achieved. First, by bundling together multiple storage nodes 100 which are small and inexpensive, it is possible to provide a storage system 1000 that is large and has good cost performance. Second, it is possible to expand the system in storage node 100 units in accordance with the need for higher capacity or performance, so that a scalable storage system 1000 configured at optimal cost may always be provided. Third, during inter-node switching of the assigned CPU core in association with expansion of the storage nodes 100, since processes that are transparent to applications of the host computers 200 can be realized, even where it becomes necessary to replace a storage node 100 due to it reaching the end of its service life, data can be preserved for an indefinite period beyond the service life of the storage nodes 100, without having to suspend operation. Fourth, since, depending on the combination of storage nodes 100 system configuration can be scaled from small to large, or with reference to various applications, the number of types of products during product development (product lineup) can be reduced.

B. Embodiment 2

Figure 39:
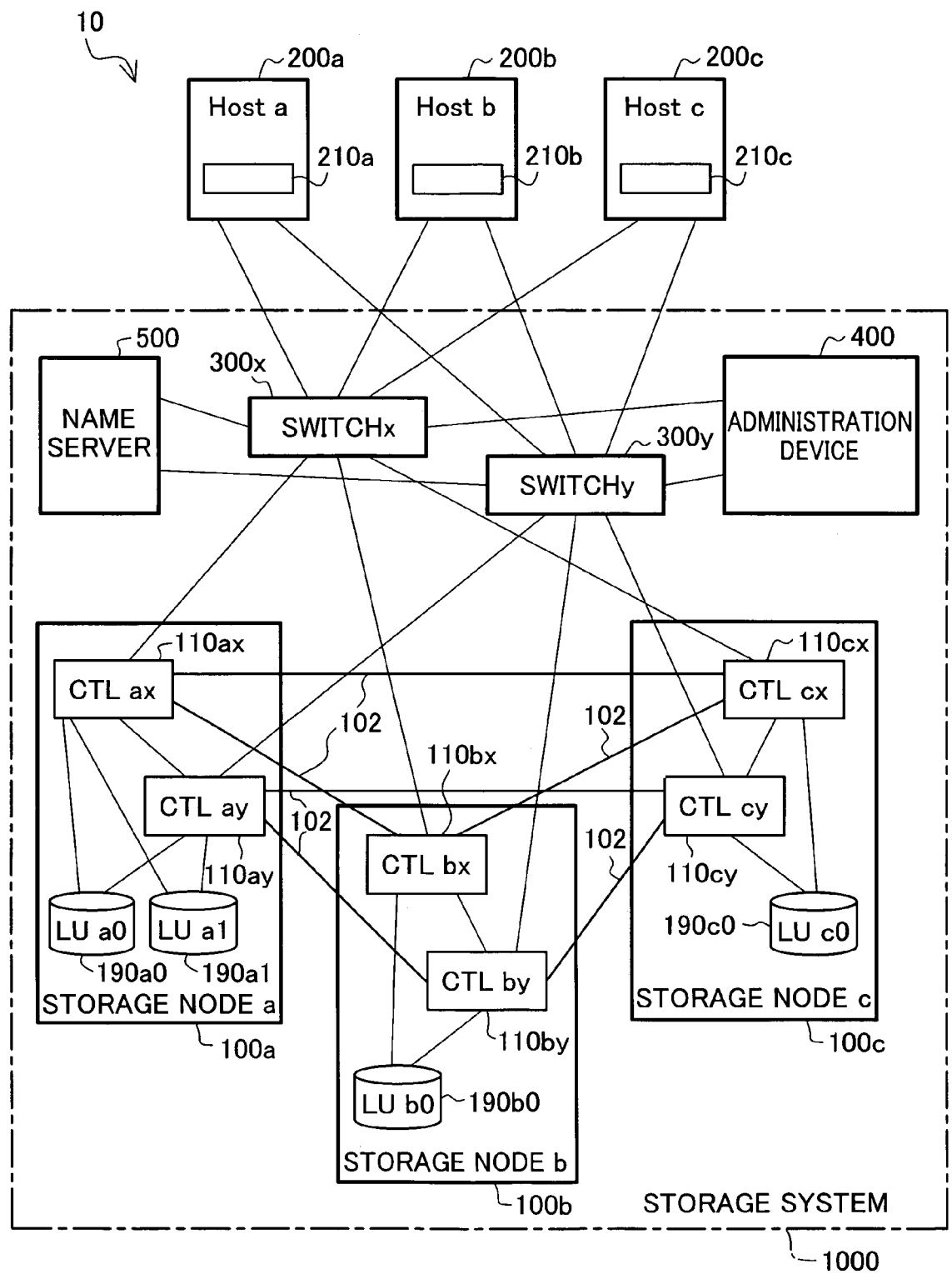
FIG. 39 is a diagram depicting in simplified form the arrangement of the data processing system in Embodiment 2.

FIG. 39 is a diagram depicting in simplified form the arrangement of the data processing system 10 in Embodiment 2. The data processing system 10 in Embodiment 2 differs from the data processing system 10 in Embodiment 1 in that each storage node 100 includes two controllers 110. The data processing system 10 in Embodiment 2 also differs from the data processing system 10 in Embodiment 1 in that the storage system 1000 includes two switches 300.

In the storage system 1000 of Embodiment 2, each storage node 100 includes two controllers 110, so that there is redundancy with regard to the controllers 110. Each controller 110 is set up so as to belong in either of two controller affiliations (also referred to as the "series"). Here, a controller affiliation refers to a group of controllers 110; the two controller affiliations shall be termed the "x affiliation" and the "y affiliation."

Controller affiliations of controller 110 are established so that the two controllers in any one storage node 100 respectively belong to different controller affiliations. For example, the controller affiliations are established so that, of the two controllers 110a in the storage node 100a, one belongs to the x affiliation and the other belongs to the y affiliation. Controller affiliations are established in the same manner for the two controllers 110 in the storage node 100b and in the storage node 100c. In the description and drawings herein, the suffix "x" shall be appended after the name and symbol of controllers 110 belonging to the x affiliation, and the suffix "y" shall be appended after the name and symbol of controllers 110 belonging to the y affiliation. For example, the controller 110 belonging to the x affiliation in the storage node 100a shall be denoted as controller 110ax (CTL ax).

As shown in FIG. 39, the two controllers in a single storage node 100 are connected to one another. The two controllers in a single storage node 100 are also each connected to all of the logical units 190 within the storage node 100. For example, the two controllers 110 (CTLax and CTLay) in the storage node 100a are connected to the two logical units 190 (LUa0 and LUa1).

Among the controllers 110 in the storage nodes 100 of the storage system 1000, those controllers 110 belonging to the same controller affiliation are connected to one another by means of the inter-node controller coupling unit 102. Specifically, the three controllers 110 belonging to the x affiliation (CTLax, CTLbx, CTLcx) of the storage nodes 100 are connected to one another by means of the inter-node controller coupling unit 102. Analogously, the three controllers 110 belonging to the y affiliation (CTLay, CTLby, CTLcy) of the storage nodes 100 are connected to one another by means of the inter-node controller coupling unit 102. These inter-node controller coupling unit 102 interconnect the controllers 110 without going through the switches 300, i.e. without going through access paths between the controllers 110 and the host computers 200.

The two switches 300 in the storage system 1000 are associated respectively with the two controllers in each storage node 100. Specifically, one switch 300x (switch x) is connected to each of the controllers 110 belonging to the x affiliation included in the storage nodes 100, while the other switch 300y (switch y) is connected to each of the controllers 110 belonging to the y affiliation included in the storage nodes 100. The two switches 300 are also connected respectively to the host computers 200, the administration device 400, and the name server 500.

Figure 40:
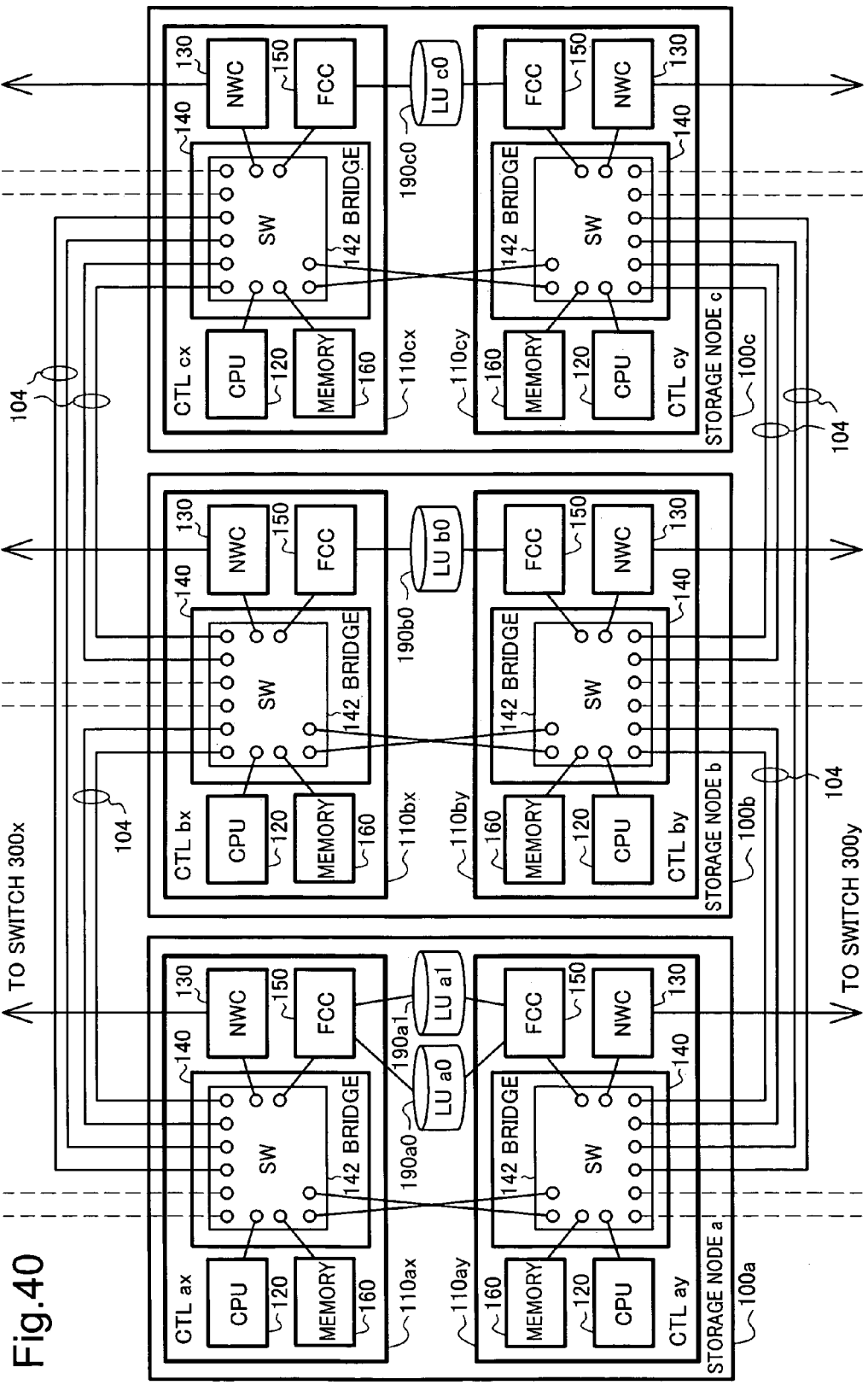
FIG. 40 is a diagram depicting the configuration of the inter-node controller coupling unit 102 in Embodiment 2.

FIG. 40 is a diagram depicting the configuration of the inter-node controller coupling unit 102 in Embodiment 2. The inter-node controller coupling unit 102 in Embodiment 2 are similar to the inter-node controller coupling unit 102 in Embodiment 1 depicted in FIG. 3. Specifically, the bridge 140 within each controller 110 in the storage nodes 100 has a switch (SW) 142, and controllers 110 belonging to the same controller affiliation are interconnected by connection lines 104 that interconnect the switches 142. Within each storage node 100, the two controllers 110 are connected to one another by means of connection lines 104 interconnecting the switches 142 within the two controllers 110.

Figure 41:
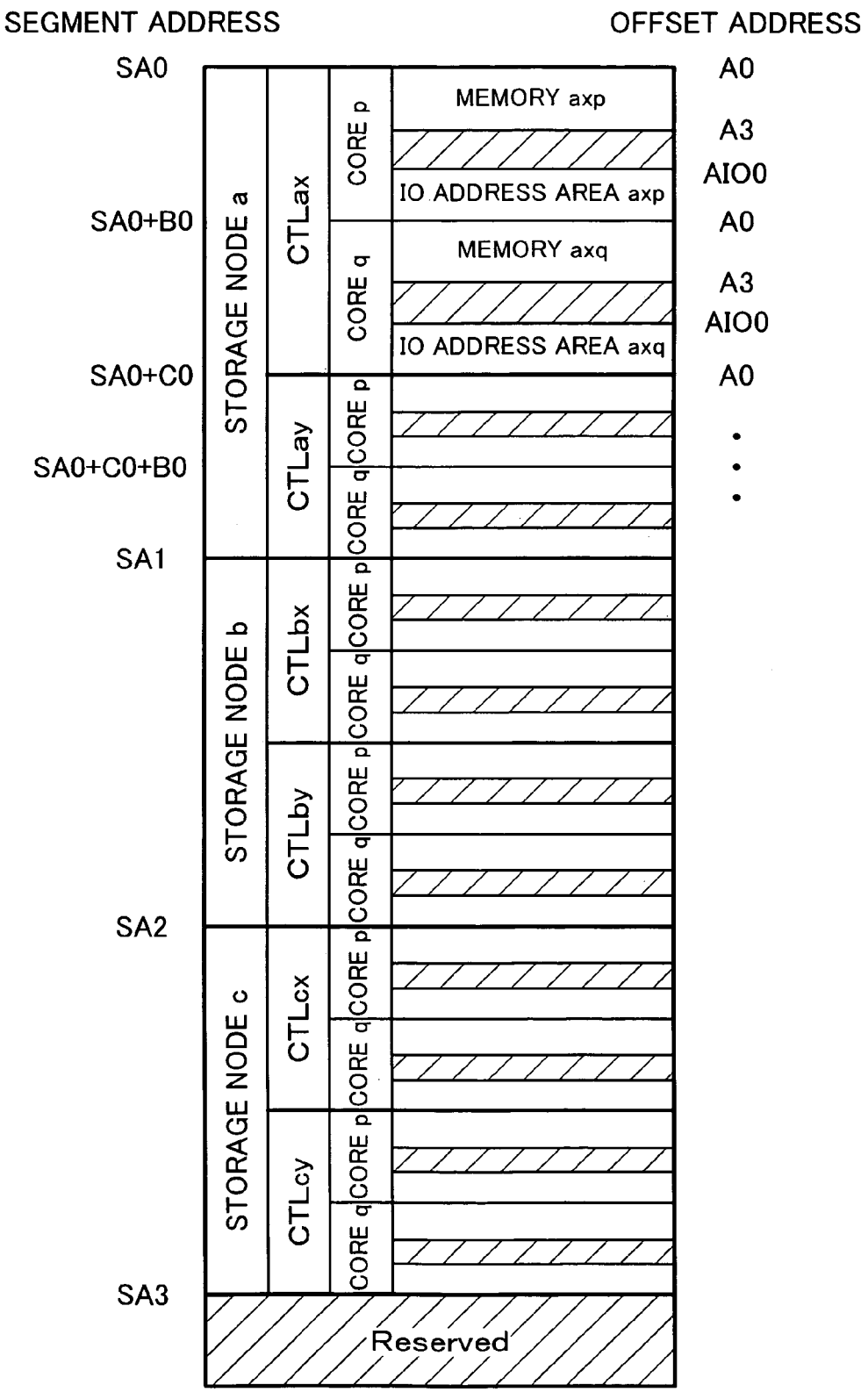
FIG. 41 is a diagram depicting conceptually the address spaces of the storage system 1000 in Embodiment 2.

FIG. 41 is a diagram depicting conceptually the address spaces of the storage system 1000 in Embodiment 2. FIG. 41 shows the address spaces of the storage system 1000 as seen from the core p (not shown) within the controller 110ax (FIG. 39) of the storage node 100a. The address spaces of Embodiment 2 depicted in FIG. 41 are analogous to the address spaces of Embodiment 1 depicted in FIG. 22. Specifically, as shown in FIG. 41, all of the space within the storage system 1000 is mapped in ordered fashion to the address spaces of the storage system 1000 as seen from the core p of the controller 110ax of the storage node 100a. This applies to the address spaces seen from other cores as well. Accordingly, the cores included in the storage system 1000 can refer to all space mapped to the address spaces.

Accordingly, switching of the assigned CPU core within a controller, and inter-node switching of the assigned CPU core as discussed previously in Embodiment 1 can be accomplished in the storage system 1000 in Embodiment 2 as well. Additionally, in the storage system 1000 in Embodiment 2, it is possible to accomplish switching of the assigned CPU core within a node, whereby the assigned CPU core is switched between cores included in different controllers 110 within a given storage node 100.

C. Variations

The invention is not limited to the embodiments set forth hereinabove, and may be reduced to practice in various other modes without departing from the spirit thereof, such as in the variations described below, for example.

C1. Variation 1

Figure 42:
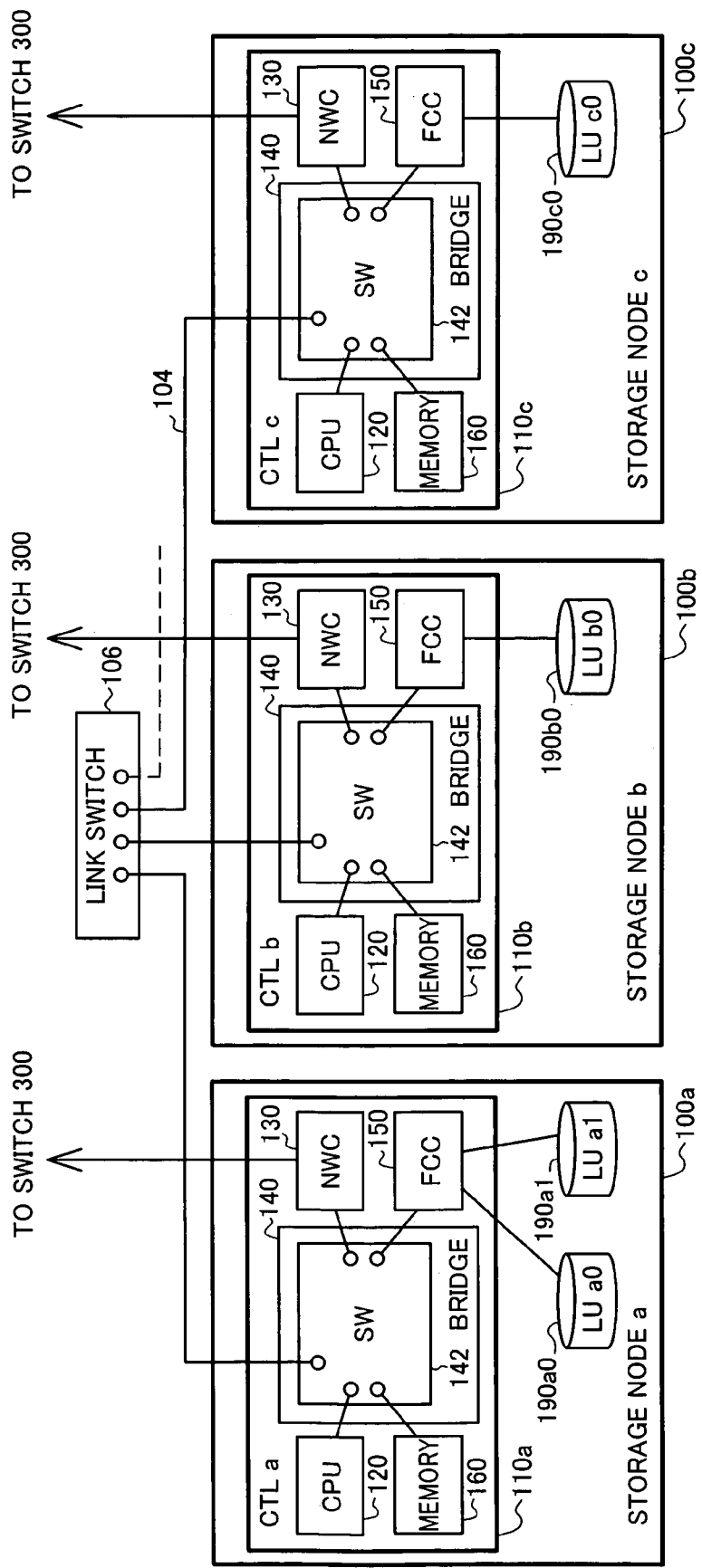
FIG. 42 is a diagram showing an inter-node controller coupling unit 102 configuration in a variation.

The configurations (FIG. 3 and FIG. 40) of the inter-node controller coupling unit 102 (FIG. 1 and FIG. 40) in the preceding embodiments are merely exemplary, and other configurations for the inter-node controller coupling unit 102 are possible. FIG. 42 is a diagram showing an inter-node controller coupling unit 102 configuration in a variation.

In the variation of FIG. 42, a link switch 106 is provided. This link switch 106 connects to the switches (SW) 142 of the controllers 110 by means of connection lines 104. That is, in the variation of FIG. 42, the inter-node controller coupling unit 102 is composed of the link switch 106 and the connection lines 104 connecting the link switch 106 with the switches 142. With the variation of FIG. 42, the configuration for interconnecting the controllers 110 can be simplified. Also, whereas in the variation of FIG. 42, the connection lines 104 connecting the link switch 106 with the switches 142 are each composed of a single line, the connection lines 104 may instead be composed of set of two lines.

While FIG. 42 depicts an variation corresponding to the inter-node controller coupling unit 102 in Embodiment 1 depicted in FIG. 3, the inter-node controller coupling unit 102 in Embodiment 2 depicted in FIG. 39 may be modified analogously.

Figure 43:
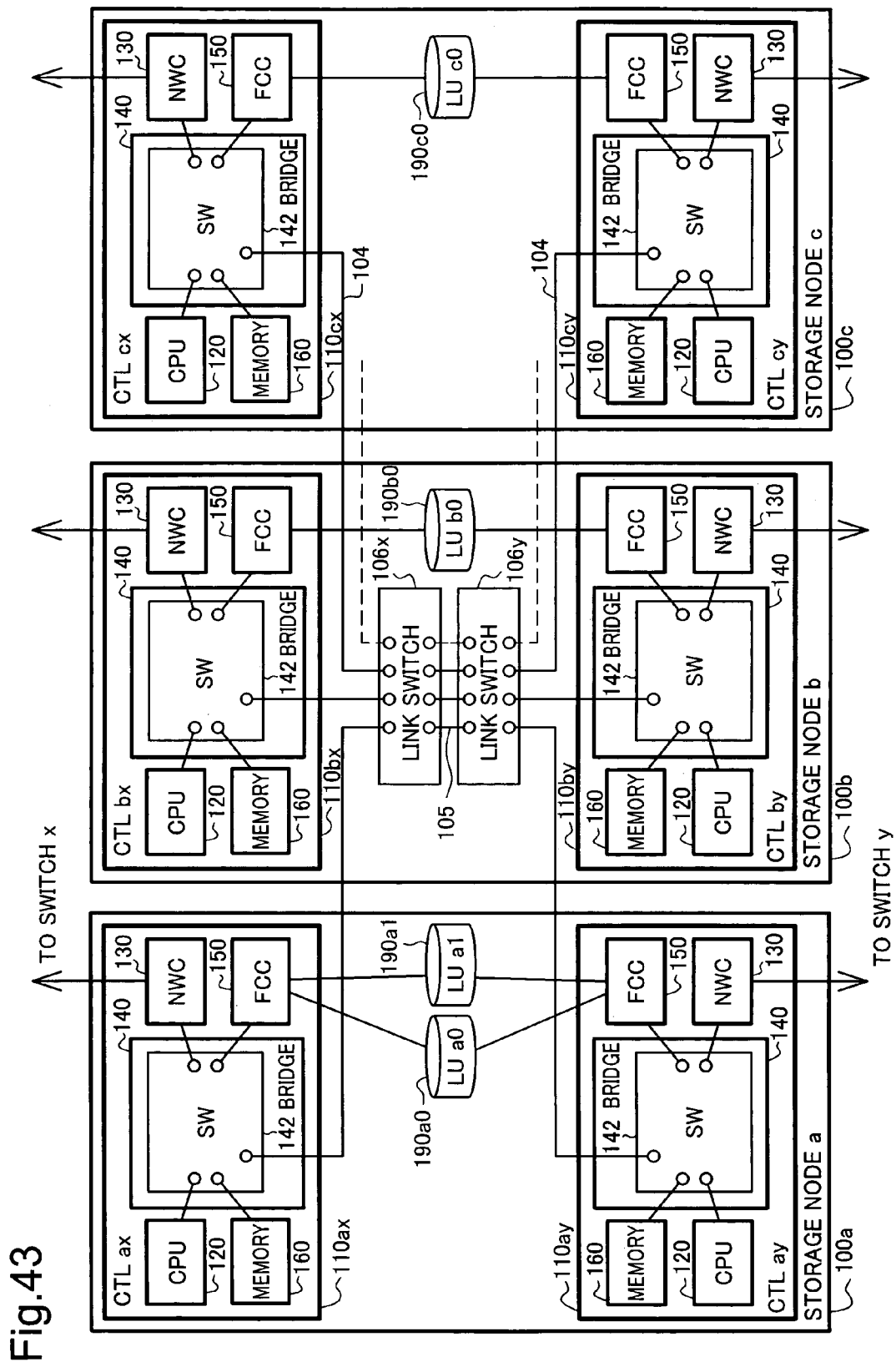
FIG. 43 is a diagram showing an inter-node controller coupling unit 102 configuration in another variation.

FIG. 43 is a diagram showing an inter-node controller coupling unit 102 configuration in another variation. The variation of FIG. 43 shows a variation corresponding to the inter-node controller coupling unit 102 in Embodiment 2 depicted in FIG. 40.

In the variation shown in FIG. 43, two link switches 106 are provided, and the inter-node controller coupling unit 102 are composed, on a per-affiliation basis, of the link switches 106, and the connection lines 104 connecting the link switches 106 with the switches 142. Additionally, in the variation shown in FIG. 43, the two link switches 106 are connected by connection lines 105, and the two controllers 110 within each storage node 100 are connected by these connection lines 105. With the variation shown in FIG. 43, the configuration for interconnecting the controllers 110 can be further simplified. Also, in the variation of FIG. 43 as well, each connection line can be composed of set of two lines.

C2. Variation 2

Figure 44:
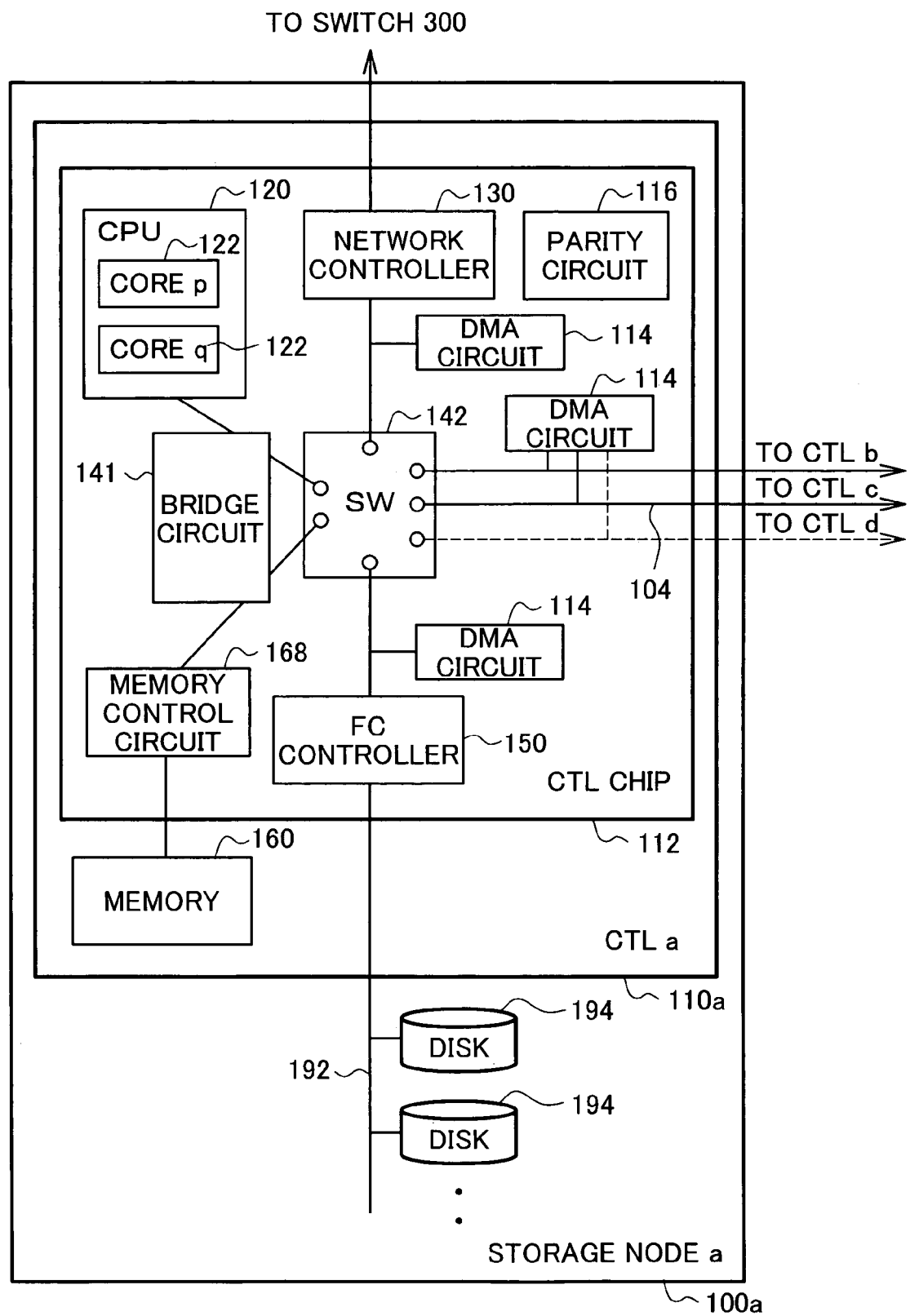
FIG. 44 is a diagram depicting the storage node 100 configuration in a variation.

FIG. 44 is a diagram depicting the storage node 100 configuration in a variation. The difference from the storage node 100 configuration in the preceding embodiments (see FIG. 2 and FIG. 3) lies with the configuration of the controller 110 in the storage node 100.

In the variation shown in FIG. 44, the controller 110 is composed of a controller chip (CTL chip) 112 and a memory 160. That is, elements besides the memory 160 in the controller 110 are situated on a single chip.

In the variation shown in FIG. 44, a CPU 120, a network controller 130, a bridge circuit 141, a switch (SW) 142, and an FC controller 150 are disposed on the controller chip 112. On the controller chip 112 are also disposed various circuits (a DMA circuit 114, a parity calculation circuit 116, and a memory control circuit 168).

C3. Variation 3

Figure 45:
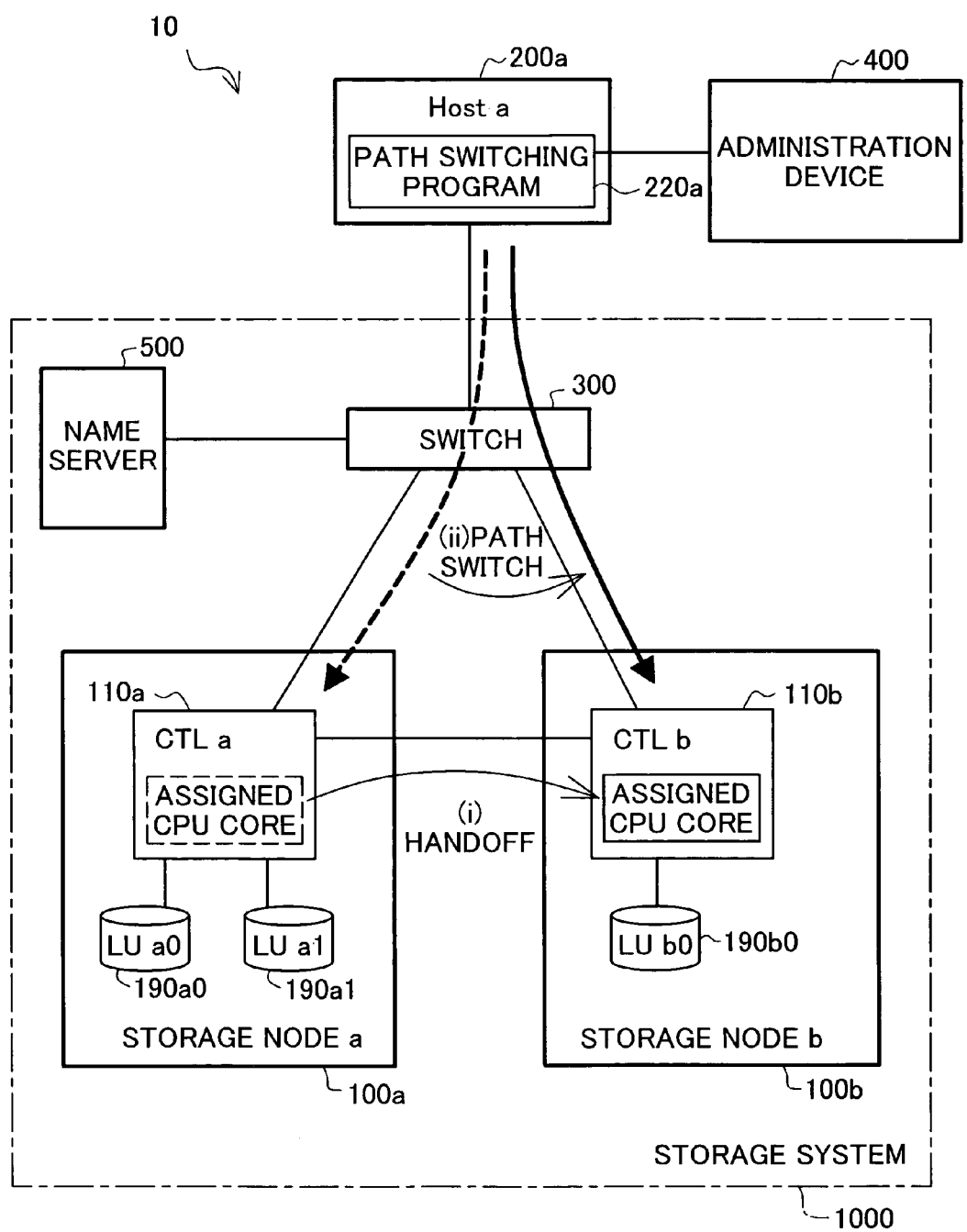
FIG. 45 is a diagram showing the modification process of access paths between a host computer 200 and storage nodes 100.

The method for modifying access paths between host computers 200 and storage nodes 100 in the preceding embodiments (FIG. 30) is merely exemplary, and it is possible to use other methods. FIG. 45 is a diagram of a variation of the modification process of access paths between a host computer 200 and storage nodes 100. In the variation of FIG. 45, the assigned CPU core is handed off between the controllers 110 of the storage nodes 100 ((i) of FIG. 45). The host computer 200 has a path switching program 220, and in accordance with an instruction from the administration device 400 connected to the host computer 200, the path to the storage node 100 is switched ((ii) of FIG. 45). The method of the variation of FIG. 45 can be implemented in systems that use FC protocol or SAS protocol.

Figure 46:
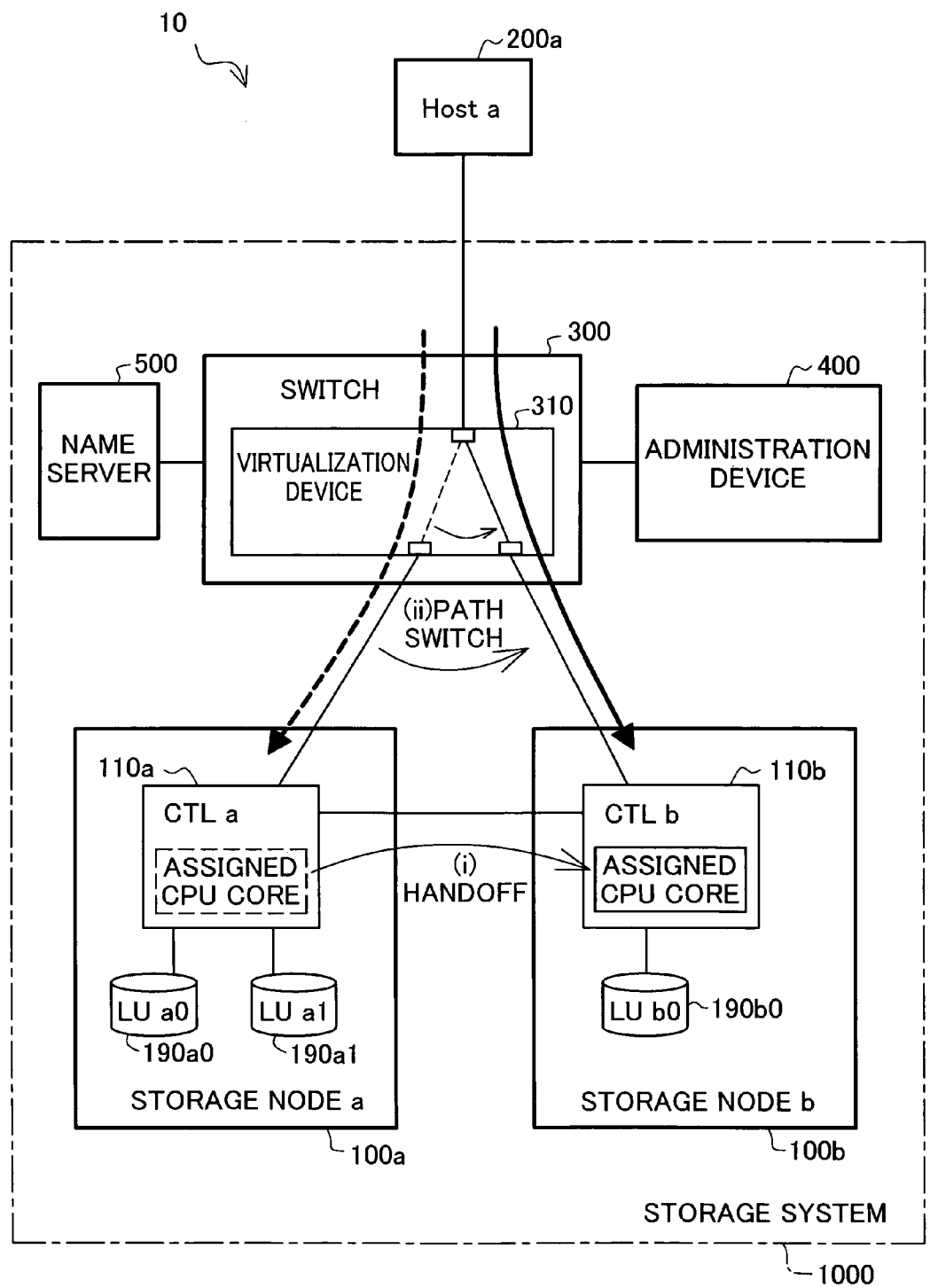
FIG. 46 is a diagram showing another variation of the modification process of access paths between a host computer 200 and storage nodes 100.

FIG. 46 is a diagram showing another variation of the modification process of access paths between a host computer 200 and storage nodes 100. In the variation of FIG. 46, the switch 300 has a virtualization device 310. The virtualization device 310 has virtual ports; the initiator of the host computer 200 is associated with a virtual port, and the targets of the storage nodes 100 are associated with virtual ports. That is, the initiator of the host computer 200 and the targets of the storage nodes 100 are associated via virtual ports of the virtualization device 310.

When a target is migrated in association with handoff of the assigned CPU core between the controllers 110 of storage nodes 100 ((i) of FIG. 46), the association between the virtual port and the target in the virtualization device 310 is updated. By so doing, the path between the host computer 200 and the storage node 100 can be switched, without modifying the access destination (virtual port) for the host computer 200 ((ii) of FIG. 46). The method of FIG. 46 can be implemented in systems that use iSCSI protocol, as well as in systems that use FC protocol or SAS protocol wherein the target name (or WWN) changes in association with migration of a target.

C4. Variation 4

The configuration of the data processing system 10 (FIG. 1) in the preceding embodiments is merely exemplary, and other configurations may be employed for the data processing system 10. For example, in the data processing system 10, the storage system 1000 may be furnished with one storage node 100 only. In this case as well, switching of the assigned CPU core within the controller as described above can be accomplished.

The CPU 120 (FIG. 5) in the controllers 110 of the storage nodes 100 included in the storage system 1000 may have a single core 122 only. In this case as well, inter-node switching of the assigned CPU core as described above can be accomplished.

Any of various protocols can be selected as the protocol used in the data processing system 10. The elements of the data processing system 10 can be configured according to the selected protocol. For example, the network controller 130 of the preceding embodiments can be configured as Ethernet™, an iSCSI controller, an FC controller, an SAS controller, or the like. The FC controller 150 can be configured as an FC controller, a SAS controller, a SATA controller, a SCSI controller, or the like. The network connecting the storage nodes 100 may employ Ethernet, PCI-EXPRESS, InfiniBand, PIC/PCI-X, dedicated line, or the like. Where the controller 110 is disposed on a single chip as depicted in FIG. 44, since the circuit is compact, it is preferable to employ a SAS controller as the FC controller 150. Where the controller is disposed on a single chip, it is preferable to employ serial-line PCI-EXPRESS or InfiniBand for the network connecting the storage nodes 100.

C5. Variation 5

The content of the host command execution process (FIG. 15 and FIG. 16) in the preceding embodiments is merely exemplary, and may be modified to some other content. For example, it is not always necessary to issue an interrupt from the network controller 130 to the CPU 120 (Step S140 of FIG. 15) or to issue an interrupt from the FC controller 150 to the CPU 120 (Step S200 of FIG. 16); processing of the CPU 120 could be migrated by means of polling or the like instead.

What is claimed is:

1. A storage system comprising:
a plurality of storage nodes each including a plurality of disks configured into at least one logical unit that is a logical memory area for storing data and a controller configured to control said at least one logical unit; and
a controller coupling unit configured to connect a plurality of controllers respectively included in the storage nodes, without using an access path between the controllers and a host computer connected to the storage system, wherein
the controller of each storage node includes: a CPU including at least one CPU core, a network controller for receiving from the host computer via a network a host command targeting one of the plurality of logical units of the storage nodes within the storage system, a logical unit controller connected to said at least one logical unit and controlling input/output of data therein, and a memory having a plurality of first shared memory areas shared by the CPU of each storage node, each of the first shared memory areas associated with a combination of one of said at least one CPU core within the CPU with one logical unit controller within the storage system, the CPU within a first storage node among the plurality of storage nodes includes a plurality of CPU cores, the network controller within the first storage node designates one of said CPU cores therein as a designated CPU core depending on the logical unit to which a received host command is targeted, when the network controller included within the first storage node receives from the host computer a host command targeting a logical unit included in a second storage node among the plurality of storage nodes, the designated CPU core within the first storage node executes data reading/writing processing in response to the received host command in place of one of said at least one CPU core within the second storage node without copying data from the targeted logical unit in the second storage node to a corresponding one logical unit in the first storage node, whereby a logical unit command for the logical unit controller connected to the targeted logical unit included in the second storage node is stored in one of the first shared memory areas within the first storage node which is shared by said designated CPU core within the first storage node and the logical unit controllers within the first and second storage nodes, the logical unit controller within the second storage node acquires via the controller coupling unit the logical unit command stored in said one first shared memory area within the first storage node, and controls input/output of data in the targeted logical unit in accordance with the acquired logical unit command, and the memory within the first storage node includes a plurality of second shared memory areas shared by the CPU cores and the network controller of the first storage node, each of the second shared memory areas is associated with one of the CPU cores of the first storage node, the designated CPU core is responsible for executing processing in response to the received host command, and stores the received host command in one of the second shared memory areas associated with the designated CPU core, and the designated CPU core acquires the host command stored in said one second shared memory area and executes processing in response to the host command.

2. A storage system according to claim 1, wherein
each logical unit controller includes first communication memory areas used for communication between the CPUs and logical unit controllers of the storage nodes, each of the first communication areas being associated with one CPU core within the storage system, the designated CPU core within the first storage node stores location information in one of the first communication memory areas within the logical unit controller of the second storage node associated with the designated CPU core, the location information indicating a location of the logical unit command stored in said one first shared memory area within the first storage node, and the logical unit controller of the second storage node, referring to the location information stored in said one first communication memory area, acquires the logical unit command stored in said one first shared memory area.

3. A storage system according to claim 2, wherein
each network controller includes second communication memory areas used for communication between the CPUs and the network controllers of the storage nodes, each of the second communication memory areas being associated with one CPU core within the storage system, the network controller within the first storage node stores location information in one of the second communication memory areas associated with the designated CPU core within the first storage node, the location information indicating a location of a host command stored in said ore second shared memory area within the first storage node, and the designated CPU core, referring to the location information stored in said one second communication memory area, acquires the host command stored in said one second shared memory area.

4. A storage system according to claim 3, wherein the designated CPU core within the first storage node carries out the host command execution process using said one second shared memory area within the first storage node, a second communication memory area within the first storage node, said one first shared memory area within the first storage node, and a first communication memory area within the second storage node.

5. A storage system according to claim 3, wherein the first communication memory area within the second storage node is set up to be exclusively used by the designated CPU core of the first storage node.

6. A storage system according to claim 1, wherein
the network controller within the first storage node, after storing a host command in said one second shared memory area, issues an interrupt request to the designated CPU core, and the designated CPU core, upon receiving the interrupt request, acquires the host command stored in said one second shared memory area.

7. A storage system according to claim 1, wherein
upon completing control of input/output of data in the targeted logical unit in accordance with the acquired logical unit command, the logical unit controller within the second storage node transmits, via the controller coupling unit, status information indicating completion of processing and stores the status information in said one first shared memory area associated with the designated CPU core within the first storage node, the designated CPU core, by means of executing a process in response to the status information stored in said one first shared memory area, stores a completion command for the network controller within the first storage node in said one second shared memory area associated with the designated CPU core, and in accordance with the completion command stored in said one second shared memory area, the network controller within the first storage node executes processing relating to completion of the host command received from the host computer.

8. A storage system according to claim 7, wherein
the logical unit controller within the second storage node, after storing the status information in said one first shared memory area within the first storage node, issues an interrupt request to the designated CPU core, and the designated CPU core, upon receiving the interrupt request, acquires the status information stored in said one first shared memory area.

9. A storage system according to claim 1, wherein
the controller within each storage node includes a controller switch connected with the controller coupling unit, and the controller coupling unit includes a connection line interconnecting the controller switches of the controllers.

10. A storage system according to claim 1, wherein
the controller within each storage node includes a controller switch connected with the controller coupling unit, and
the controller coupling unit includes a plurality of connection lines connected to the controller switches of the controllers and a link switch connected to each of the plurality of connection lines.

11. A storage system according to claim 1, wherein
the storage nodes each include a plurality of the controllers,
the plurality of controllers in each storage node are each designated as belonging to one of a plurality of controller affiliations such that multiple controllers within a single storage node do not belong to a same controller affiliation, and
the controller coupling unit interconnects multiple controllers belonging to a same controller affiliation within the storage system.

12. A storage system according to claim 11, wherein
each controller within each storage node includes a control switch connected to the controller coupling unit,
the controller coupling unit includes
connection switches shared on a per-affiliation basis;
connection lines connecting the connection switches with the controller switches within the controllers belonging to the controller affiliation associated with the connection switch; and
connection lines interconnecting the plurality of the connection switches, and the plurality of the controllers within a single storage node are connected to one another via the connecting lines interconnecting the connection switches.

13. A storage system according to claim 1, further comprising:
an administration device having a display and a console, wherein
the display of the administration device displays a correspondence relationship between the targeted logical unit and its designated CPU core within the storage system, and
each network controller, in the event that the correspondence relationship displayed on the display of the administration device has been modified by user operation of the console of the administration device, designates the designated CPU core in accordance with the modified correspondence relationship.

14. A storage system according to claim 1, wherein
in each storage node, the CPU of the controller, the network controller and the logical unit controller are integrated on a single chip.

15. A method for controlling a storage system, the storage system including:
a plurality of storage nodes each including a plurality of disks configured into at least one logical unit that is a logical memory area for storing data and a controller for controlling said at least one logical unit, and
a controller coupling unit for connecting a plurality of controllers respectively included in the storage nodes, without using an access path between the controllers and a host computer connected to the storage system;
the controller of each storage node including:
a CPU including at least one CPU core,
a network controller for receiving from the host computer via a network a host command targeting one of the logical units within the storage system,
a logical unit controller connected to said at least one logical unit and controlling input/output of data therein, and
a memory having a plurality of first shared memory areas shared by the CPU of each storage node, each of the first shared memory areas associated with a combination of one of said at least one CPU core within the CPU with one logical unit controller within the storage system, and
the CPU within the first storage node includes a plurality of CPU cores, the memory within the first storage node includes a plurality of second shared memory areas shared by the CPU cores and the network controller of the first storage node, each of the second shared memory areas associated with one of the CPU cores of the first storage node, the method comprising the steps of
(a) when the network controller included within the first storage node receives from the host computer a host command targeting a logical unit included in a second storage node among the plurality of storage nodes, executing by a designated one of the CPU cores within the first storage node data reading/writing processing in response to the received host command in place of one of said at least one CPU core within the second storage node without copying data from the targeted logical unit in the second storage node to a corresponding one logical unit in the first storage node, whereby a logical unit command for the logical unit controller connected to the targeted logical unit included in the second storage node is stored in one of the first shared memory areas within the first storage node which is shared by the designated CPU core within the first storage node and the logical unit controllers within the first and second storage nodes, and the network controller stores the received host command in one of the second shared memory areas associated with the designated CPU core;
(b) acquiring via the controller coupling unit the logical unit command stored in said one first shared memory area within the first storage node and controlling input/output of data in the targeted logical unit in accordance with the acquired logical unit command by the logical unit controller within the second storage node; and
(c) acquiring via the designated CPU core the host command stored in said one second shared memory area and executing processing in response to the host command.

* * * * *